(12) United States Patent  (10) Patent No.: US 6,181,432 B1
Furuya                     (45) Date of Patent: Jan. 30, 2001

(54) PRINTING SYSTEM, PRINTING APPARATUS AND PRINTING CONTROL METHOD

(75) Inventor: Yoji Furuya, Inagi (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/030,867

(22) Filed: Feb. 26, 1998

(30) Foreign Application Priority Data

Feb. 28, 1997 (JP) .................................................. 9-046631

(51) Int. Cl.[7] .......................... B41J 15/00; B41B 15/00; H04N 1/04; G06K 9/00; G06K 9/48

(52) U.S. Cl. ...................... 358/1.11; 358/1.13; 358/1.15; 358/1.16; 358/1.17; 358/486; 358/488; 382/170; 382/198; 382/289

(58) Field of Search ............................ 358/1.1, 1.6, 1.11, 358/1.13, 1.15–1.17, 404, 443, 444, 470, 486, 488; 345/192, 194, 195, 467; 382/180, 232, 289, 170, 198

(56) References Cited

U.S. PATENT DOCUMENTS

| | | | |
|---|---|---|---|
| 5,566,277 | * 10/1996 | Hideshima et al. | 358/1.16 |
| 5,592,593 | * 1/1997 | Speed | 358/1.1 |
| 5,604,846 | * 2/1997 | Kadota | 358/1.16 |
| 5,768,486 | * 6/1998 | Sugaya | 358/1.1 |
| 5,889,931 | * 3/1999 | Noda | 358/1.1 |

* cited by examiner

Primary Examiner—Edward L. Coles
Assistant Examiner—Twyler Lamb
(74) Attorney, Agent, or Firm—Fitzpatrick, Cella, Harper & Scinto

(57) ABSTRACT

When a host transfers only an image to a printing apparatus to make it print out the image, a heavy load is imposed on the host, and the data size to be transferred is large, resulting in a long processing time. To prevent this, when a document is to be printed, the driver on a host sends character codes of characters that occur for the first time in that document and corresponding character images to the printer in advance, and registers them. After this process, the driver transmits, to the printer, characters as character codes, ruled lines as coordinate data representing their corner points, and data other than characters and ruled lines as mapped images. The printer maps an image on a page memory, maps characters as images with reference to the registered character codes and images, and superposes the mapped character images on the image mapped on the page memory. Also, the printer maps ruled lines based on their vertex positions, and synthesizes them on the already mapped image. The printer prints the synthesized image.

16 Claims, 38 Drawing Sheets

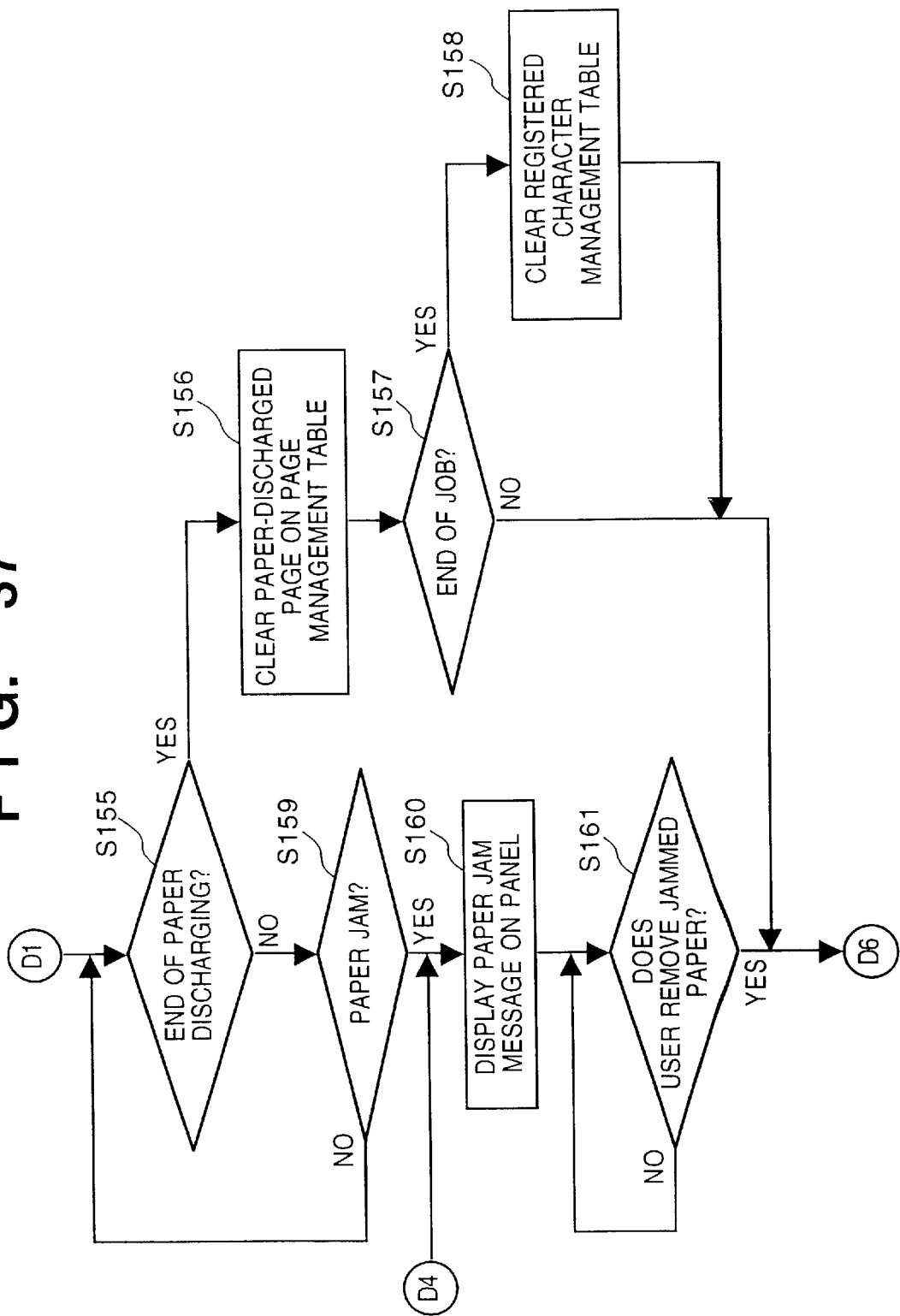

ABOUT 1MB
ABOUT 100KB
ABOUT 100KB
ABOUT 100KB
ABOUT 100KB
ABOUT 100KB
ABOUT 100KB
ABOUT 100KB

STANDARD 2MB RAM

LARGE-SIZE IMAGE DATA WHICH CANNOT BE STORED IN 2MB EVEN AFTER COMPRESSION

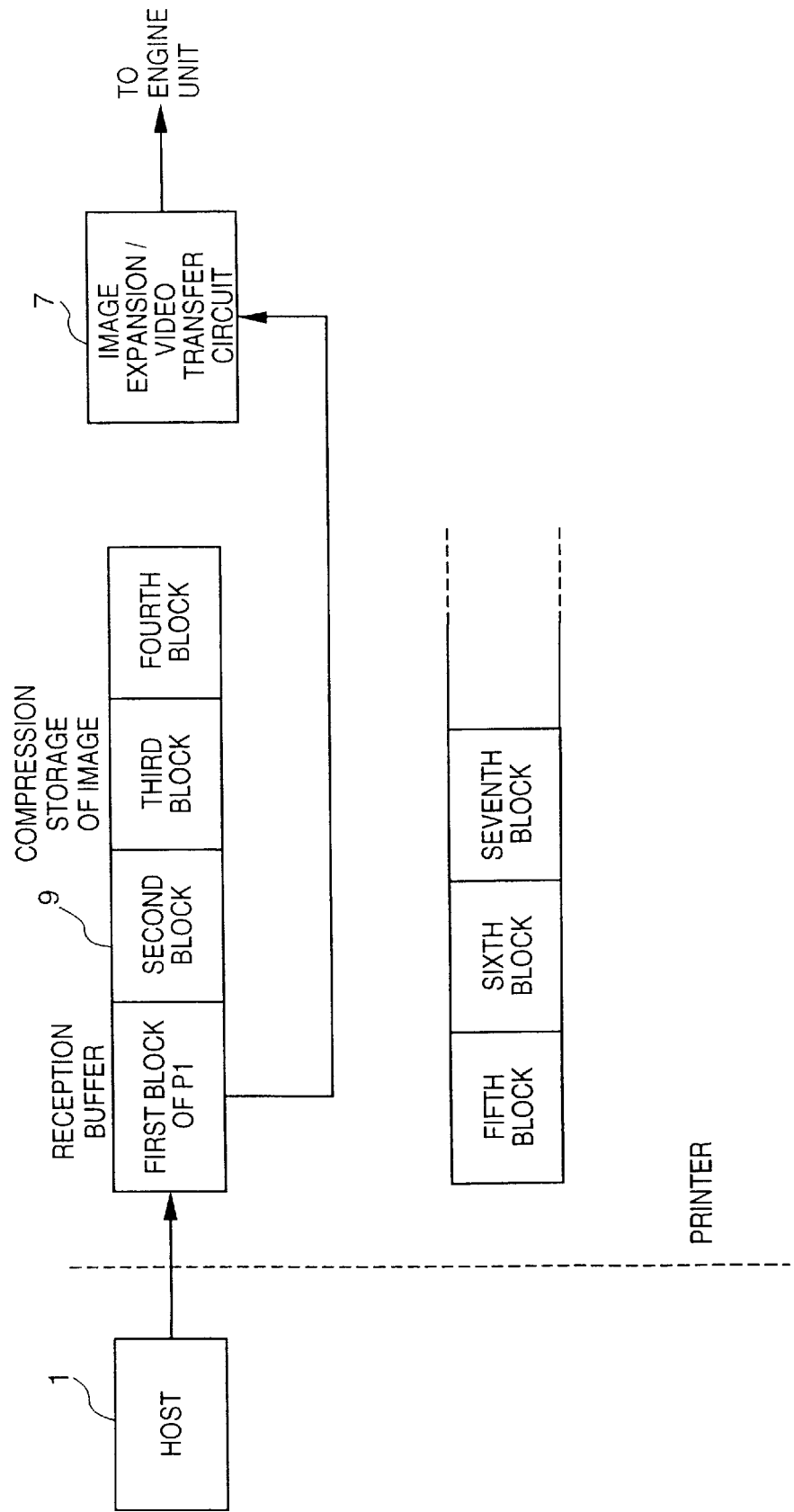

PRINTING SYSTEM, PRINTING APPARATUS AND PRINTING CONTROL METHOD

BACKGROUND OF THE INVENTION

1. Field of the Invention

The present invention relates to a printing system, printing apparatus, and printing control method for printing out print data sent from, e.g., a host computer.

2. Related Background Art

Conventionally, a page printer dedicated to image output is known, and is called a host-based printer.

In case of the host-based printer, a host computer compresses mapped image data for one page and sends the compressed data to a controller unit of the printer. The controller unit expands the received compressed data, converts the expanded data into a video signal, and outputs the video signal to an engine unit in synchronism with the paper discharge timing of the engine unit. In this way, printing on a paper sheet for one page is done.

In such printer, conversion of compressed image data into a video signal and video signal output to the engine unit are done by a hardware circuit. Ultimately, the controller unit does not require any CPU, and a very low-cost page printer can be provided.

However, the host computer that uses the conventional host-based printer must perform character mapping, figure drawing, image pasting, and the like. That is, after the host computer maps all print data as image data, it compresses the mapped image data and transfers the compressed data to the printer. For this reason, the volume of data to be transferred from the host computer to the printer becomes large. Also, the host computer must temporarily process characters and elements other than characters, e.g., must perform table ruled line drawing, figure drawing, image pasting, and the like, map them as image data, compress the mapped image data, and transfer the compressed data to the printer. For this reason, the transfer data volume becomes large, and the long processing time on the host computer extends the total processing time.

SUMMARY OF THE INVENTION

It is an object of the present invention to provide a printing apparatus, which is an image-dedicated printer with a simple mechanism similar to that of a host-based printer, but can minimize the character and ruled line mapping processing times in a host computer and the transfer data volume from the host computer by receiving a character portion as a character code and converting it into character image data and by receiving a ruled line portion as a ruled line code and mapping it as image data, and a printing system and printing control method.

It is another object of the present invention to provide a printing apparatus, which can minimize the required memory capacity, a printing system, and a printing control method.

It is still another object of the present invention to provide a printing apparatus which can print characters and ruled lines even when the number of characters to be mapped and the number of ruled lines to be mapped have exceeded their limits, a printing system, and a printing control method.

In order to achieve the above object, the present invention comprises the following arrangement.

That is, there is provided a printing system for printing out document data created by a host apparatus using a printing apparatus, the host apparatus comprising:
first transmission means for transmitting codes and character images in units of character types that occur in the document data to the printing apparatus; and
second transmission means for transmitting characters that occur in the document data as character codes, ruled lines as ruled line data representing the shapes of the ruled lines, and a portion other than the characters and ruled lines as block image data to the printing apparatus, and the printing apparatus comprising:
registration means for registering the character codes and character images transmitted from the first transmission means;
image reconstruction means for mapping, as image data, the character codes transmitted from the second transmission means on the basis of the codes and character images registered by the registration means, mapping ruled lines on the basis of the shapes represented by the ruled line data, and synthesizing the mapped data with an image transmitted from the second transmission means; and
means for printing out the image data obtained by the image reconstruction means.

Alternatively, there is provided a printing apparatus for print out print data received from a host apparatus, which transmits codes and character images in units of character types that occur in document data, and which sequentially transmits characters which occur in the document data as the character codes, ruled lines as ruled line data representing the shapes of the ruled lines, and a portion other than the characters and ruled lines as block image data, comprising:
registration means for registering the character codes and character images received from the host apparatus;
image reconstruction means for mapping, as image data, the character codes received from the host apparatus on the basis of the codes and character images registered by the registration means, mapping ruled lines on the basis of the shapes represented by the ruled line data, and synthesizing the mapped data with a block image received from the host apparatus; and
means for printing out the image data obtained by the image reconstruction means.

Also, there is provided a printing control apparatus for making a printing apparatus print out created document data, comprising:
first transmission means for transmitting codes and character images in units of character types that occur in the document data to the printing apparatus; and
second transmission means for transmitting characters that occur in the document data as character codes, ruled lines as ruled line data representing shapes of the ruled lines, and a portion other than the characters and ruled lines as block image data to the printing apparatus.

Furthermore, there is provided a printing control method for printing out print data received from a host apparatus which transmits codes and character images in units of character types that occur in document data, and which subsequently transmits characters that occur in the document data as character codes, ruled lines as ruled line data representing shapes of the ruled lines, and a portion other than the characters and ruled lines as image data, comprising:
the registration step of registering the character codes and character images received from the host apparatus;

the image reconstruction step of mapping, as image data, the character codes received from the host apparatus on the basis of the codes and character images registered in the registration step, mapping the ruled lines on the basis of the shapes represented by the ruled line data, and synthesizing the mapped data with an image received from the host apparatus; and the step of printing out the image data obtained in the image reconstruction step.

Moreover, there is provided a control method of a printing apparatus for printing out created document data, comprising:

the first transmission step of transmitting codes and character images in units of character types that occur in the document data to the printing apparatus; and the second transmission step of transmitting characters that occur in the document data as character codes, ruled lines as ruled line data representing shapes of the ruled lines, and a portion other than the characters and ruled lines as image data to the printing apparatus.

In addition, there is provided a computer readable storage medium which stores a program for making a computer print out, based on print data received from a host apparatus which transmits codes and character images in units of character types that occur in document data, and which subsequently transmits characters that occur in the document data as character codes, ruled lines as ruled line data representing shapes of the ruled lines, and a portion other than characters and ruled lines as image data, the program comprising:

a code of the registration step of registering the character codes and character images received from the host apparatus;

a code of the image reconstruction step of mapping, as image data, the character codes received from the host apparatus on the basis of the codes and character images registered in the registration step, mapping the ruled lines based on the shapes represented by the ruled line data, and synthesizing the mapped data with an image received from the host apparatus; and a code of the step of printing out the image data obtained in the image reconstruction step.

Lastly, there is provided a computer readable storage medium which stores a program for making a computer control a printing apparatus for printing out created document data, the program comprising:

a code of the first transmission step of transmitting codes and character images in units of character types that occur in the document data to the printing apparatus; and a code of the second transmission step of transmitting characters that occur in the document data as character codes, ruled lines as ruled line data representing shapes of the ruled lines, and a portion other than the characters and ruled lines as image data to the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 37 is a flow chart for explaining the operation of the interpreter program;

FIG. 39 is a view showing the state of a printer upon outputting an image with a large data size.

DETAILED DESCRIPTION OF THE PREFERRED EMBODIMENTS

First Embodiment

A printing system which transmits data from a host computer to a printer to print the data according to the first embodiment of the present invention will be described below with reference to the accompanying drawings.

(a) System Arrangement

A printing apparatus in the printing system of the first embodiment alternately maps character data, ruled line data, and image data on two band memories on a RAM, and transports the mapped data as a video signal to an engine unit 4.

Figure 1:
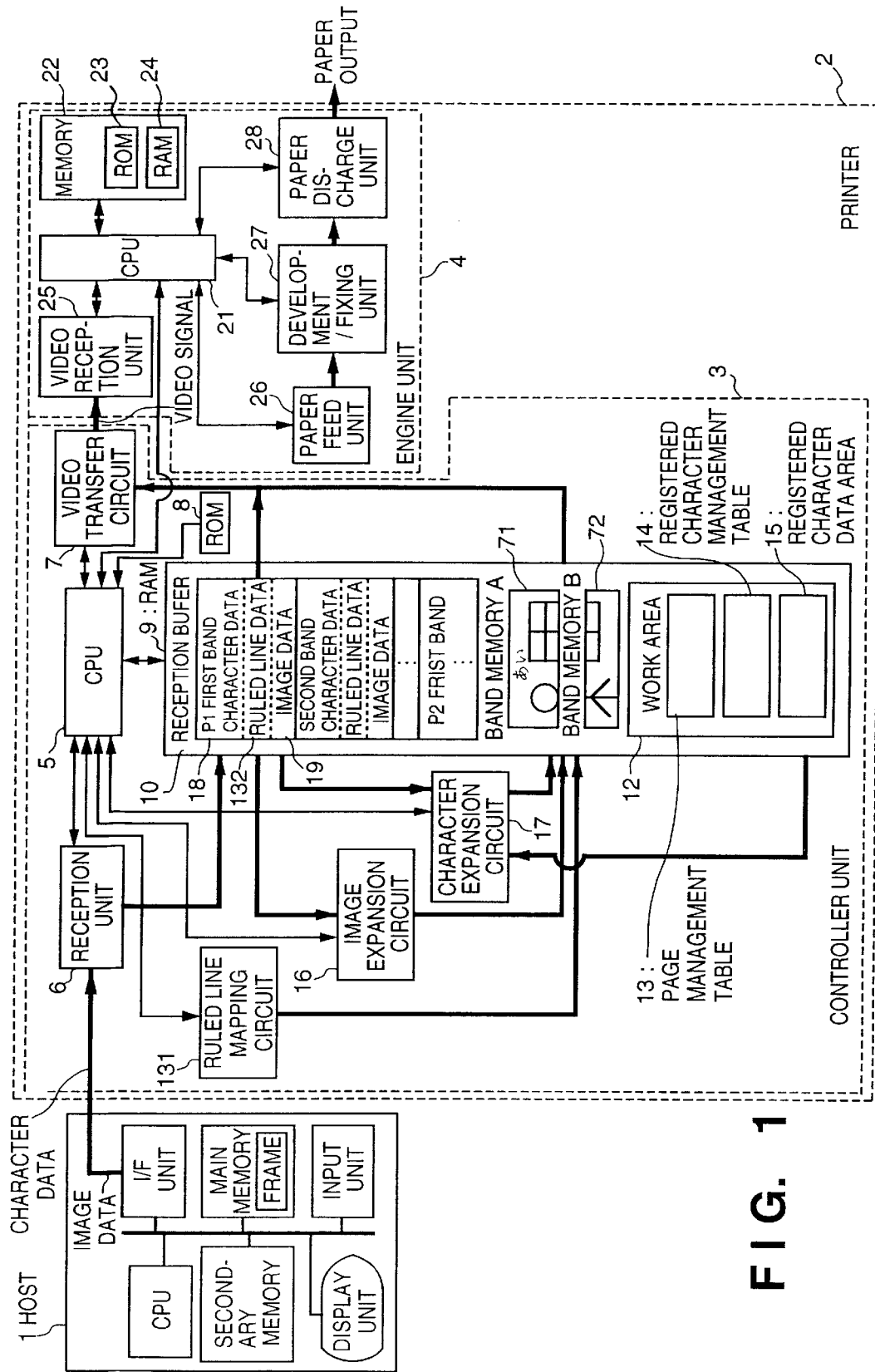
FIG. 1 is a block diagram for explaining the overall system according to the first embodiment of the present invention.

FIG. 1 is a block diagram for explaining the arrangement of the overall system.

A personal computer 1 serves as a host computer which generates character image data to be registered, a character code for instructing printing, data for instructing drawing of ruled lines, and compressed image data, and sends them to a printer 2. The printer body 2 comprises a controller unit 3 and the engine unit 4. The controller unit 3 receives character data, ruled line data, and image data sent from the host computer 1, maps the received data as image data in the raster format to generate a video signal, and sends the video signal to the engine unit 4. The engine unit 4 prints the video signal received from the controller unit 3 by transferring it onto a paper sheet, and discharges the paper sheet. Note that the printer 2 is a binary printer which expresses one pixel by one bit.

The controller unit 3 is constituted by a central processing unit (CPU) 5 for controlling the entire controller unit 3, a read-only memory (ROM) 8 which stores programs that describe the processing operations of the CPU 5, a random-access memory (RAM) 9, a reception unit 6 for receiving character data, ruled line data, and image data from the host 1, and setting the received data in a reception buffer 10 allocated in the RAM 9, a character expansion circuit 17 for expanding the received compressed character data and mapping the expanded data onto band memories 71 and 72, a ruled line mapping circuit 31 for mapping ruled lines onto the band memories 71 and 72 in accordance with an instruction of the received ruled line data, an image expansion circuit 16 for expanding the received compressed image data and mapping the expanded data onto the band memories 71 and 72, a video transfer circuit 7 for converting the images mapped on the band memories 71 and 72 into a video signal, and outputting the video signal to the engine unit 4, and the like.

Character data 18 indicate the already received character data, which are stored in the reception buffer 10 in units of bands in a page. Ruled line data 132 indicate the already received ruled line data which are stored in the reception buffer 10 in units of bands in a page. Image data 19 indicate the already received image data, which are stored in the reception buffer 10 in units of bands in a page.

The data received and stored in the reception buffer 10 are segmented in correspondence with 16 bands that define one page. In each band, character data, ruled line data, and image data included in that band are arranged. Of course, a driver on the host computer 1 outputs data in such arrangement to the printer 2.

In addition, the RAM 9 includes a work area 12 for programs, which includes a page management table 13 for managing the character data 18, ruled line data 132, and image data 19 in units of pages received in the reception buffer 10, a registered character data area 15 for storing compressed dot images in units of characters, a registered character management table 14 for managing registered character data, and the like.

Note that the contents of the received character data 18 include registered characters and character codes. For a character which appears first in the document to be printed on the host 1, compressed dot image data for one character, and the corresponding character code are sent as a registered character to the printer 2. Printing of subsequent registered characters as well as the printing instruction of the character which appears first in the document is instructed by character codes.

The registered character temporarily received in the reception buffer 10 is transferred to and saved in the registered character data area 15. When printing of the saved character is instructed by a character code, the registered character data corresponding to that character code is read out from the registered character data area 15, is expanded by the character expansion circuit 17, and is mapped on the band memories 71 and 72.

The ruled line data 132 is mapped on the band memories 71 and 72 by the ruled line mapping circuit 31, and the compressed image data 19 is expanded and mapped on the band memories 71 and 72 by the image expansion circuit 16.

Note that two band memories 71 and 72 are allocated on the RAM. While image data on the band memory (A) 71 is transferred as a video signal to the engine unit 4, character, ruled line, and image data are mapped on the band memory (B) 72. By contrast, while image data on the band memory (B) 72 is transferred as a video signal to the engine unit 4, character, ruled line, and image data are mapped on the band memory (A) 71. Such operations are alternately repeated to complete printing for one page. The height of image data stored in the band memories 71 and 72 is considered to be that of each of strip patterns obtained by equally laterally segmenting one page of a paper sheet at the portrait position into 16 portions.

The video transfer circuit 7 alternately converts image data in the band memories 71 and 72 into video signals, and transfers the video signals to the engine unit 4. As another function, when data for a certain band sent from the driver is that for a blank band including no data, the video transfer circuit 7 inhibits a video signal for that portion from being transferred to the engine unit 4. As still another function, when data for a certain band sent from the driver includes a single image block alone, the video transfer circuit 7 does not map that compressed image block data onto the band memory 71 or 72 but simultaneously expands it to image data and converts the image data into a video signal to be transferred to the engine unit 4. That is, the video transfer circuit 7 has three different functions. These functions are enabled in accordance with an instruction from the CPU 5.

Note that image data transferred from the host 1 to the printer 2 will be referred to as block image data to distinguish it from image data mapped by the printer.

The CPU 5 of the controller unit 3 can use an inexpensive product with not so high processing performance, since it need only perform memory management using the reception buffer 10, page management table 13, registered character management table 14, and the like in the RAM 9.

The engine unit 4 will be described below. The engine unit 4 comprises a CPU 21 and memory 22. The memory 22 includes a ROM 23 which stores control programs, and a RAM 24 used as a work area for the programs. A video reception unit 25 receives a video signal from the controller unit 3. A development/fixing unit 27 forms an image on the basis of the video signal, and transfers the formed image onto a paper sheet. A paper feed unit 26 functions to feed an unused blank paper sheet from a paper cassette or the like, the development/fixing unit 27 transfers and fixes an image onto a paper sheet, and a paper discharge unit 28 discharges the printed paper sheet.

Note that the bold arrows in FIG. 1 indicate the flows of the character data, ruled line data, image data, and video signal in the controller unit 3, and the flow of a paper sheet in the engine unit 4. The thin arrows indicate control exchange processes among the individual units. The CPU 5 of the controller unit 3 and the CPU 21 of the engine unit 4 exchange information with each other. The information to be exchanged is associated with control of print processing such as video transfer, paper feed, and the like.

Principle of Video Signal Output

Figure 2:
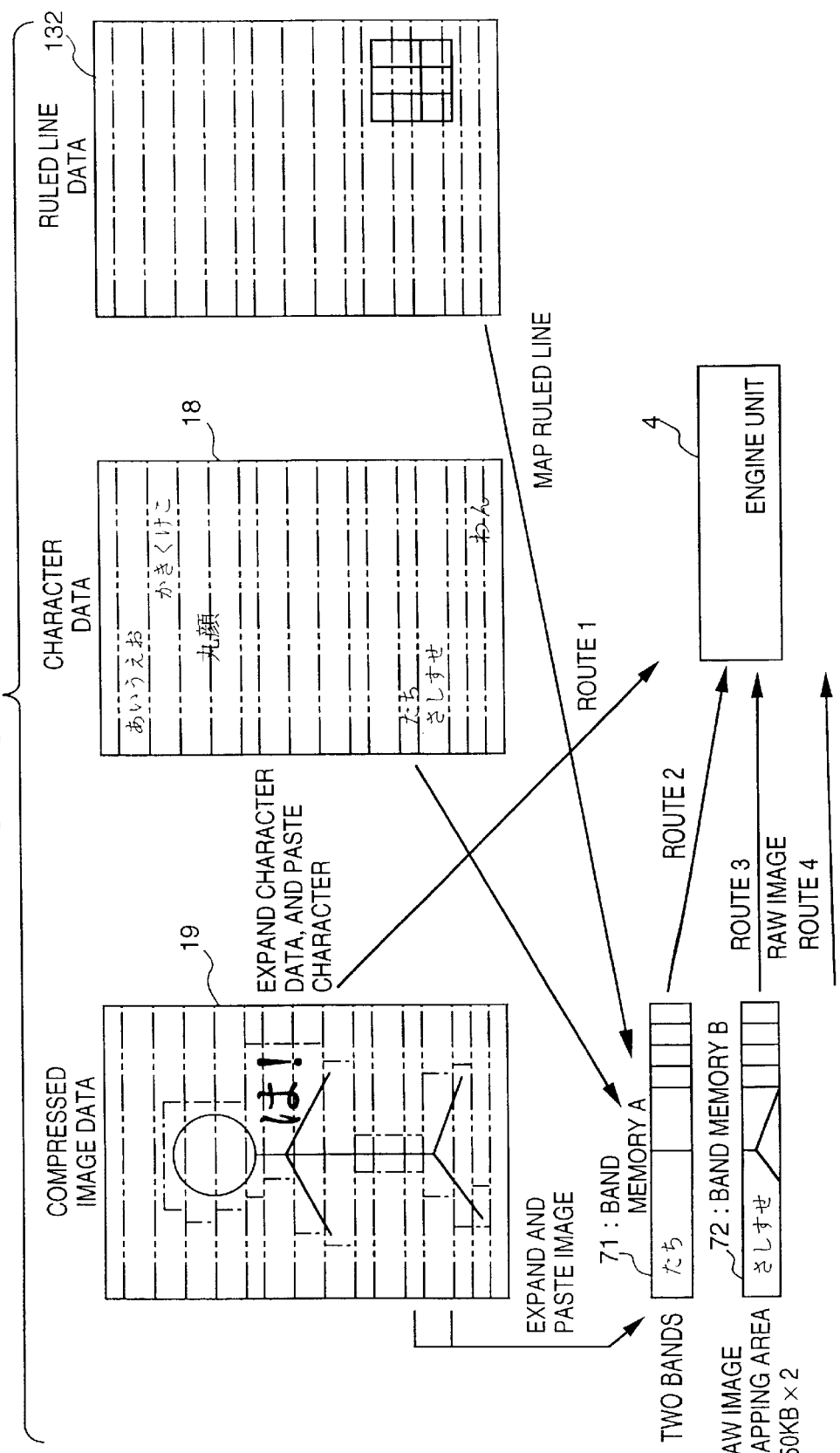
FIG. 2 is an explanatory view of the principle of synthesizing image data, character data, and ruled line data.

FIG. 2 is an explanatory view of the principle of output of image data in units of bands, each of which is obtained by synthesizing image, character, and ruled line data, to the engine unit 4, in the controller unit 3 in the printer 2.

As has been partially described above with the aid of FIG. 1, the driver on the host 1 divides the document to be printed into a character portion, a ruled line portion, and a portion other than these portions. The portion other than the character and ruled line portions is mapped as an image on a frame buffer on the host 1. The character data portion, ruled line data portion, and image data portion are separately transferred to the printer 2 in units of bands obtained by segmenting one page into 16 bands. In this case, the character data portion is transferred in such a manner that data obtained by compressing character dot patterns are sent to and registered in the printer to be able to be identified by character codes, and a character code sequence including the character code and positions is then sent as print data. A character need only be registered once in each document (i.e., one print job). The registered characters are deleted upon completion of printing of one document.

The 16 divided bands have an equal height. That is, the bands are equally divided.

As for characters extending across two bands, their print codes are transferred from the driver to the printer 2 as they belong to these two bands.

As for a large character (a character with a large data size), the character is mapped as image data on the host 1, and the image data is transferred from the driver to the printer 2 as a part of block image data.

A single ruled line is defined by "an elongated rectangular area which is painted in black and extends in a predetermined direction". Being defined this way, the coordinates of a pair of opposing vertices of the rectangular area are transferred as single ruled line data. When a single ruled line extends across two or more bands, ruled line data of rectangles obtained by segmenting the original ruled line into corresponding bands are generated, and are transferred to the printer 2.

Image data for one page mapped on the frame buffer on the host 1 is divided into 16 bands. Furthermore, only a rectangular portion that actually includes an image in each band is extracted and compressed. A set of compressed image data is transferred as a single block image from the driver of the host 1 to the printer 2. In FIG. 2, only the portions bounded by dotted lines of image data are actually transferred as image blocks.

When a certain band includes all the block image data, character data, and ruled line data, the controller unit 3 of the printer 2 expands the received compressed image data 19 using the image expansion circuit 16 and maps the expanded data onto the band memory 71 or 72. Also, the controller unit 3 expands the registered compressed character image data of characters, printing of which is directed by the received character data 18, using the character expansion circuit 17, and maps them on the band memory 71 or 72. Furthermore, the controller unit 3 maps the received ruled line data 132 onto the band memory 71 or 72 using a ruled line mapping circuit 131.

When the generated character image data and ruled line image data are mapped on the band memory, the ORs of these data and those already written in the band memory are written.

Upon completion of mapping of character, ruled line, and image data onto the band memory 71, the CPU 5 directs the video transfer circuit 7 to transfer a video signal to the engine unit 4, and maps character, ruled line, and block image data onto the band memory 72 during output of the video signal by the circuit 7. Upon completion of mapping of image data onto the band memory 72, and completion of video output from the band memory 71 that has been directed previously, the CPU 5 directs the video transfer circuit 7 to output a video signal from the band memory 72. Then, the CPU 5 starts mapping of character, ruled line, and block image data onto the band memory 71.

By alternately repeating mapping of character, ruled line, and block image data and output of a video signal with respect to the two band memories, one page is printed.

The same applies to a band which includes character data, ruled line data, or block image data alone.

In case of a blank band which includes none of character, ruled line, and block image data, the CPU 5 directs the video transfer circuit 7 not to transfer any video signal to the engine unit 4 for a duration corresponding to the band height.

If a certain band includes only image block data alone, the CPU 5 directs the video transfer circuit 7 to expand the image block data and to output a video signal to the engine unit 4. That is, video transfer to the engine unit 4 is directly done without image mapping onto the band memories 71 and 72.

In this manner, there are four output routes of a video signal to the engine unit 4: ① a route from the video transfer circuit 7 without any intervention of the band memories when a band includes an image alone; ② a route from the band memory 71; ③ a route from the band memory 72; and ④ no video signal is transferred for a blank band.

FIG. 2 illustrates that the video signals are output via these four routes. Printing for one page is done by a combination of these routes.

Figure 3:
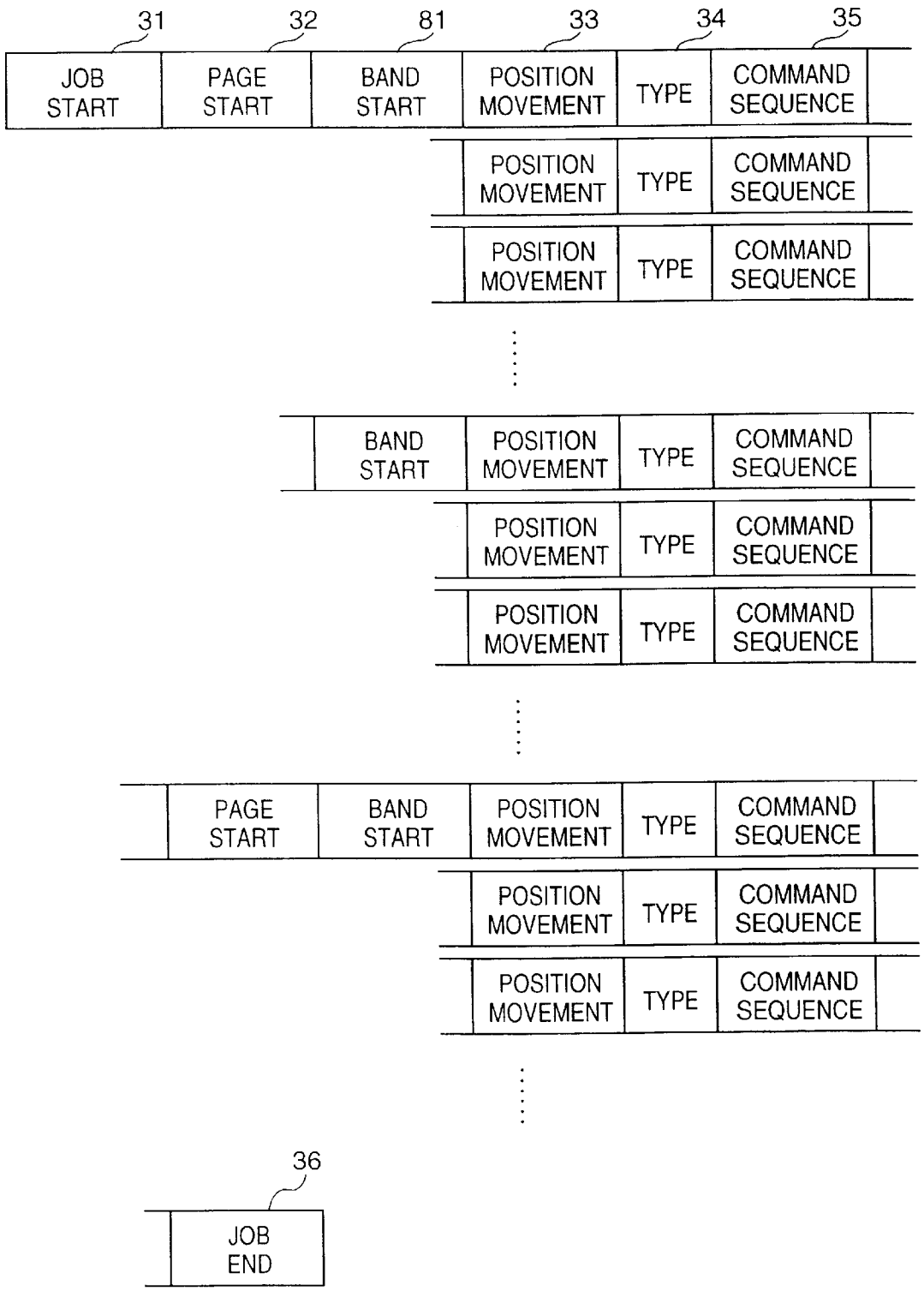
FIG. 3 is an explanatory view of the command structure.

FIG. 3 is an explanatory view of the command structure of character data, ruled line data, and image data to be sent from the host 1 to the printer 2.

The command structure includes, in turn, a job start command 31 at the beginning of the structure, page start commands 32 in units of pages, and band start commands 81 in units of bands in each page. Sixteen band start commands 81 repetitively appear per page. The band start command 81 is issued even for a band including none of character, ruled line, and image data.

Furthermore, the command structure includes, in units of bands, a position movement command 33 of a pointer indicating the print position, a type command 34, and a command sequence 35. The type command 34 identifies the type of command sequence 35 that follows. The command sequence 35 has several types: a type for making character registration, type for instructing character printing, type for instructing ruled line drawing, type for instructing block image printing, and the like. The types of command sequence 35 will be described in detail later with reference to FIG. 4. Groups of commands after the page start command 32 repetitively appear in correspondence with the number of pages of the document to be printed, and print commands for one document end in response to a job end command 36.

In FIG. 3, the position movement command 33 is always set before the type command 34, but is not always required. For example, when the type command 34 and command sequence 35 pertain to only registration of a character, the position movement command 33 is not necessary.

Figure 4:
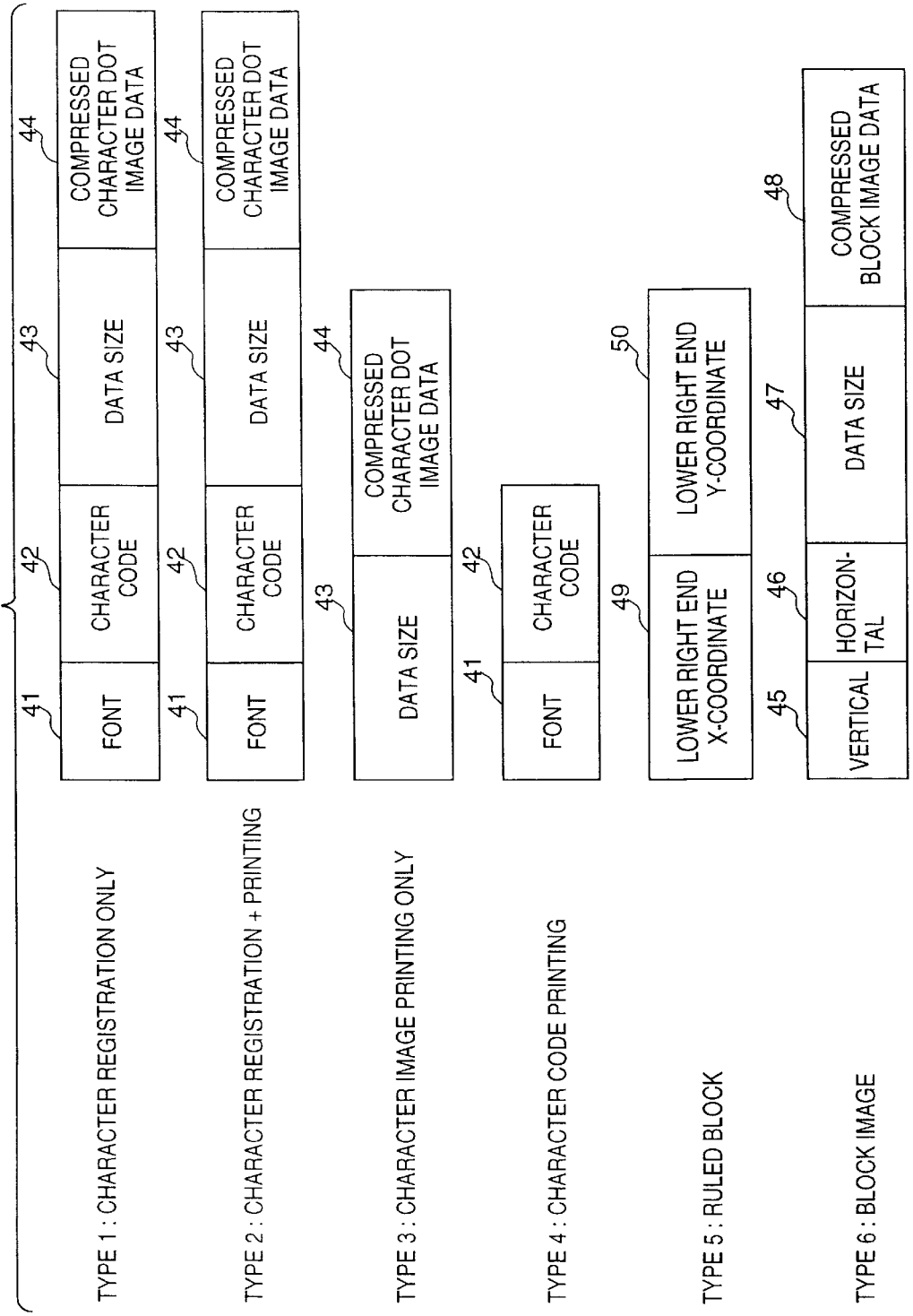
FIG. 4 is an explanatory view of the structures of command sequences.

FIG. 4 is an explanatory view of the structures of command sequences 35 in units of values of the type command 34.

When the type command 34 assumes a value "1", it indicates a "character registration only" command sequence. As the contents of the command sequence 35, a font number 41, character code 42, and data size 43 appear in turn, and compressed character dot image data 44 is set at the end of the sequence.

Character data to be registered are classified in units of fonts, and are registered in the registered character data area 15 on the RAM 9 to have one-to-one correspondence with character codes. More specifically, such classification, association, and the like are managed on the registered character management table 14.

When the type command 34 assumes a value "2", it indicates a "character registration+printing" command sequence. This command sequence instructs both registration and printing of a character. The format of the command sequence 35 at that time is the same as that of the type command 34=1. A character code 42 in this case implies code assignment of a character to be registered, and also a printing instruction of the already registered character.

When the type command 34 assumes a value "3", it indicates a "character image printing only" command sequence. That is, character dot image data is printed without being registered. The command sequence 35 includes only compressed dot image data 44 after a data size 43.

When the type command 34 assumes a value "4", it indicates a "character code printing" command sequence. As the contents of the command sequence 35, only a character code 42 follows a font number 41. The controller unit 3 looks up the registered character management table 14 using the font number 41 and character code 42 to find target registered character data from the registered character data area 15, expands the found data using the character expansion circuit 17, and maps it onto the band memory 71 or 72.

When the type command 34 assumes a value "5", it indicates a "ruled line drawing" command sequence. The contents of the command sequence 35 include an X-coordinate 49 of the lower right vertex of a rectangle that defines a single ruled line, and a Y-coordinate 50 of the lower right vertex.

When the type command 34 assumes a value "6", it indicates an "image block paste" command sequence. As the contents of the command sequence 35, a vertical size 45 of a block image, a horizontal size 46 of the block image, and a data size 47 appear, and compressed block image data 48 is set at the end of the sequence. The controller unit 3 expands the compressed block image data using the image expansion circuit 16, and maps it on the band memory 71 or 72.

These six different type commands 34 are used.

Figure 5:
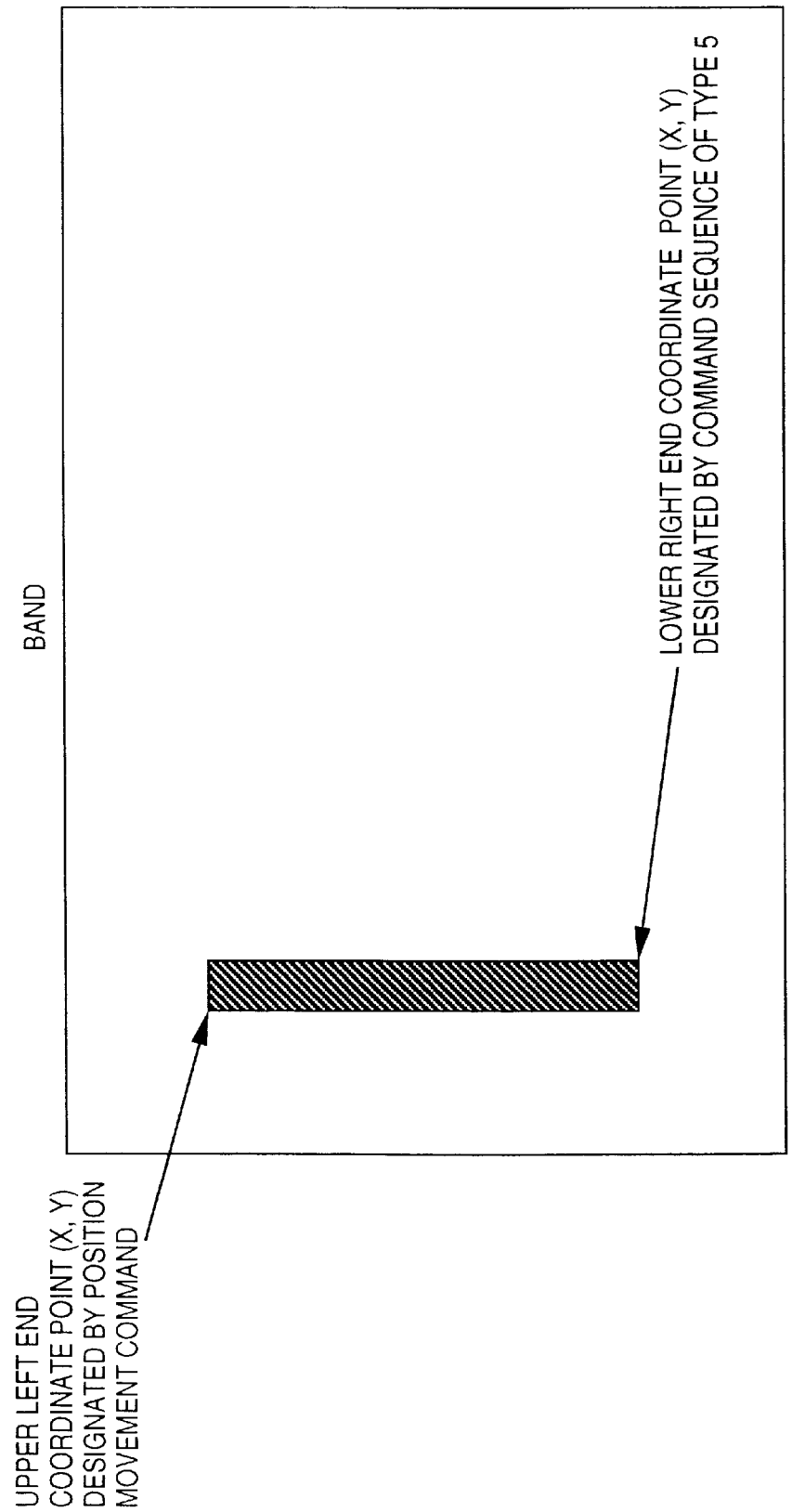
FIG. 5 is an explanatory view of coordinate designation of a ruled line.

FIG. 5 is an explanatory view when drawing of a single ruled line is instructed by a command sequence. A single ruled line is an elongated rectangle. The coordinate point of the upper left vertex of the rectangle is pointed by the position movement command 33, and the coordinate point of its lower right vertex is pointed by the X- and Y-coordinates 49 and 50 of the lower right vertex in the command sequence 35 when the type command 34="5".

Figure 6:
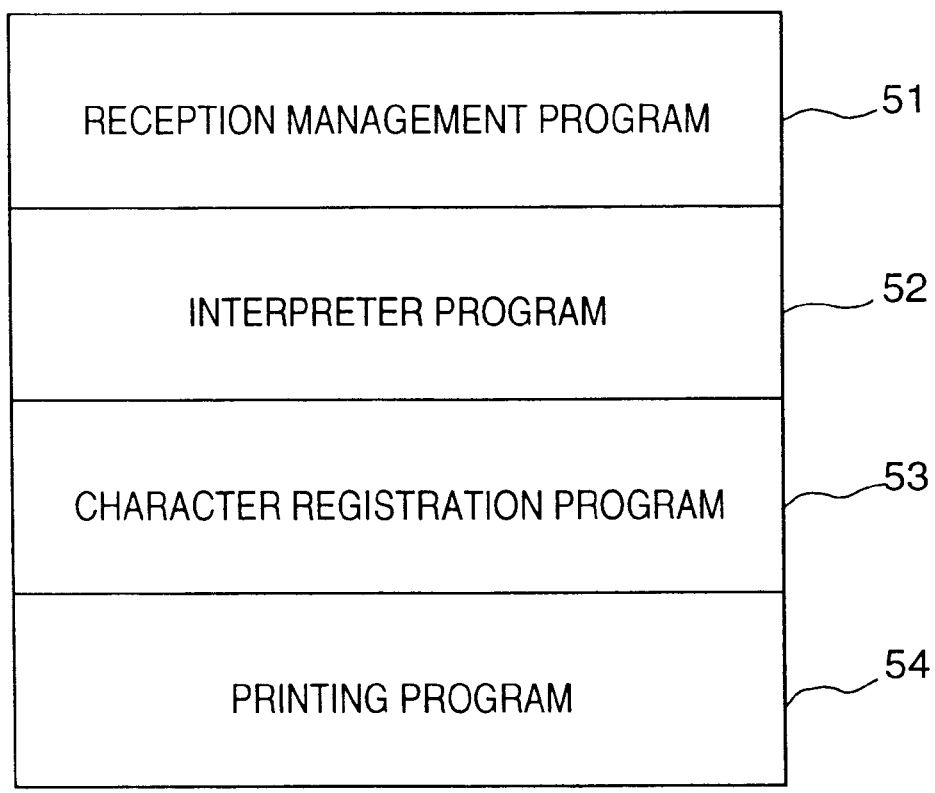
FIG. 6 is a view for explaining programs installed in a ROM.

FIG. 6 is a view for explaining the programs installed in the RAM 9 of the controller unit 3.

A reception management program 51 manages character, ruled line, and block image data in units of pages stored in the reception buffer 10 using the page management table 13. Also, the program 51 instructs the reception unit 6 of the write position of the received data on the reception buffer 10.

An interpreter program 52 interprets character data stored in the reception buffer 10, i.e., character registration commands and character printing commands, ruled line data, i.e., commands for instructing ruled line drawing, and block image data, i.e., block image paste commands. The program 52 instructs a character registration program 53 to execute character registration, instructs a printing program 54 to execute character mapping onto the band memory 71 or 72, maps a ruled line onto the band memory 71 or 72, and pastes an image onto the band memory 71 or 72.

Upon completion of mapping of character, ruled line, and block image data onto the band memory 71 or 72, the interpreter program 52 instructs transfer of image data in the band memory 71 or 72 to the engine unit 4 and execution of printing from the engine unit 4. For the paper discharged page, the program 52 deletes the data of that page from the reception buffer 10. Deletion is done by only erasing registration of the paper discharged page from the page management table 13. That is, the program 52 does not actually clear any data on the reception buffer 10.

In summary, the interpreter program 52 performs interpretation in units of bands, video output in units of bands, and paper discharging.

The operations of the individual programs will be described in detail with reference to the flow charts (to be described later).

Note that the reception management program 51 and interpreter program 52 are started simultaneously when the power switch of the printer is turned on, and wait for data transmitted from the host 1. These two programs continue multitask operations until the power switch of the printer is turned off.

Figure 7A:
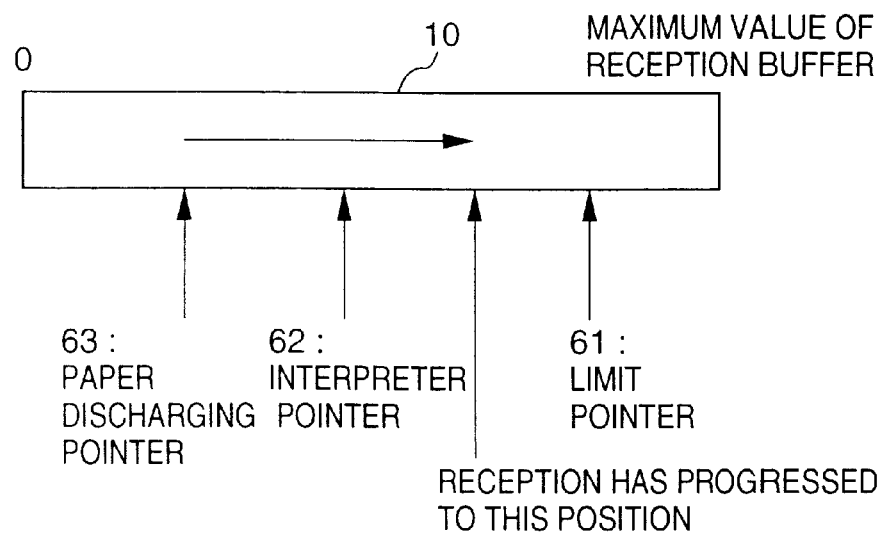
FIGS. 7A and 7B are explanatory views of pointers of a reception buffer.
Figure 7B:
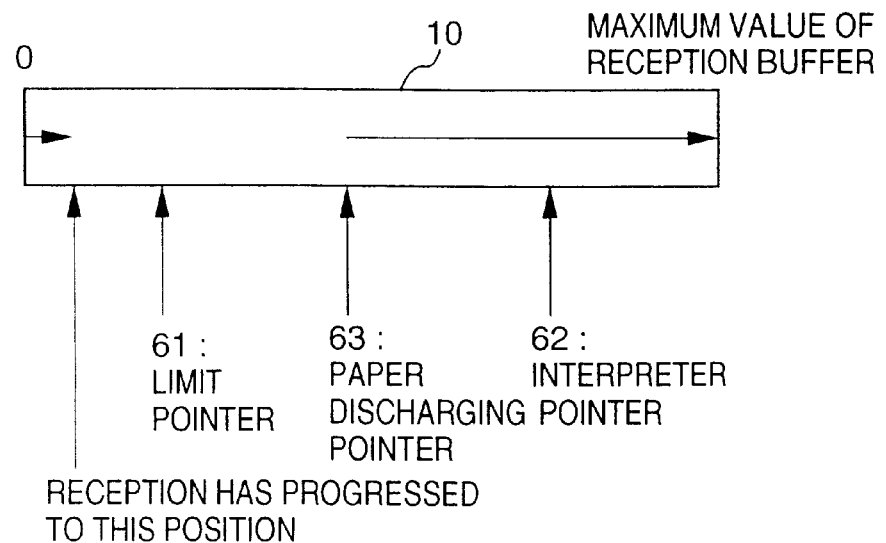

FIGS. 7A and 7B are views for explaining the positional relationship among pointers while a write of the received data is in progress. The reception buffer 10 has a so-called "ring buffer" structure.

The reception management program 51 instructs the reception unit 6 of a limit pointer 61 in advance, and a direct write of the received data is granted up to the position of the limit pointer 61 in the reception buffer 10. The write position itself, which is incremented in units of bytes, is managed by the reception unit 6.

Referring to FIG. 7A, immediately after the printer 2 is started, the limit pointer 61 matches the maximum value position of the reception buffer 10, i.e., the end address of the area on the reception buffer 10. However, in FIG. 7A, the limit pointer 61 is set slightly before the maximum value of the reception buffer 10, for the purpose of description. This state indicates that the received data has been written by the reception unit 6 up to a position slightly before the limit pointer 61.

As for the received data, the interpreter program 52 executes data interpretation, mapping of character, ruled line, and image data onto the band memory 71 or 72, video transfer to the engine unit 4, and printing by the engine unit 4 in turn or parallelly. An interpreter pointer 62 is set at the data position of a page for which paper discharge instruction to the engine unit 4 is complete. After that, a paper discharge pointer 63 is set at the data position of a page for which paper discharging is normally completed. As for a portion of the received data before the address of the paper discharge pointer 62, since the corresponding paper sheets have already been discharged, and the data stored therein are unnecessary, this portion is "erased", and newly received data can be written. Upon "erasing", the data are not actually cleared but newly received data are overwritten.

Note that the interpreter pointer 62 and paper discharge pointer 63 are set in units of pages. The interpreter program 52 can detect the page boundary position and the like on the reception buffer 10 by looking up the page management table 13 created and managed by the reception management program 51.

When the received data have been written up to the position of the maximum value of the reception buffer 10, the reception management program 51 instructs the reception unit 6 to move the limit pointer 61 to a position near the start address of the reception buffer 10, and the write position of the received data by the reception unit 6 returns to the start address portion. FIG. 7B shows the state wherein the write position of the received data has returned to the start address position, and a write of the received data has progressed slightly from the start address position. That is, so-called "ring buffer" operation is done.

The limit pointer 61 is updated in the following procedure. When the reception unit 6 has written the received data up to the position of the limit pointer 61, it informs the reception management program 51 that "write has reached the limit and no more data can be written". That is, the reception unit 6 requests the reception management program 51 to update the limit pointer 61. Upon receiving the request, the reception management program 51 examines the paper discharge pointer 63 to check the presence/absence of a new empty area. Then, the program 51 instructs the reception unit 6 of the current position of the paper discharge pointer 63 as the new position of the limit pointer 61. In this fashion, the reception unit 6 can write received data from an old position to a new position of the limit pointer 61.

Note that the reception unit 6 communicates with the reception management program 51 not only when "the write position has reached the limit pointer 61" but also when "it detects a job start command 31, page start command 32, job end command 36", and the like from the received data. With this communication, the reception management program 51 can manage received pages while allowing the reception unit 6 to take control of actual reception jobs, i.e., control of signal lines and writes of received data in a memory.

Note that the reception unit 6 has a mechanism for directly writing data received from the host 1 in the reception buffer 10 at high speed, i.e., a so-called DMA (dynamic memory access) reception circuit. This circuit incorporates a FIFO (first-in, first-out) buffer. Image data sent from the host 1 is temporarily stored in this FIFO buffer, and is then written at the write position on the reception buffer 10 designated by the reception management program 51 at high speed. Since such circuit is the state-of-art technique, a detailed description thereof will be omitted.

The work area 12 includes the page management table 13, registered character management table 14, registered character data area 15, and the like, but a description of their detailed internal structures will also be omitted. However, these tables and areas have efficient structures so as not to consume excessive memory capacities.

Formulas 1 below include some for obtaining the times required for mapping a character and ruled line on a single band.

Equations 1

(a) Mapping time for one character=$C1 \times$square of character size [dots]

(b) Mapping time for one ruled line=$\{C2 \times (2$ or $1$ or $0)+C3 \times$length [bytes]$\}$ of overwrite area$\times$height [dots] of ruled line (c) Total image mapping time=mapping time of single block image that has size equal to one band and cannot be compressed (d) Total time per band<allowable mapping time per band Note that C1, C2, and C3 are constants, and are respectively a coefficient for mapping a character, a coefficient for mapping a ruled line, calculating the OR of the ruled line and the already written data, and writing the OR, i.e., used upon OR-write, and a coefficient for mapping a ruled line and writing it while ignoring the already written data, i.e., used upon overwrite. "(2 or 1 or 0)" in formula (b) indicates the number of bytes to be OR-written. The controller unit 3 in the printer 2 has a predetermined "allowable time per band" used for mapping character, ruled line, and block image data". When the driver on the host 1 generates character data or ruled line data to be sent to the printer 2 in units of bands, it sums up the mapping times obtained by formulas 1 in units of characters and ruled lines. When the total mapping time exceeds the "allowable mapping time per band", the subsequent characters or ruled lines are processed as a block image.

Note that one block image is permitted per band. Hence, the mapping time for a block image is determined assuming a block image which has a size equal to that of one band and cannot be compressed, and is assigned as such for every block images. That is, the worst case is taken into consideration.

Formulas 1 for a character and ruled lines will be described below. The mapping time per character is simply calculated assuming that it is proportional to the area of a character. That is, the mapping time per character is proportional to the square of the character size in units of dots. In this case, all characters are assumed to be OR-written.

Since a ruled line is an elongated rectangular area, it is divided into a portion that must be OR-written and a portion that can be overwritten. The mapping time per ruled line is a total of the processing times of these portions. This processing will be explained in detail later with reference to FIGS. 8 and 9.

In order to OR-write a ruled line, 1-byte image data at the mapping position is sampled from the band memory 71 or 72 to an internal 1-band buffer of the ruled line mapping circuit 131. This 1-byte data corresponds to eight continuous pixels in the main scan direction. The OR of the 1-byte data and 1-byte ruled line image data to be drawn at that position is calculated. The obtained 1-byte data is returned to the original position on the band memory 71 or 72. For this reason, a long processing time is required. On the other hand, an overwrite requires only a short processing time since ruled line image data is merely directly written on the band memory 71 or 72.

As described above, the mapping time required for a ruled line is calculated while being separated into the time required for an OR-write portion and the time required for an overwrite portion. The reason why the character or the right and left end portions of the ruled line must be OR-written is that the controller unit 3 may map a character, ruled line, and block image to overlap each other after it clears the band memory 71 or 72.

Assume that a character or ruled line is not OR-written but overwritten on, e.g., an image that includes such character or ruled line. In this case, if a character overlaps the image, a portion corresponding to the character box on the image becomes a blank area, and the character is drawn on that portion. Hence, a poor print result is obtained.

Also, if a ruled line overlaps the image, in case of overwrite, portions less than eight pixels (1 byte) at the right and left ends of the ruled line become blank areas, resulting in a poor print result.

Although the user does not always instruct OR-write of an image, character, and ruled line on the application on the host 1, this embodiment uses OR-write which has little influences on the final print result.

Note that the entire ruled line may be OR-written. However, since 1-byte data other than the right and left end portions is a black portion (ffH), overwrite that requires only a short mapping time is preferably used.

Figure 8:
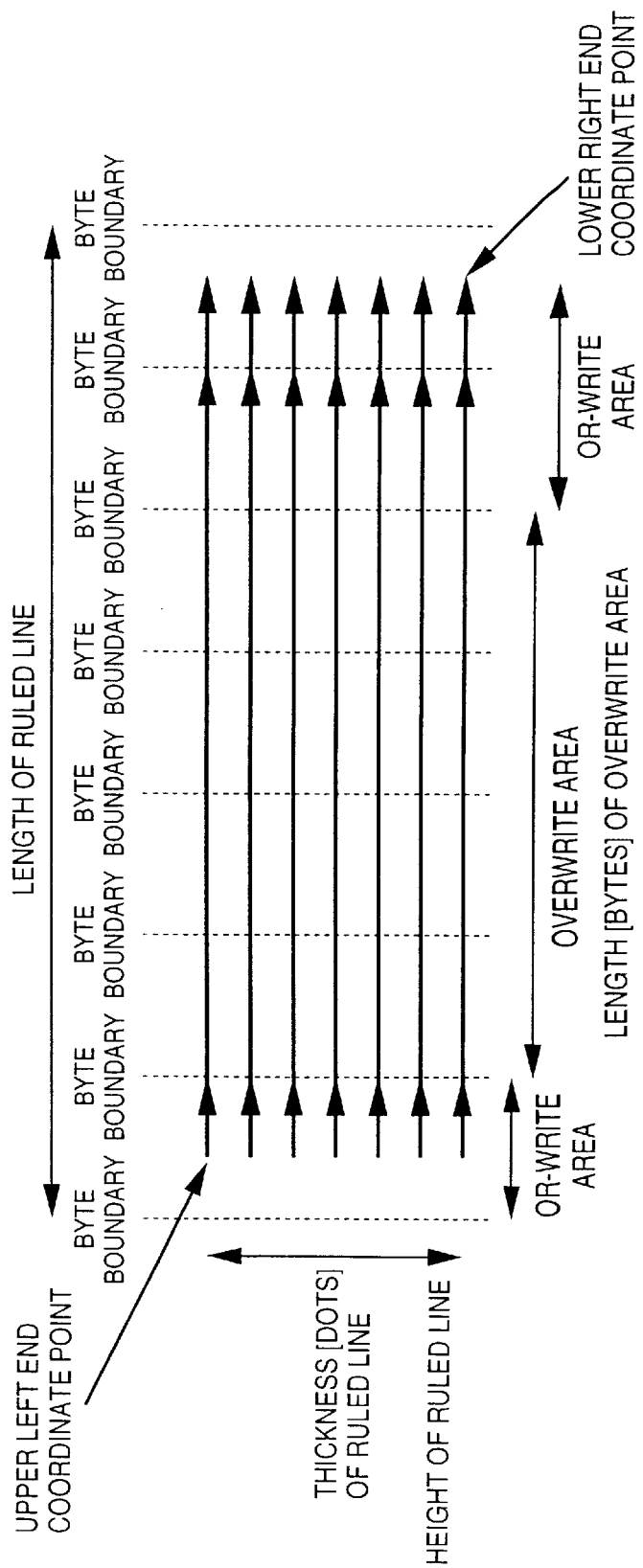
FIG. 8 is an explanatory view of drawing of a horizontal ruled line.

FIG. 8 is an explanatory view for calculating the mapping time per horizontal ruled line.

FIG. 8 shows a horizontally elongated ruled line which has a thickness of 7 dots, a length of 7 bytes, and right and left odd 1-byte portions. In this ruled line, the right and left 1-byte portions must be OR-written. Hence, in formula (b) in formulas 1, the value to be multiplied by the OR-write ruled line coefficient is 2. The middle 5-byte portion can be overwritten. In formula (b) in formulas 1, the length of the overwrite area to be multiplied by the overwrite ruled line coefficient is 5. Since the thickness of the ruled line is 7 dots, the height of the ruled line in formula (b) in formulas 1 is 7.

With these values, formula (b) in formulas 1 can yield the mapping time per horizontally elongated ruled line shown in FIG. 8.

Note that some ruled lines have no odd 1-byte portion, i.e., no OR-write area at the left or right end. In such case, the value to be multiplied by the OR-write ruled line coefficient in formulas 1 is 1 or 0 depending on the number of OR-write areas.

Figure 9:
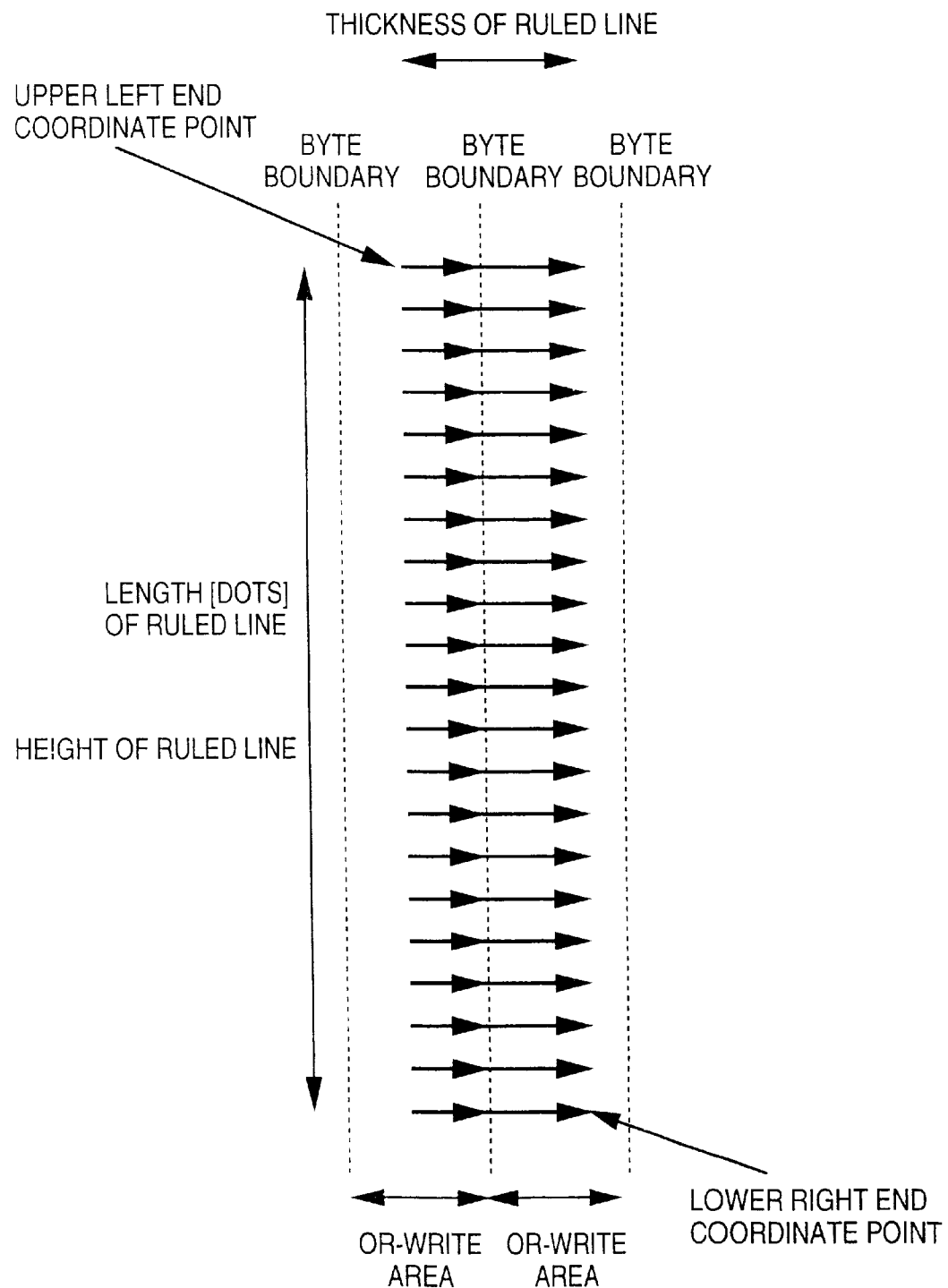
FIG. 9 is an explanatory view of drawing of a vertical ruled line.

FIG. 9 is an explanatory view for calculating the mapping time per vertical ruled line.

FIG. 9 shows a vertically elongated ruled line which has a length of 21 dots, a thickness of 2 bytes, and right and left odd 1-byte portions. In this ruled line, the right and left 1-byte portions must be OR-written. Hence, in formula (b) in formulas 1, the value to be multiplied by the OR-write ruled line coefficient is 2. This ruled line has no overwrite portion. Therefore, in formula (b) in formulas 1, the length of the overwrite area to be multiplied by the overwrite ruled line coefficient is 0. Although the ruled line has a length of 21 dots, the value "21" is multiplied as the height of the ruled line in formula (b) in formulas 1.

With these values, formula (b) in formulas 1 can yield the mapping time per vertically elongated ruled line shown in FIG. 9.

Note that some ruled lines have a small thickness which may fall within a 1-byte OR area. In this case, the value to be multiplied by the OR-write ruled line coefficient in formulas 1 is 1.

(b) Operation

The operation of the system according to the first embodiment of the present invention will be described below with reference to the flow charts.

Printer Driver Program

Figure 10:
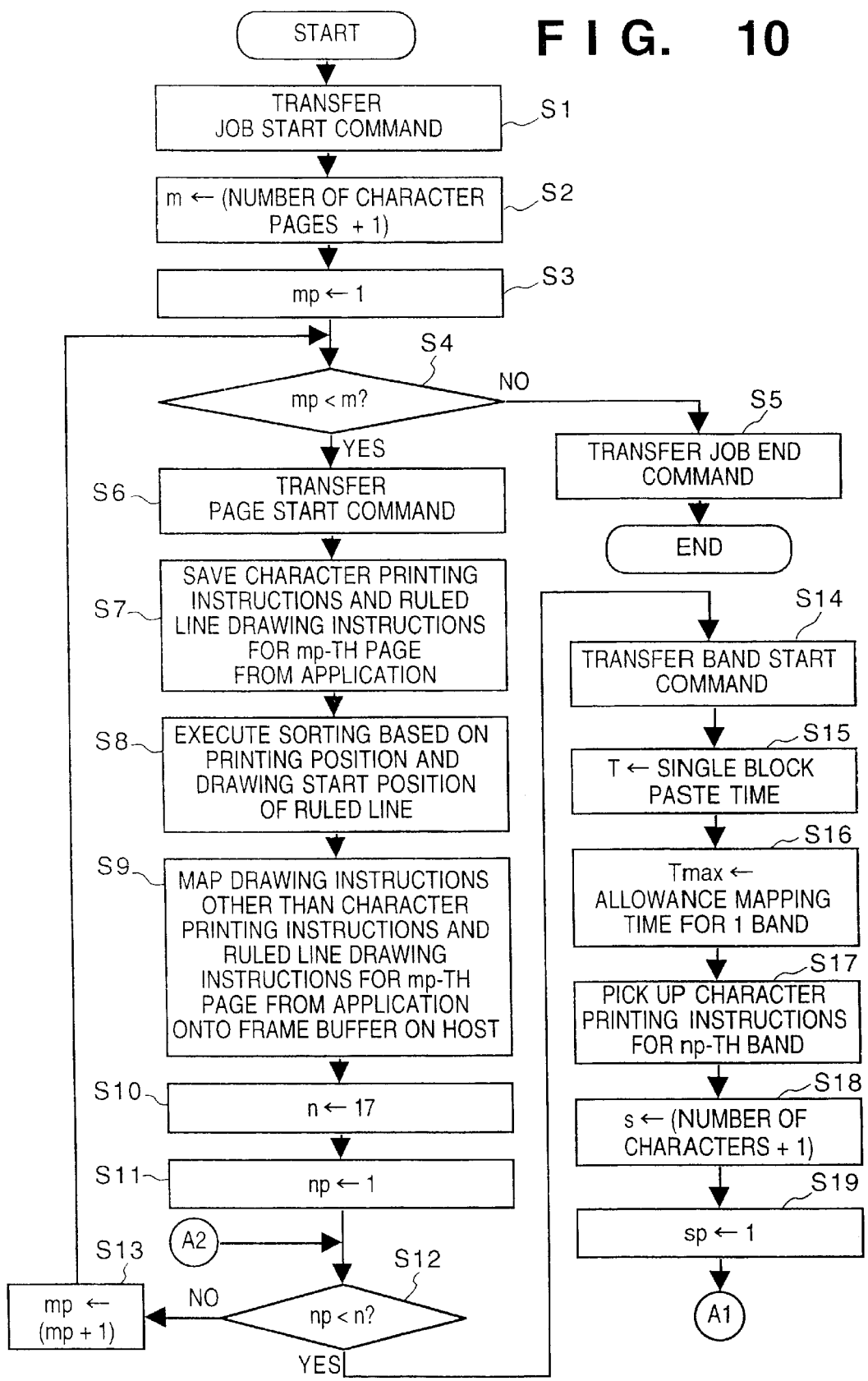
FIG. 10 is a flow chart for explaining the operation of a printer driver.
Figure 11:
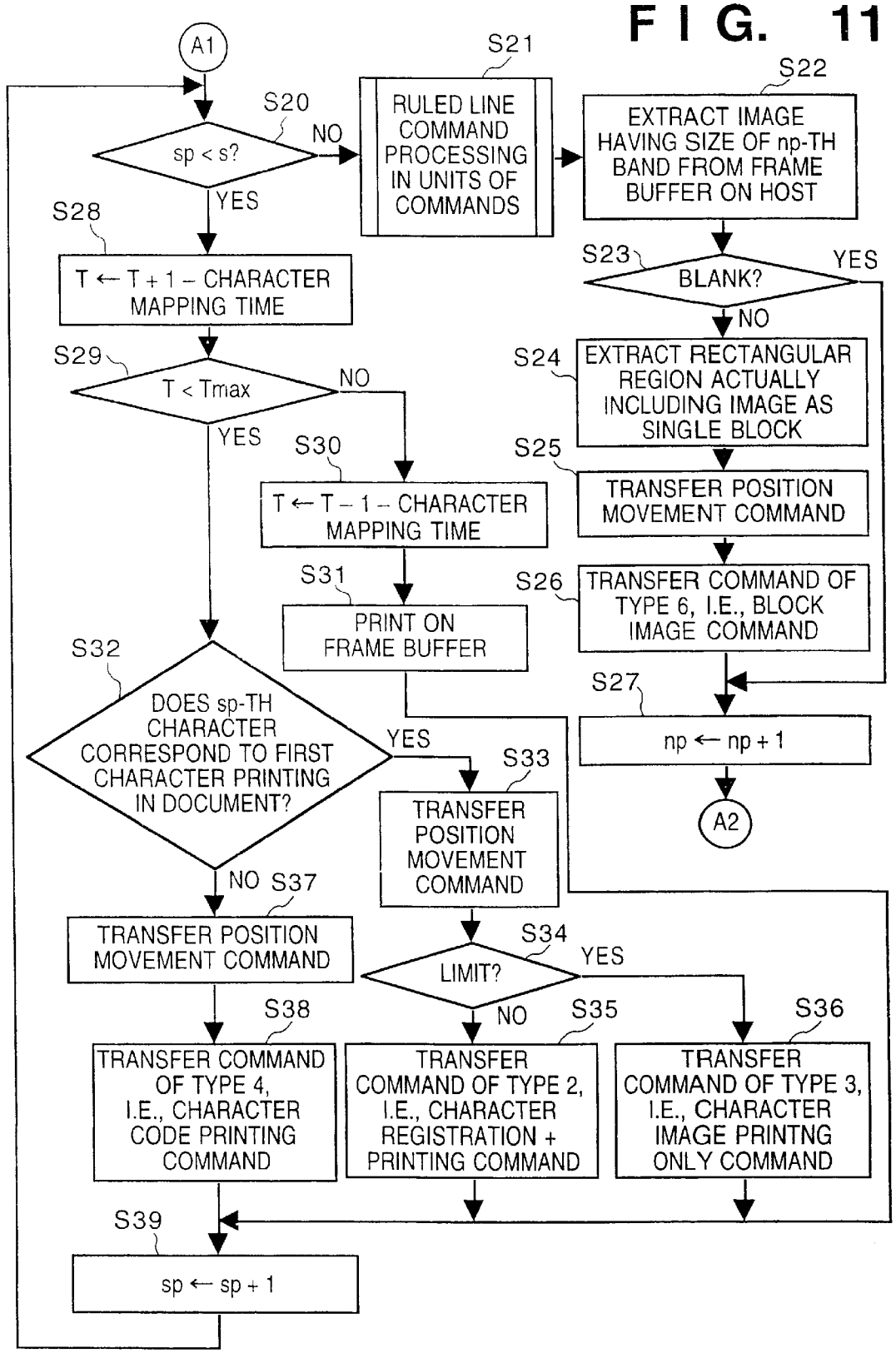
FIG. 11 is a flow chart for explaining the operation of the printer driver.

FIGS. 10 and 11 are flow charts for explaining the operation of the printer driver on the host 1. The printer driver generates character and block image printer commands described above with the aid of FIGS. 3 and 4 from document data created by an application software program used by the user, and transfers them to the printer 2. When the user instructs document printing from the application software program, the printer driver is started in the host 1.

At the time of starting, the driver assures a frame buffer as am image mapping area for one page on a memory of the host 1 and clears the frame buffer at the same time. Upon completion of document printing by the driver, the driver releases the memory area that has been used as the frame buffer.

The printer driver transfers a job start command 31 to the printer 2 in step S1, sets a value obtained by adding 1 to the number of pages of the document to be printed in a variable m in step S2, and sets 1 in a variable mp in step S3. The driver then checks in step S4 if the variable mp is smaller than the variable m. If NO in step S4, since processing of all the pages of the document is complete, the driver transfers a job end command 36 in step S5, thus ending its processing.

On the other hand, if YES in step S4, the driver transfers a page start command 32 to the printer 2 in step S6, saves character printing instructions and ruled line drawing instructions of the mp-th page from the application program in step S7, and sorts the saved character printing instructions and ruled line drawing instructions based on their print positions and draw start positions in step S8. Henceforth, the driver maps drawing instructions other than the character printing instructions and ruled line drawing instructions of the mp-th page from the application program onto the frame buffer on the host 1 in step S9. The drawing instructions other than the character printing instructions and ruled line drawing instructions include figure drawing instructions, image paste instruction, and the like.

In sorting of the character printing instructions or ruled line drawing instructions based on their printing positions or draw positions in step S8, such drawing instructions are sorted based on their draw start positions in the longitudinal direction of a paper sheet, and are then sorted based on their draw positions in the widthwise direction of the paper sheet. For example, when an A4-size paper sheet is set in the portrait position, the drawing instructions are sorted so that their printing or draw start positions are arranged in turn from the upper left position to the lower right position, and instructions having the same vertical positions are sorted in the order from the left to the right.

Subsequently, the driver sets 17 in a variable n in step S10. The value "17" is obtained by adding 1 to a value "16" which means that the paper size is equally divided into 16 bands in its longitudinal direction. The driver sets 1 in a variable np in step S11, and checks in step S12 if the variable np is smaller than the variable n. If NO in step S12, since it indicates that the processing for 16 bands of one page is complete, the variable mp is incremented by 1, and the flow returns to step S4 to start band output processing of the next page.

If YES in step S12, the driver transfers a band start command 81 to the printer 2 in step S14, and sets a paste time required for pasting a single block image onto a band in a variable T in step S15. This time assumes a fixed value that means the mapping time of a single block image, which has a size equal to that of a band and cannot be compressed, onto a band, as has been described above in the paragraphs of formulas 1.

In step S16, the driver sets an allowable time required for mapping a character, ruled line, and block image per band, which time is allowed by the controller unit 3, in a variable Tmax. This time is also a fixed value.

The driver picks up character printing instructions included in the np-th band from the saved printing instructions from the application program in step S17, sets a value obtained by adding 1 to the number of picked-up characters in a variable s in step S18, and sets 1 in a variable sp in step S19.

Note that the character printing instructions to be picked up in step S17 include those of characters which are included in the np-th band albeit partially. Hence, some characters are printed across two bands depending on their printing positions.

The driver checks in step S20 if the variable sp is smaller than the variable s. If NO in step S20, since transfer processing of all character data included in the np-th band is complete, the driver executes ruled line command processing in units of bands in step S21, and starts transfer processing of image data of the np-th band in step S22 and the subsequent steps.

The operation in step S21 will be described in detail later with reference to FIG. 12.

The driver extracts an image corresponding to the position and size of the np-th band from the frame buffer on the host in step S22, and checks in step S23 if the np-th band is a blank band. If YES in step S23, the flow jumps to step S27 without any processing.

If NO in step S23, the driver extracts a rectangular region actually including an image as a single block in step S24. The driver transfers a position movement command 33 indicating the paste position of the extracted block to the printer 2 in step 25, and then transfers a command sequence corresponding to a type command 34=6, i.e., block image commands 45, 46, 47, and 48, to the printer 2 in step S26. Of course, the block image data is transferred after being compressed.

The driver increments the variable np by 1 in step S27, and the flow then returns to step S12 to start the next band transfer processing.

If YES in step S20, the driver adds a 1-character mapping time of the character to be printed in the variable T in step S28, and checks in step S29 if the variable T is smaller than Tmax. If NO in step S29, the driver subtracts the 1-character mapping time added in step S28 from the variable T in step S30, and maps the character to be printed on the frame buffer in step S31. After that, the flow jumps to step S39.

Note that the 1-character mapping time added in step S28 is calculated by the formula described above in the paragraphs of formulas 1.

If YES in step S29, the driver checks in step S32 if the sp-th character is the first character to be printed in this document. If YES in step S32, the driver transfers a position movement command 33 indicating the printing position to the printer 2 in step S33, and checks in step S34 if the number of registered characters has reached a limit on the printer 2 side. If YES in step S34, the driver transfers a command sequence corresponding to a type command 34=3, i.e., character image printing only commands 43 and 44, to the printer 2 in step S36. Next, the flow advances to step S39.

If NO in step S34, the driver transfers a command sequence corresponding to a type command 34=2, i.e., character registration+printing commands 41, 42, 43, and 44, to the printer 2 in step S35, and the flow advances to step S39. Of course, a dot image for each character to be transferred to the printer 2 is compressed.

If NO in step S32, since it indicates that this printing instruction is the second or subsequent printing instruction of that character in the document, the driver transfers a position movement command 33 indicating the printing position to the printer 2 in step S37, and also transfers a command sequence corresponding to a type command 34=4, i.e., character code printing commands 41 and 42, to the printer 2 in step S38.

In step S39, the driver increments the variable sp by 1, and the flow then returns to step S20 to execute transfer processing of the next character data to the printer 2.

Ruled Line Command Processing Program

Figure 12:
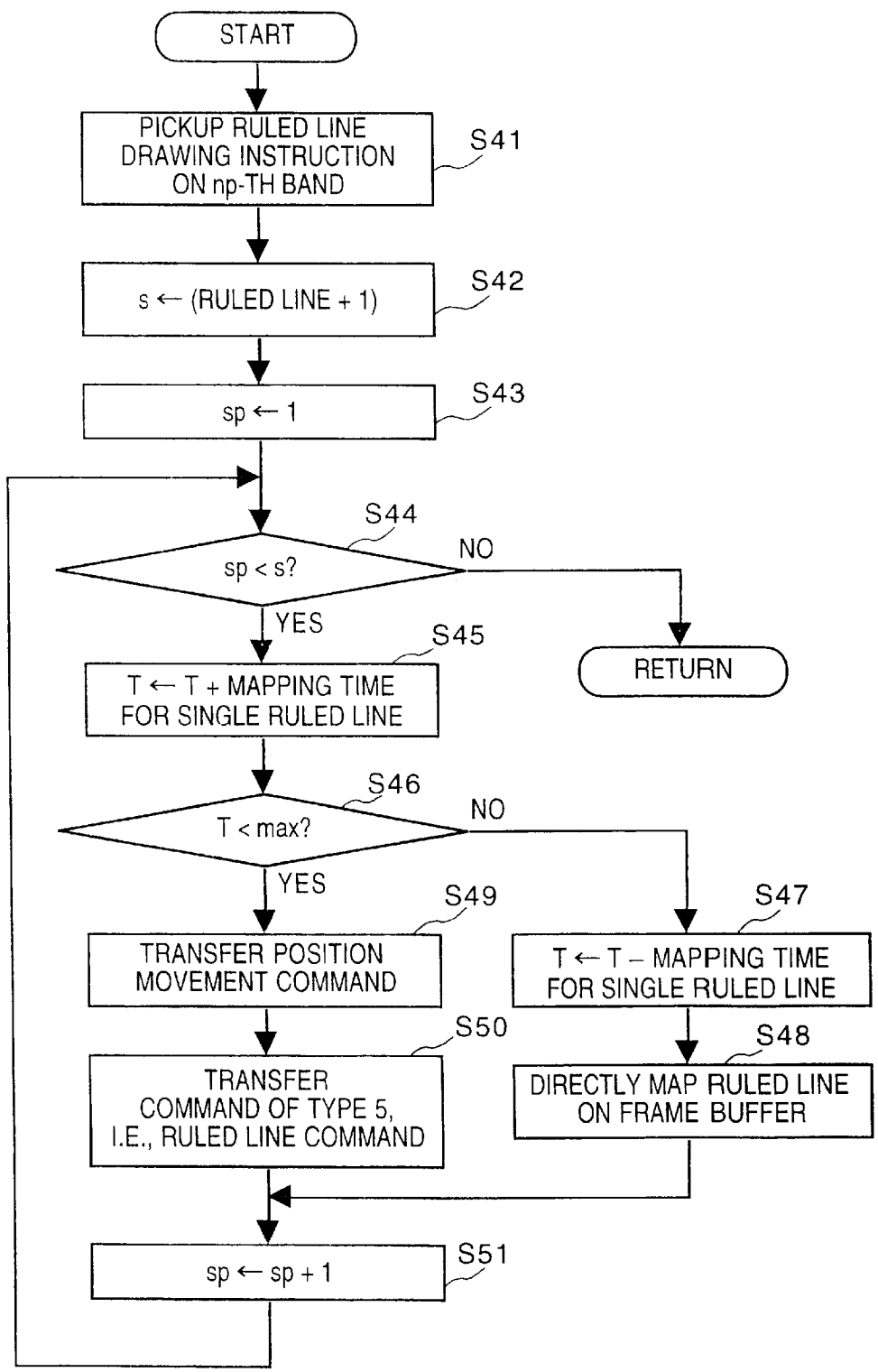
FIG. 12 is a flow chart for explaining ruled line processing in units of bands.

FIG. 12 is a flow chart for explaining the processing in step S21 in FIGS. 10 and 11, i.e., the operation of a ruled line command processing routine in units of bands in detail.

The driver picks up ruled line drawing instructions for the np-th band in step S41, sets a value obtained by adding 1 to the number of picked-up ruled lines in a variable s in step S42, and sets 1 in a variable sp in step S43.

The driver then checks in step S44 if the variable sp is smaller than the variable s. If NO in step S44, the flow returns to the main routine. If YES in step S44, the driver adds the mapping time of a single ruled line, the drawing command of which is about to be transferred to the printer 2, to the variable T in step S45. This ruled line mapping time is calculated by formulas 1 above.

The driver checks in step S46 if the variable T is smaller than the variable Tmax. If NO in step S46, the driver subtracts the mapping time of the single ruled line added in step S45 from the variable T in step S47, and directly maps the ruled line on the frame buffer on the host 1 in step S48. Henceforth, the flow advances to step S51.

On the other hand, if YES in step S46, the driver transfers a position movement command 33 in step S49, and also transfers a command sequence corresponding to a type command 34=5, i.e., ruled line commands 49 and 50 in step S50. As has been described above with the aid of FIG. 4, the ruled line commands 49 and 50 respectively represent the X- and Y-coordinates 49 and 50 of the lower right end of an elongated rectangle that defines the ruled line.

After that, the flow advances to step S51 to increment the variable sp by 1, and the flow returns to step S44 to start the processing for the next ruled line.

Note that the ruled line commands to be transferred to the printer 2 in step S50 define an elongated rectangle included in the band area. Even if a ruled line is, e.g., a long one that extends from the upper end to the lower end of a page when the driver received a ruled line instruction from the application, such ruled line is segmented into small ruled line commands in units of bands when the commands are transferred to the printer 2.

In step S48, the driver directly draws a ruled line on the frame buffer. In this case, the ruled line is drawn within the band area.

Figure 13:
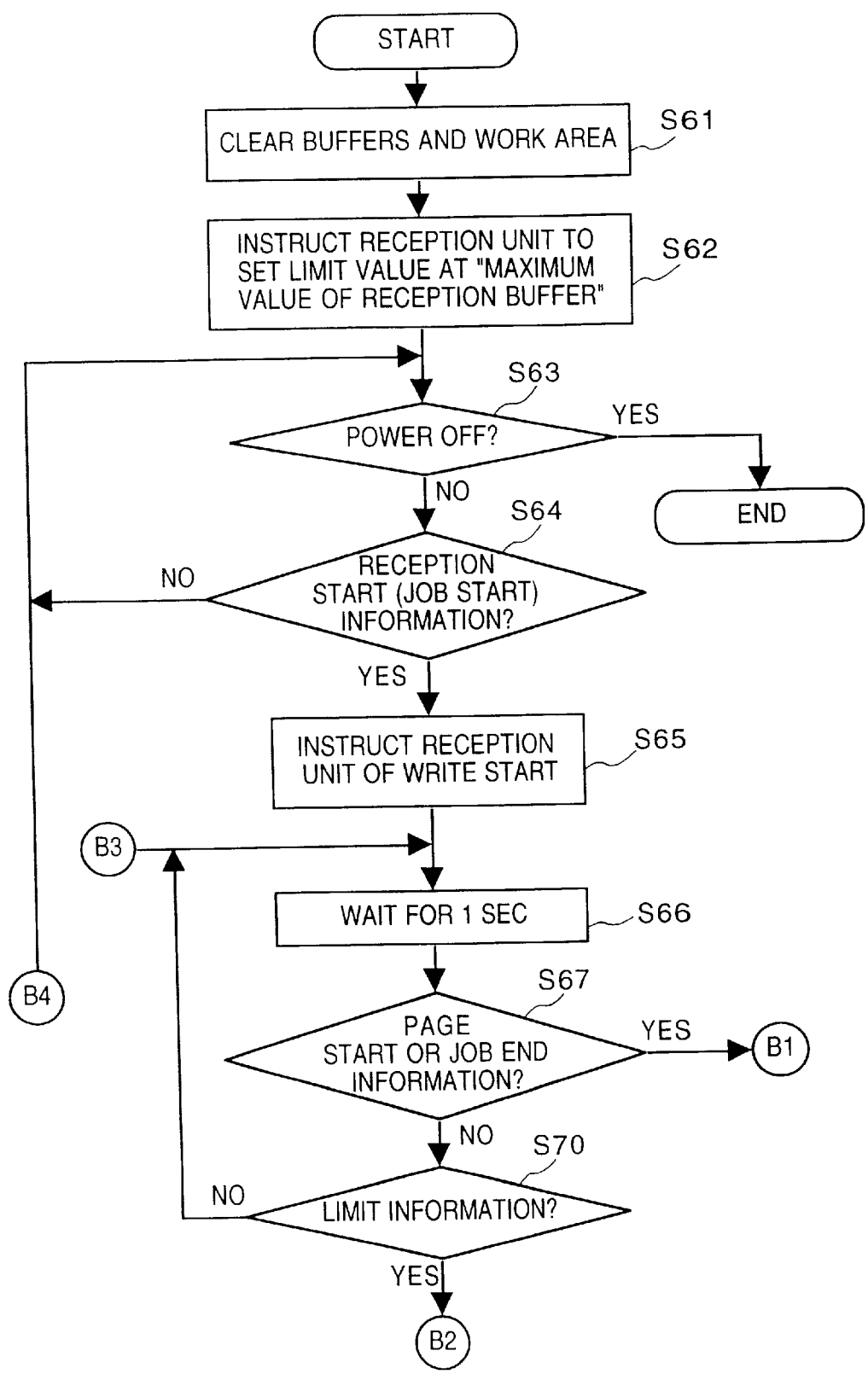
FIG. 13 is a flow chart for explaining the operation of a reception management program.
Figure 14:
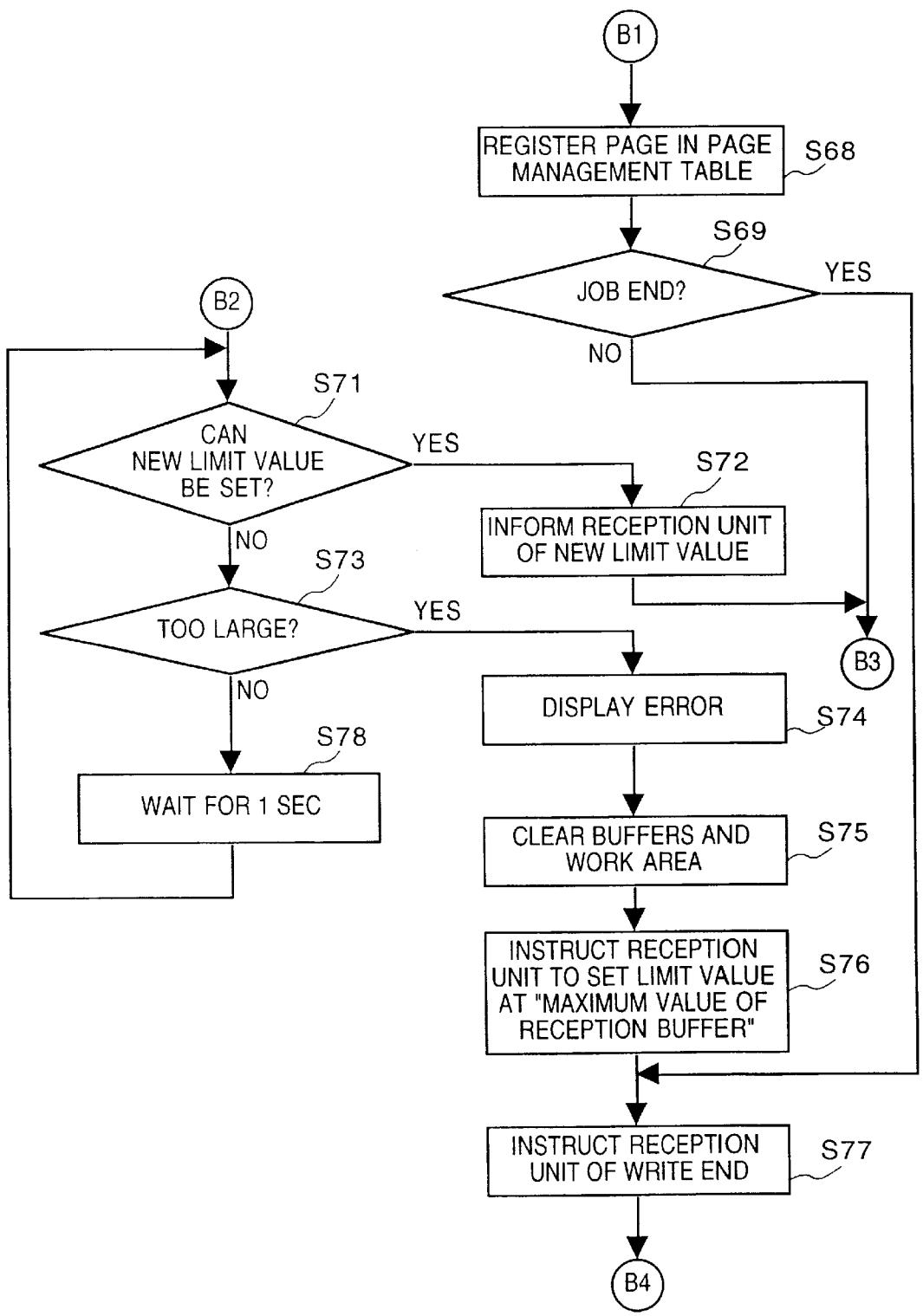
FIG. 14 is a flow chart for explaining the operation of the reception management program.

FIGS. 13 and 14 are flow charts for explaining the operation of the reception management program 51. This program starts operation immediately after the power switch of the printer 2 is turned on.

The program clears the contents of the reception buffer 10, the band memories 71 and 72, and the page management table 13, the registered character management table 14, and the like in the work area 12 in step S61, and directs the reception unit 6 to set the received data write limit value, i.e., the value of the limit pointer 61 described above in FIGS. 7A and 7B, at the maximum value of the reception buffer in step S62. With this setup, the reception unit 6 can fully write data up to the size of the reception buffer. Thereafter, the program checks in step S63 if the user has turned off the power switch of the printer. If YES in step S63, this program ends its processing.

If NO in step S63, the program checks in step S64 if reception start information is received from the reception unit 6. The reception start information indicates whether or not the reception unit 6 detects a job start command 31 from transfer data received from the host 1. If NO in step S64, the flow returns to step S63, and the program forms a loop to wait for print commands transferred from the host 1.

If YES in step S64, the program instructs the reception unit 6 to write the received data in the reception buffer 10 in step S65.

Upon detecting the job start command 31, the reception unit 6 temporarily stops reception from the host 1, and supplies detection information of the job start command 31 to the reception management program 51. Then, the unit 6 waits for a write start instruction of the received data to the reception buffer 10 from the reception management program 51. This processing corresponds to step S65. In this process, the reception unit 6 discards all the received data before detection of the job start command 31. That is, the unit 6 receives data from the host 1 but does not write them in the reception buffer 10.

After step S65, the program waits for 1 sec in step S66. During this 1-sec interval, the reception unit 6 writes the received data in the reception buffer 10. Subsequently, the program checks in step S67 if detection information of a page start command 32 or job end command 36 is received from the reception unit 6. If YES in step S67, the program registers the received page in the page management table 13 in step S68. At this time, the program may often register not only a single page but also a plurality of pages in the page management table 13 at the same time. That is, at the time of step S67, some page start commands and job end commands may have already been queued.

The program checks in step S69 if the contents of the information from the reception unit 6 include a reception message of a job end command 36. If YES in step S69, the program instructs the reception unit 6 of the end of write in step S77, and the flow then returns to step S63. Then, the program forms a loop and waits for reception of the next job. However, if NO in step S69, the flow then returns to step S66, and the program forms a loop to continue the write of the received data in the reception buffer 10.

Note that the reception unit 6 temporarily stops data reception upon detecting a job end command. More specifically, even when the reception unit 6 successively receives a plurality of jobs, it does not randomly write all the received data into the reception buffer 10 at one time, but writes them into the reception buffer 10 in units of jobs in response to the instructions from the reception management program 51.

If NO in step S67, the program checks in step S70 if information indicating that the write position of the received data has reached the designated limit value is received from the reception unit 6. If NO in step S70, the flow returns to step S66, and the program forms a loop to continue the write of the received data by the reception unit 6. If YES in step S70, the program checks in step S71 if the program can inform the reception unit 6 of a new limit value. If YES in step S71, the program informs the reception unit 6 of a new limit value in step S72. After that, the flow returns to step S66, and the program forms a loop to continue the write of the received data into the reception buffer 10 by the reception unit 6.

If NO in step S71, the program checks in step S73 if the received data is too large. "Too large data" implies data for one page that cannot be received even when the reception buffer 10 is fully used. If YES in step S73, the program displays an error message on a panel of the printer 2 in step S74, and clears the contents of the reception buffer 10, the band memories 71 and 72, and the page management table 13, the registered character management table 14, and the like in the work area 12 in step S75. In step S76, the program directs the reception unit 6 to set the received data write limit value at the maximum value of the reception buffer. Next, the program instructs the reception unit 6 of the end of write in step S77, and the flow returns to step S63 to form a loop, thus waiting for job start information of the next document. With this processing, all the document jobs including a page that has caused errors arising from too large data are discarded from that giant page.

If NO in step S73, the program waits for 1 sec in step S78. In this case, the program waits until the interpreter program 72 has interpreted many instructions, and an empty area is formed on the reception buffer 10. The flow returns to step S71 to form a loop, and the program checks in step S71 if the reception buffer 10 is ready to store data.

Note that "an error message is displayed on the panel of the printer 2" in step S74 in the above description, but no panel is described or explained in the block diagram of FIG. 1. However, a normal printer or the like has a liquid crystal panel, status indication lamp, or the like on the front or upper surface of the printer 2 to indicate a "printable", "error", or "out-of-paper" state. Hence, a detailed description thereof will be omitted.

Operation of Reception Unit

Figure 15:
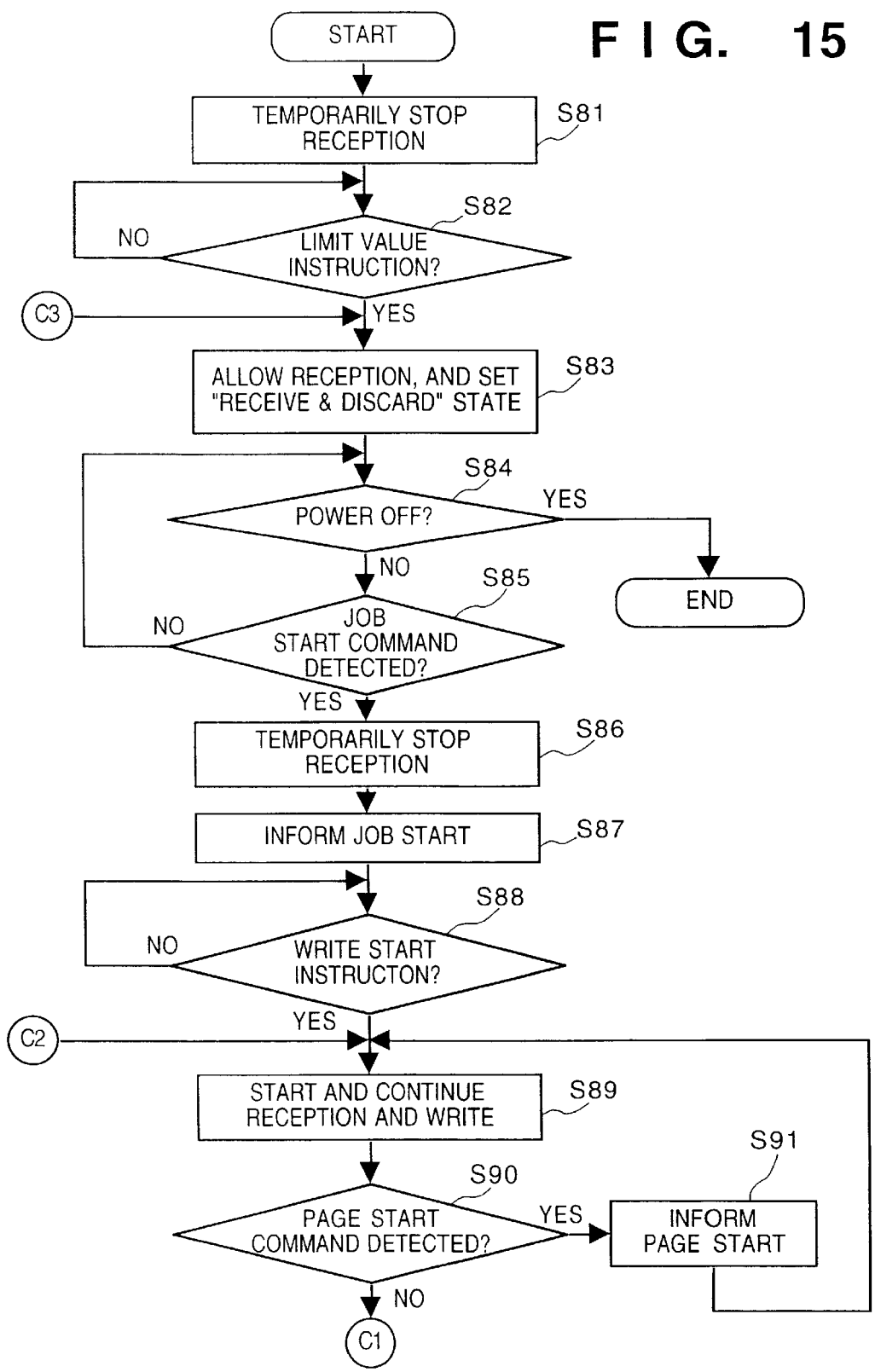
FIG. 15 is a flow chart for explaining the operation of a reception unit.
Figure 16:
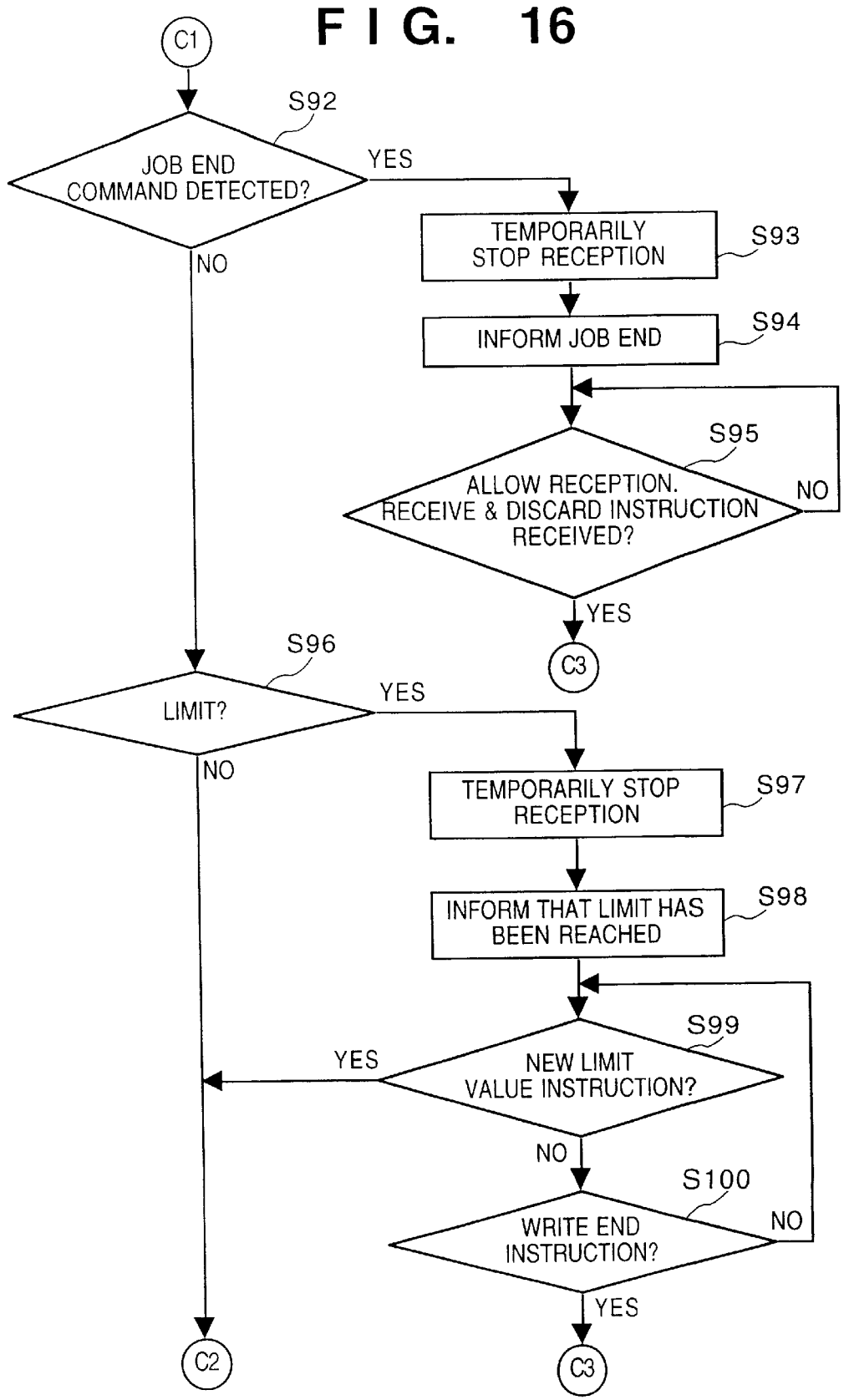
FIG. 16 is a flow chart for explaining the operation of the reception unit.
Figure 17:
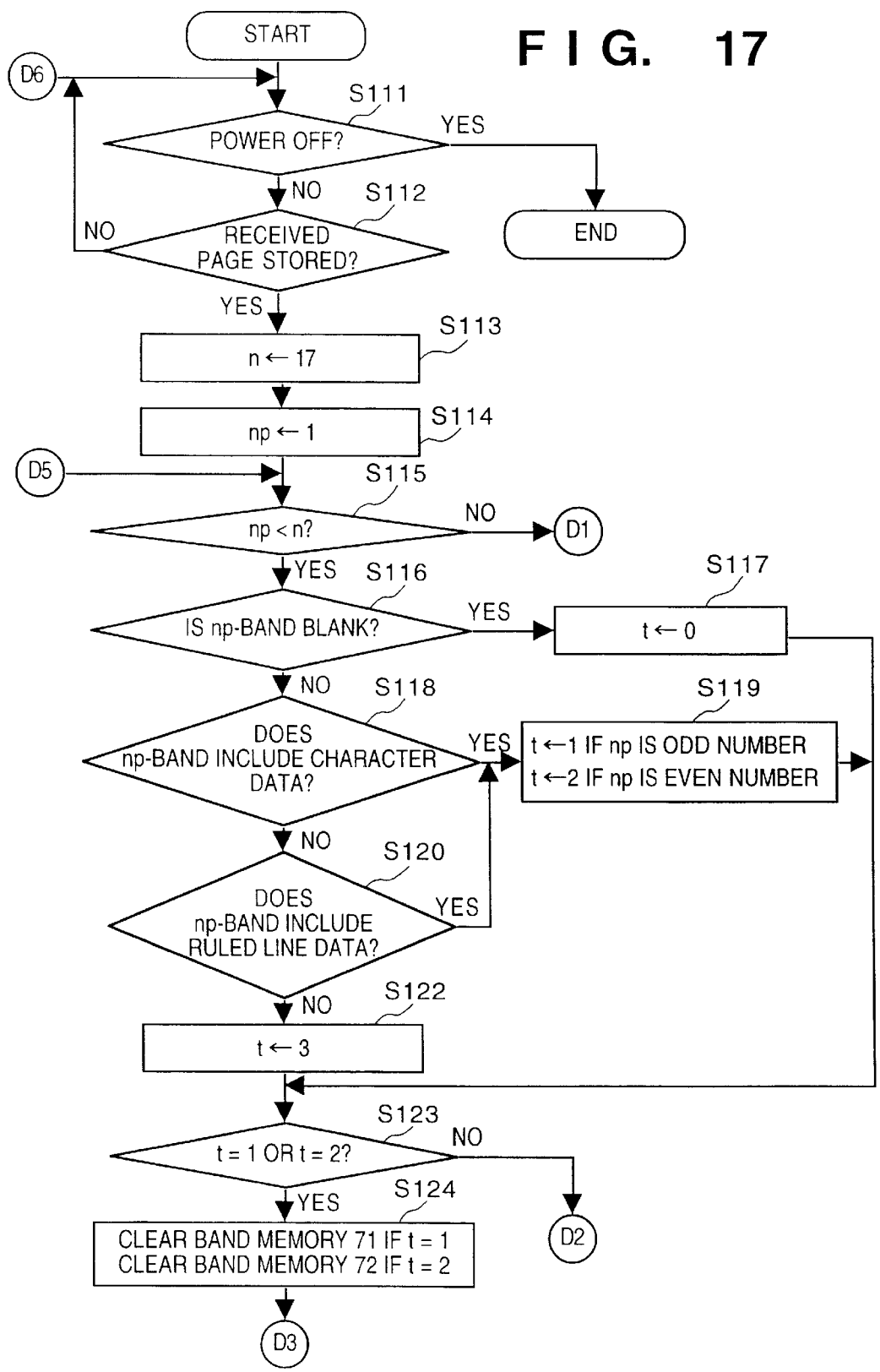
FIG. 17 is a flow chart for explaining the operation of an interpreter program.
Figure 18:
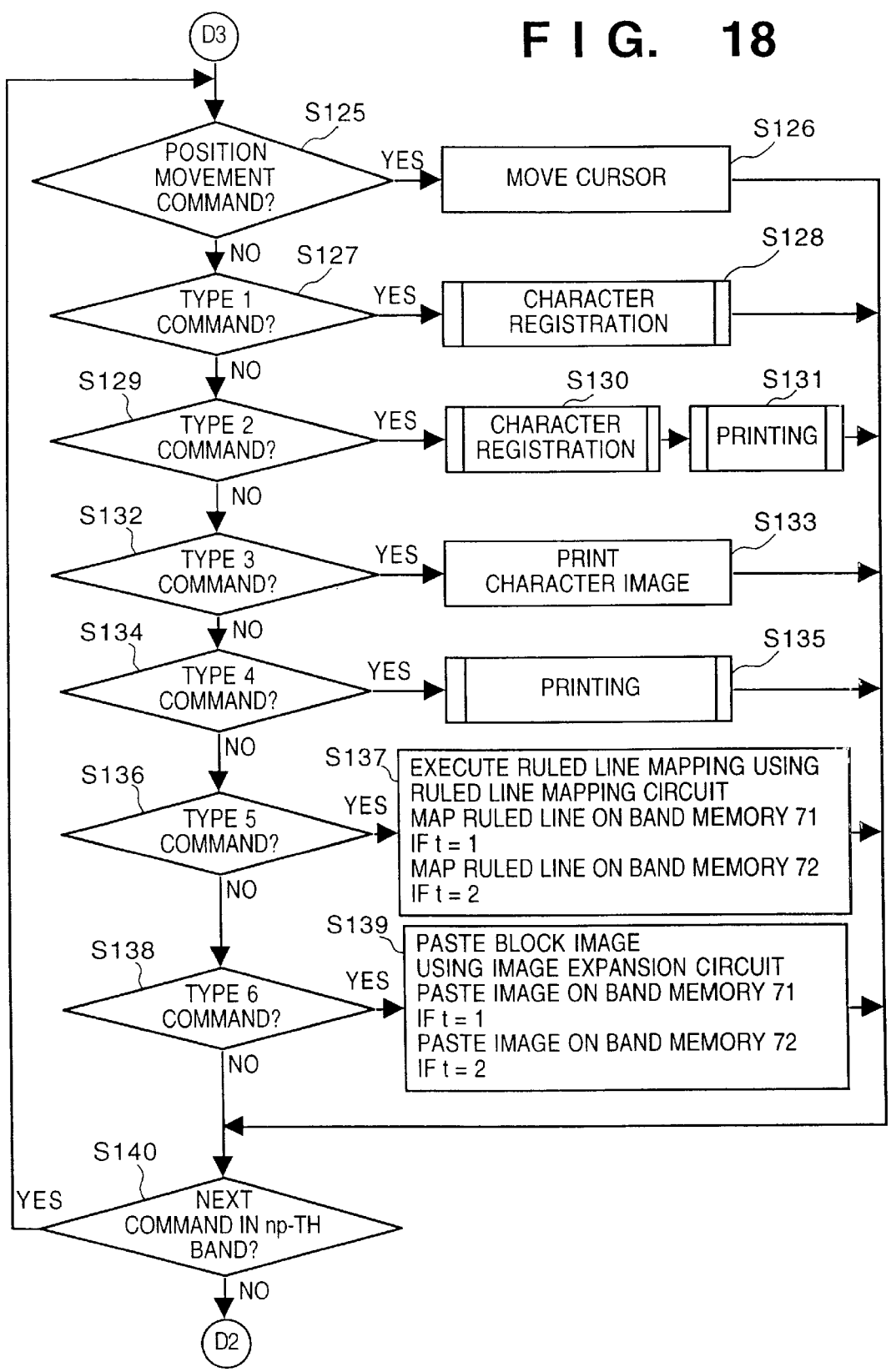
FIG. 18 is a flow chart for explaining the operation of the interpreter program.

FIGS. 15 and 16 are flow charts for explaining the operation of the reception unit 6. The operation of the reception unit 6 has already been mentioned in FIGS. 13 and 14 upon describing the operation of the reception management program 51, but will be described in detail below using the flow charts in FIGS. 15 and 16. Although the reception unit 6 is a hardware circuit and is different from a normal program, its operation order will be described below with the aid of the flow charts.

The reception unit 6 starts operation simultaneously when the power switch of the printer 2 is turned on. In step S81, the unit 6 temporarily stops reception. More specifically, the reception unit 6 sets the printer 2 busy to deny data transfer from the host 1. Thereafter, in step S82, the reception unit 6 waits for an instruction of the limit value of the write position on the reception buffer 10 from the reception management program 51. Upon receiving the instruction, in step S83 the reception unit 6 is set in a state wherein it can receive data from the host 1 but discards the received data.

It is then checked in step S84 if the user has turned off the power switch of the printer 2. If YES in step S84, the reception unit 6 ends its operation. If NO in step S84, it is checked in step S85 if a job start command 31 is detected from the received data. If NO in step S85, the flow returns to step S84 to wait for the job start command 31 from the host 1.

If YES in step S85, the unit 6 temporarily stops reception in step S86, and supplies information indicating detection of the job start command 31 to the reception management program 51 in step S87. That is, reception is temporarily stopped by setting the printer 2 busy to deny data reception from the host 1.

In step S88, the reception unit 6 waits for a write start instruction to the reception buffer 10 from the reception management program 51. Upon detecting that instruction, the unit 6 starts and continues reception and write of data received from the host 1 onto the reception buffer 10 in step S89. It is checked in step S90 if a page start command 32 is detected. If YES in step S90, the unit 6 supplies detection information of the page start command 32 to the reception management program 51 in step S91.

At this time, the reception management program 51 records the page position of the received document in the page management table 13. After step S91, the flow returns to step S89 to continue the data reception and write.

On the other hand, if NO in step S90, it is checked in step S92 if a job end command 36 is detected. If YES in step S92, the unit 6 temporarily stops reception in step S93, and supplies detection information of the job end command 36 to the reception management program 51 in step S94. At this time, the reception management program 51 records the end of the job on the page management table 13.

Subsequently, in step S95, the reception unit 6 waits for an instruction that allows reception but directs to discard received data from the reception management program 51. Upon receiving the instruction, the flow returns to step S83 to wait for a job start command 31 of the next document.

If NO in step S92, it is checked in step S96 if the write position on the reception buffer 10 has reached the limit value. If YES in step S96, the unit 6 temporarily stops reception in step S97, and supplies information indicating that the write position on the reception buffer 10 has reached the limit value to the reception management program 51 in step S98.

It is then checked in step S99 if an instruction of a new limit value of the write position on the reception buffer 10 is received from the reception management program 51. If NO in step S99, it is checked in step S100 if a write end instruction is received from the reception management program 51. If NO in step S100, the flow returns to step S99 to form a loop. More specifically, the reception unit 6 waits for an instruction of a new limit value or write end instruction from the reception management program 51.

The write end instruction is received from the reception management program 51 in step S100 when the data for one page is too large and cannot be stored even if the entire area of the reception buffer 10 is used, resulting in an error.

On the other hand, if YES in step S99, the flow returns to step S89 to continue the data reception and write. If YES in step S100, the flow returns to step S83, and thereafter, the subsequent data are received but discarded until the next job start command 31 is received. That is, pages in the document after the page that has caused the error due to too large data are discarded.

Also, if NO in step S96, the flow returns to step S89 to continue the data reception and write to the reception buffer.

FIGS. 17 to 20 are flow charts for explaining the operation of the interpreter program 52. The interpreter program 52 is started upon power ON of the printer 2, and performs interpretation of print commands in the reception buffer 10 written by the reception unit 6, image formation, and paper discharging.

In step S111, the program checks if the user has turned off the power switch of the printer 2. If YES in step S111, this program ends its processing. If NO in step S111, the program checks in step S112 if the reception buffer 10 stores the received data for one page. If NO in step S112, the flow returns to step S111 to form a loop, thus waiting for reception of data from the host 1.

In step S112, the program checks the presence/absence of received page data by looking up the page management table 13. The page management table 13 is managed by the reception management program 51, as has been described above with the aid of FIGS. 13 and 14.

If YES in step S112, the program interprets and processes print commands in that page in turn. The program sets "17" in a variable n in step S113. "17" is a value obtained by adding "1" to the total number of segments, "16", in one page. The program then sets "1" in a variable np indicating the band number in step S114, and checks in step S115 if the variable np is smaller than the variable n. If NO in step S115, since processing for all the bands is complete, the flow jumps to step S155 to wait for completion of paper discharging. Note that the band numbers are assigned in the order of 1, 2, . . . , 15, and 16 in turn from the top of the page.

If YES in step S115, the program checks in step S116 if the np-th band is a blank band, i.e., a band including none of character data, ruled line data, and block image data. If YES in step S116, the program sets "0" in a variable t in step S117. The flow then jumps to step S123.

If NO in step S116, the program checks in step S118 if data in the np-th band include character data. If YES in step S118, in step S119 the program sets "1" in the variable t if the variable np is an odd number or sets "2" in the variable t if the variable np is an even number. After that, the flow jumps to step S123.

If NO in step S118, the program checks in step S120 if data in the np-th band include ruled line data. If YES in step S120, in step S119 the program sets "1" in the variable t if the variable np is an odd number or sets "2" in the variable t if the variable np is an even number. After that, the flow jumps to step S123.

If NO in step S120, it indicates that data in the np-th band include only a single block data. Hence, the program sets "3" in the variable t in step S122, and the flow jumps to step S123.

The program checks in step S123 if the variable t is 1 or 2. If YES in step S123, the program interprets character data, ruled line data, or block image data included in the np-th band from the first one, and maps them onto the band memories 71 and 72, in step S124 and the subsequent steps. In step S124, the program clears the band memory 71 if the variable t is 1 or clears the band memory 72 if the variable t is 2. The program checks in step S125 if the command to be interpreted is a position movement command 33. If YES in step S125, the program moves the cursor in step S126. The "cursor" is an imaginary pointer that indicates the mapping position of a character, ruled line, or block image on the band memory 71 or 72. More specifically, this "cursor" is assured as variables indicating X- and Y-coordinates on the work area 12. The cursor position has the upper left end of each band as an origin. The position movement command 33 sent from the driver is transferred on the basis of the relative position that assumes the upper left end of each band as an origin. That is, the position movement command 33 does not have the upper left end of a page as an origin.

After step S126, the flow jumps to step S140.

If NO in step S125, the program checks in step S127 if the command is a type command 34 of type 1. If YES in step S127, after character registration is done by the character registration program 53 in step S128, the flow jumps to step S140. The character registration will be described in detail later with reference to the flow chart in FIG. 21.

If NO in step S127, the program checks in step S129 if the command is a type command 34 of type 2. If YES in step S129, character registration is done in step S130, and printing proceeds in step S131. Then, the flow jumps to step S140. The character registration in step S130 is the same as that in step S128 above. The printing in step S131 is done by the printing program 54, and its detailed operation will be explained later with reference to FIG. 22.

If NO in step S129, the program checks in step S132 if the command is a type command 34 of type 3. If YES in step S132, after printing of only a character image in step S133, the flow jumps to step S140.

If NO in step S132, the program checks in step S134 if the command is a type command 34 of type 4. If YES in step S134, printing proceeds in step S135, and the flow then jumps to step S140. The printing in step S135 is the same as that in step S131 above.

If NO in step S134, the program checks in step S136 if the command is a type command 34 of type 5. If YES in step S136, the program maps a ruled line using the ruled line mapping circuit 131 in step S137. In this case, the program maps a ruled line on the band memory 71 if the variable t is 1 or on the band memory 72 if the variable t is 2. After that, the flow jumps to step S140.

If NO in step S136, the program checks in step S138 if the command is a type command 34 of type 6. If YES in step S138, in step S139 the program expands compressed image data using the image expansion circuit 16, and pastes the expanded image block to the band memory 71 or 72. In this case, the program pastes data on the band memory A 71 if the variable t is 1 or on the band memory B 72 if the variable t is 2. The flow then jumps to step S140.

After step S126, S128, S131, S133, S135, S137, or S139, or if NO in step S138, the flow advances to step S140. The program checks in step S140 if data for the np-th band still include uninterpreted commands. If YES in step S140, the flow returns to step S125 to interpret that uninterpreted command.

Figure 19:
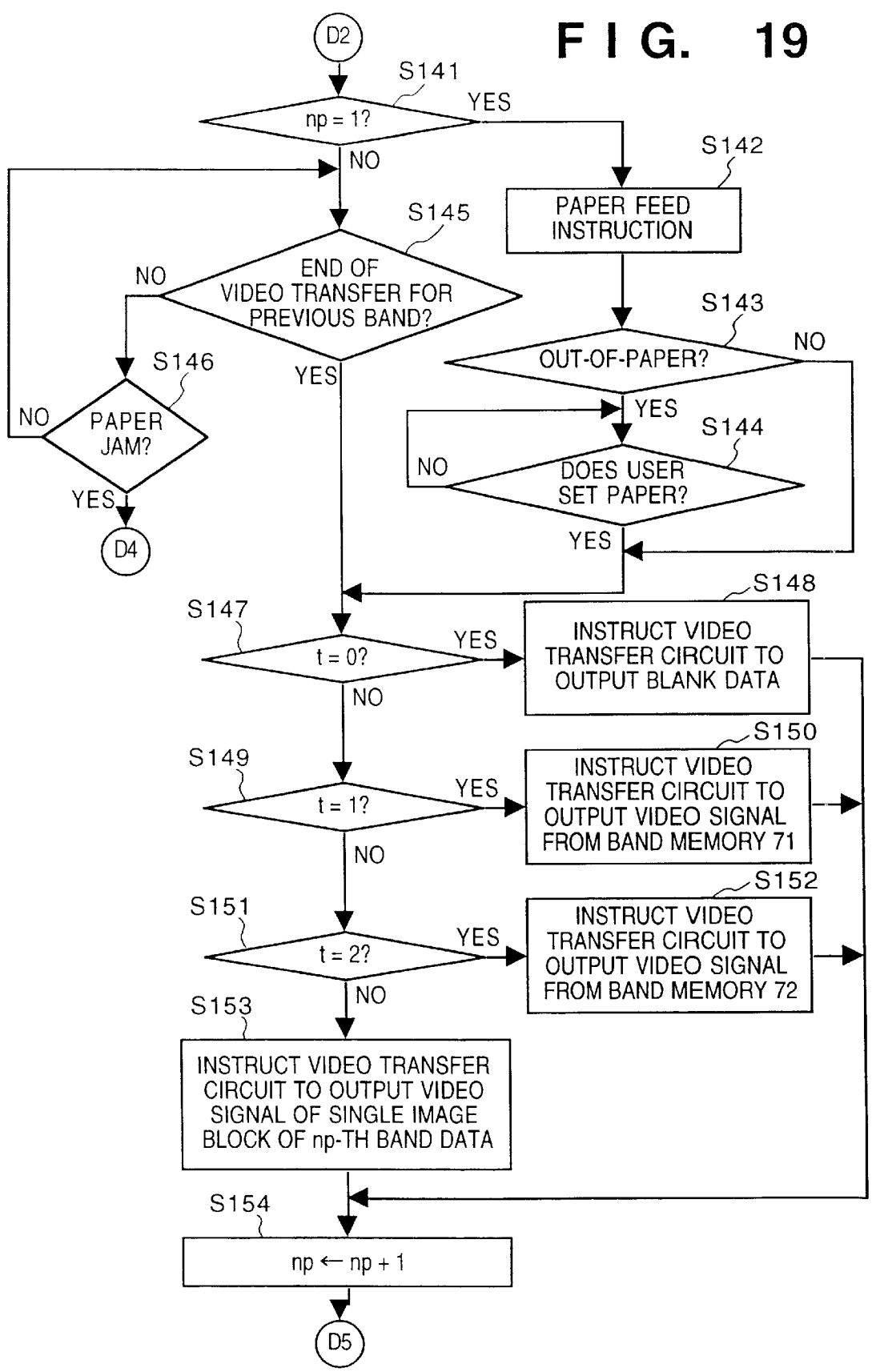
FIG. 19 is a flow chart for explaining the operation of the interpreter program.
Figure 20:
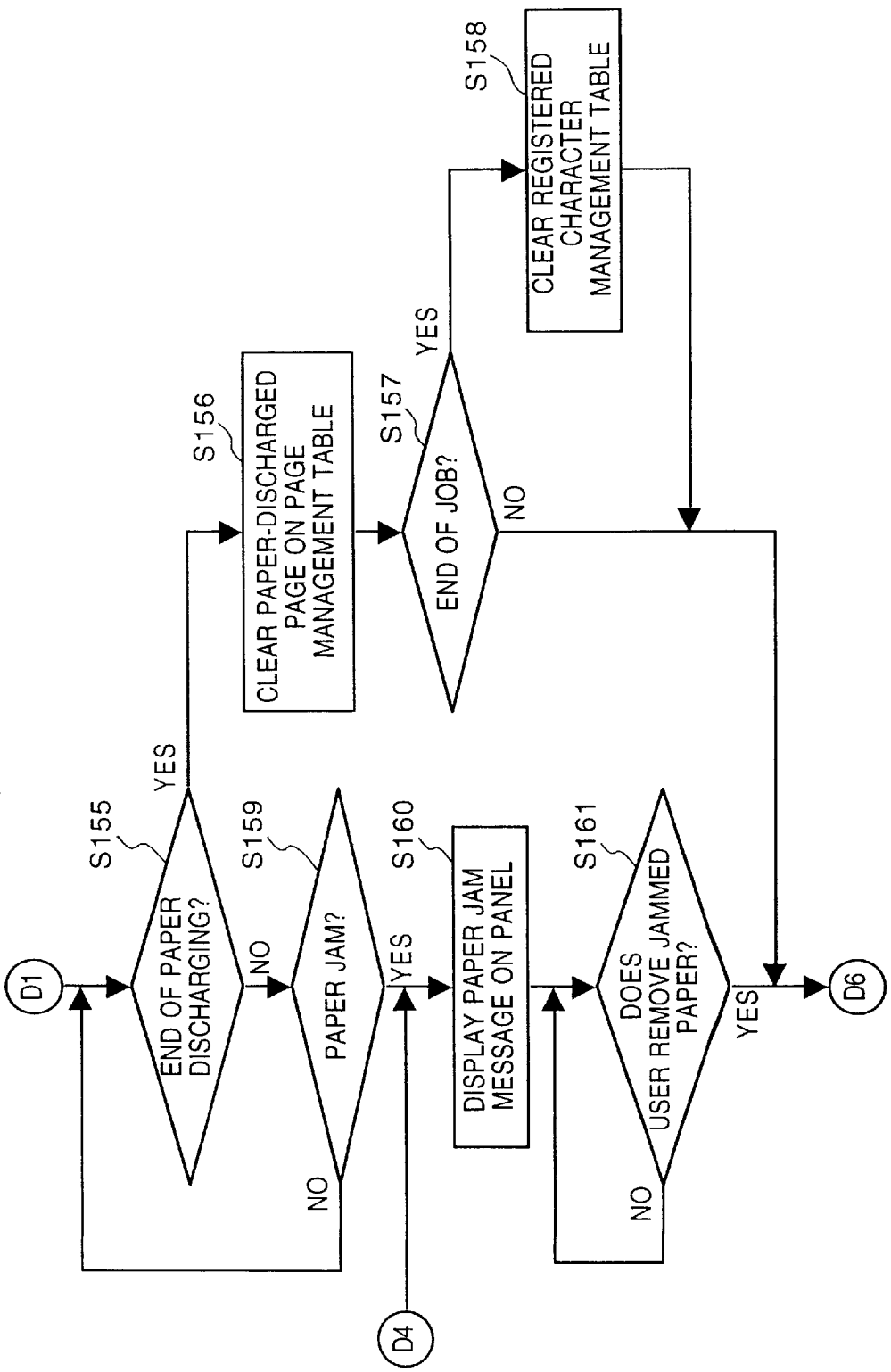
FIG. 20 is a flow chart for explaining the operation of the interpreter program.

If NO in step S123 or S140, the flow jumps to step S141 in FIG. 19.

In steps S141 to S154, video signal output processing to the engine unit 4 is done in units of bands.

The program checks in step S141 if the variable np is 1. That is, the program checks if the band of interest is the first band of a certain page. If YES in step S141, the program supplies a paper feed start instruction to the engine unit 4 in step S142, and checks in step S143 if the engine unit 4 has detected an out-of-paper state. If YES in step S143, the program waits until the user additionally sets paper sheets in step S144, and the flow then jumps to step S147. If NO in step S143, i.e., if paper sheets are set, the flow jumps to step S147.

On the other hand, if it is determined in step S141 that the band of interest is not the first band, the program waits for the end of video transfer of data for the previous band in step S145. During waiting, the program always monitors in step S146 if paper jam has occurred. If paper jam has occurred, the flow jumps from step S146 to step S160 to recover from paper jam.

If YES in step S145, i.e., if video transfer of data for the previous band is complete, the program checks in step S147 if the variable t is 0. If YES in step S147, after the program instructs the video transfer circuit 7 to output a blank band in step S148, the flow jumps to step S154. If NO in step S147, after the program checks in step S149 if the variable t is 1. If YES in step S149, the program instructs the video transfer circuit 7 to output a video signal from the band memory 71 in step S150, the flow jumps to step S154.

If NO in step S149, the program checks in step S151 if the variable t is 2. If YES in step S151, after the program instructs the video transfer circuit 7 to output a video signal from the band memory 72 in step S152, the flow jumps to step S154.

If NO in step S151, the program instructs the video transfer circuit 7 to output a video signal while expanding block image data included in the np-th band data in step S153, and the flow then advances to step S154.

In step S154, the program increments the variable np by 1, and the flow returns to step S115 to start mapping of the next band data onto the band memory and video signal output processing.

If NO in step S115, output processing of all the bands is complete, and the program waits for completion of discharging of the printed paper sheet in step S155 and the subsequent steps. In step S155, the program checks if paper discharging is complete. If NO in step S155, the program checks in step S159 if paper jam has occurred. If NO in step S159, the flow returns to step S115 to form a loop, thus waiting for completion of paper discharging.

If the program determines in step S155 that paper discharging is complete, the program clears the description of that page on the page management table 13 in step S156, and checks the end of job in step S157, i.e., if all the pages of a single document have been discharged. If YES in step S157, the program clears the registered character management table 14 in step S158, and the flow returns to step S111 to wait for data reception of the next document job.

If NO in step S157, the flow also returns to step Sill to wait for data reception of the subsequent page of that document.

On the other hand, if YES in step S159, the program displays a paper jam message on the panel in step S160, and waits until the user removes the jammed paper sheet in step S161. If the paper sheet has been removed, the flow returns to step S111, and the program re-executes mapping of received page data onto the band, video output, and paper discharging, which have already been done previously.

Note that the program clears page registration on the page management table 13 in step S156. The reception management program 51 confirms that this area has been cleared, and then instructs the reception unit 6 of a new limit value of the received data write position.

Character Registration Program

Figure 21:
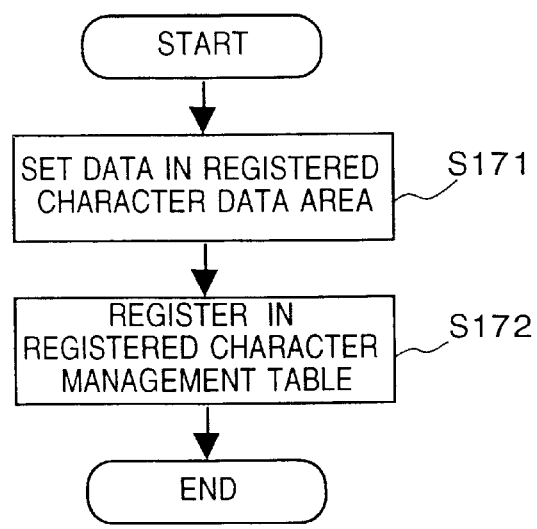
FIG. 21 is a flow chart for explaining the operation of a registration program.

FIG. 21 is a flow chart for explaining the operation of the character registration program 53 in detail.

This program is called from the interpreter program 52. In step S171, the program transfers compressed character dot image data to the registered character data area 15. After that, the program records the registration address, font number, character code, and the like in the registered character management table 14 in step S172, thus ending the processing.

Printing Program

Figure 22:
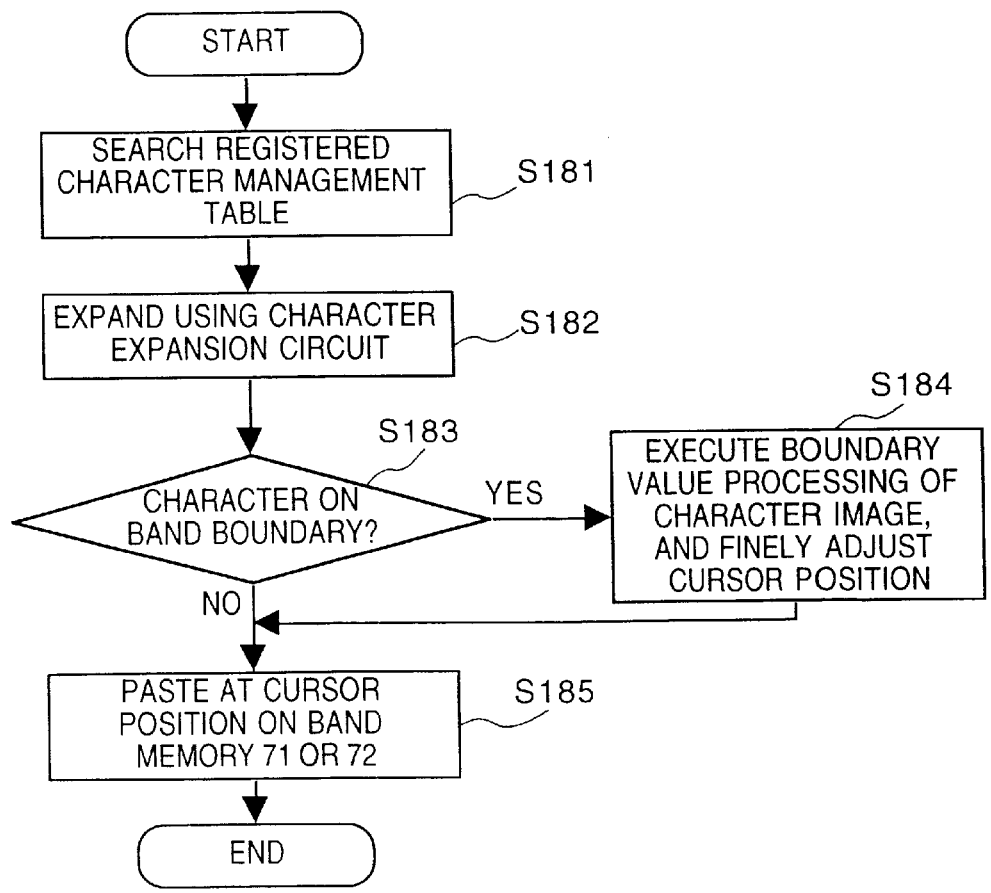
FIG. 22 is a flow chart for explaining the operation of a printing program.

FIG. 22 is a flow chart for explaining the operation of the printing program 54 in detail. This program is also called from the interpreter program 52.

In step S181, the program searches the registered character management table 14 to acquire the address, of a registered character whose font number and character code match, on the registered character data area 15. In step S182, the program expands compressed dot image data using the character expansion circuit 17. In step S183, the program checks if the character to be pasted is on a band boundary. If YES in step S183, the program executes boundary value processing of a character image and also finely adjusts the cursor position in step S184. After that, the flow advances to step S185. If NO in step S183, the flow also advances to step S185.

In the boundary value processing in step S184, only a portion included in the region of the current band is extracted from a character image for one character. Since only that small image portion is pasted into the band region, the cursor position must also be finely adjusted to move to a position within the band region.

For example, assume that a certain character extends from the upper boundary of the current band by about the upper half portion of its character box. Since the character position is indicated by the upper left vertex position of the character box, this character falls outside the band region at that time as long as the cursor position is concerned. The boundary value processing is done to extract only the lower half image of the character box that falls within the band region. As a result, the upper left vertex position of the character box of the lower half character becomes a new cursor position. This position is located on the upper boundary of the band region. This is "fine adjustment of the cursor position".

Also, when a character box is on one of the four corners of the band region, a character image portion included in the band region is similarly extracted, and the cursor position is finely adjusted.

In step S185, the program pastes the expanded character dot image at the cursor position on the band memory 71 or 72. If the variable t described above in FIGS. 17 and 18 is 1, the dot image is pasted onto the band memory 71; if the variable t is 2, the image is pasted onto the band memory 72. Finally, this program ends its processing.

Operation of Ruled Line Mapping Circuit

Figure 23:
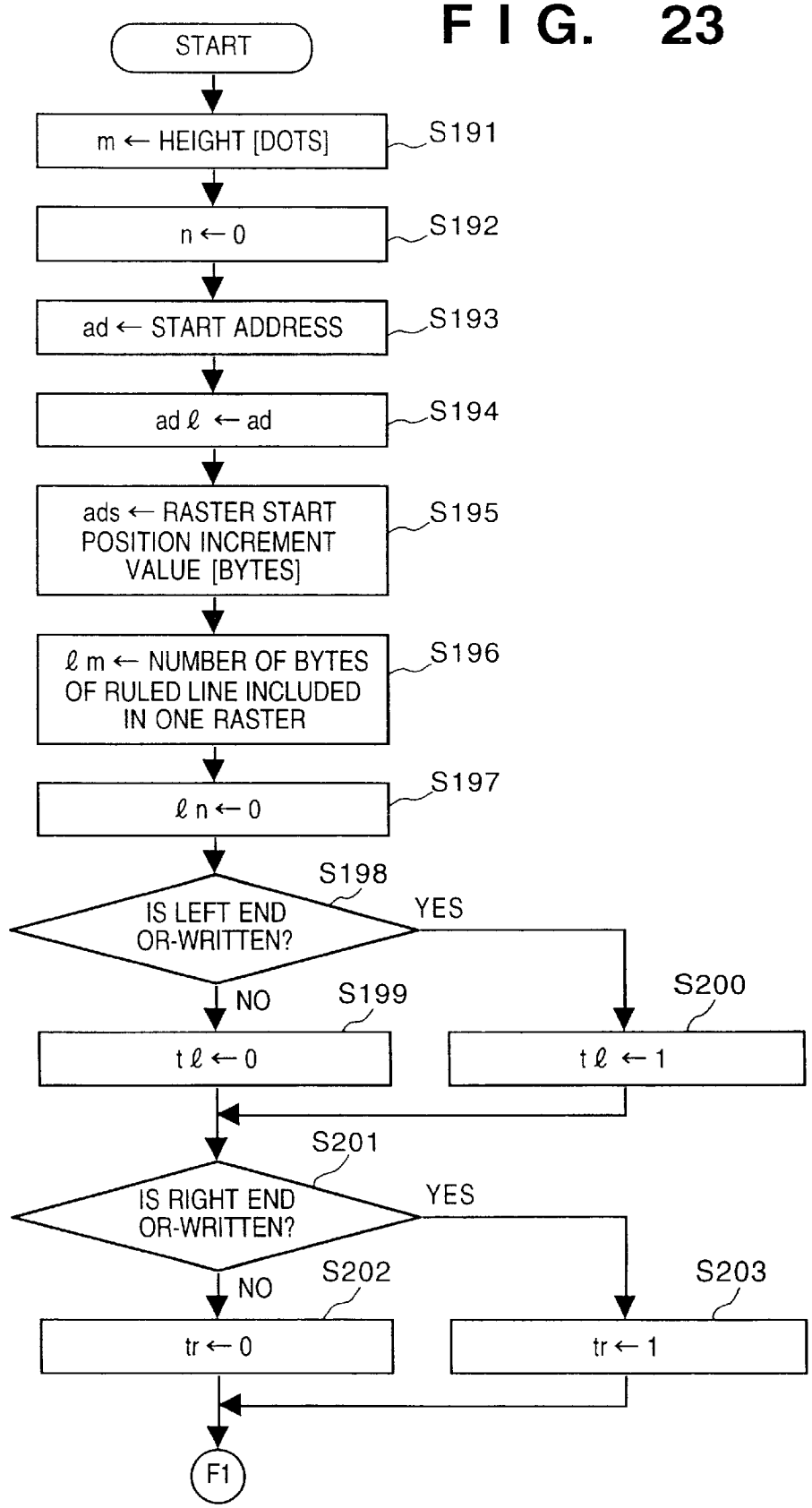
FIG. 23 is a flow chart for explaining the operation of a ruled line mapping circuit.
Figure 24:
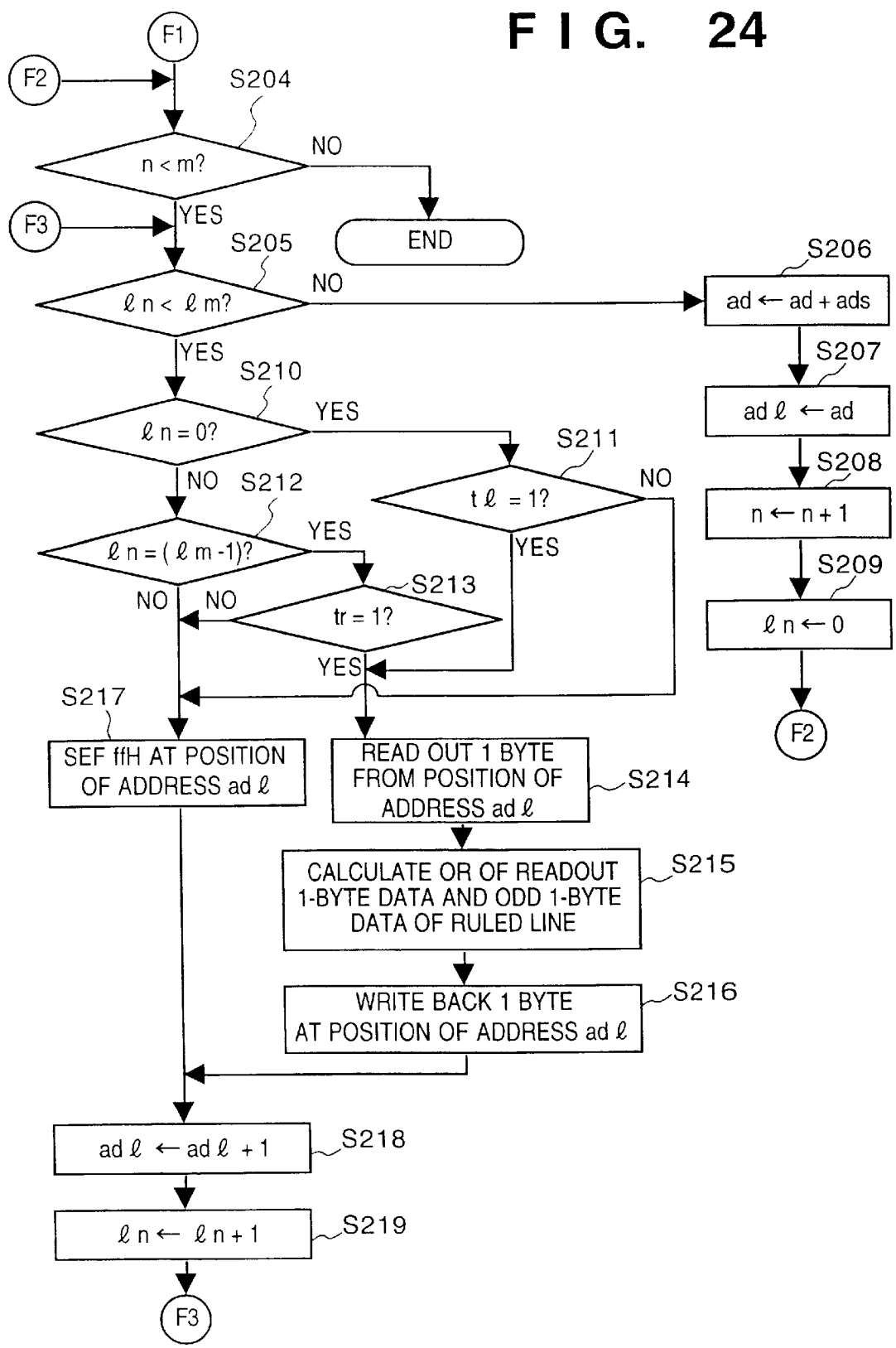
FIG. 24 is a flow chart for explaining the operation of the ruled line mapping circuit.

FIGS. 23 and 24 are flow charts for explaining the operation of the ruled line mapping circuit 131. Although the ruled line mapping circuit 131 is not a program, its operation will be described below using the flow charts.

Upon receiving a mapping instruction of a single ruled line from the interpreter program, the ruled line mapping circuit 131 starts its operation. The mapping instruction of a single ruled line instructs drawing of an elongated rectangle which is painted in black. The ruled line mapping circuit 131 draws that elongated rectangle in turn from the top in units of rasters, thus completing the rectangle. Note that the mapping coordinate position is instructed in units of dots on the band memory 71 or 72. Of course, the band memory 71 or 72 used for mapping is also instructed.

Upon receiving a ruled line mapping instruction, the height [dots] of the rectangle is set in a variable m in step S191. "0" is set in a variable n in step S192, the drawing start address [bytes] is set in a variable ad in step S193, and the value of the variable ad is set in a variable adl in step S194.

In step S195, an increment [bytes] for obtaining the start position of the second raster and the subsequent rasters upon drawing in units of rasters is set in a variable ads. In step S196, the length [bytes] of the ruled line portion included in one raster is set in a variable lm. In step S197, "0" is set in a variable ln.

It is checked in step S198 if the left end portion of the ruled line is OR-written. If NO in step S198, "0" is set in a variable tl in step S199; otherwise, "1" is set in the variable tl in step S200. Note that whether or not OR-write is to be done can be determined by checking if the mapping start position [dots] of the ruled line designated by the interpreter program 52 can be divided by 8. If the start position can be divided by 8, OR-write is not performed.

It is checked in step S201 if the right end portion of the ruled line is OR-written. If NO in step S201, "0" is set in a variable tr in step S202; otherwise, "1" is set in the variable tr in step S203. Note that whether or not OR-write is to be done can be determined by checking if the "mapping end position [dots] of the ruled line+1" designated by the interpreter program 52 can be divided by 8. If the "end position+1" can be divided by 8, OR-write is not performed.

It is checked in step S204 if the variable n is larger than the variable m. If NO in step S204, since it indicates that drawing for all the rasters is complete, i.e., all the portions of the ruled line have been drawn, the operation of the ruled line mapping circuit 131 ends.

If YES in step S204, it is checked in step S205 if the variable ln is smaller than the variable lm. If NO in step S205, since it indicates completion of drawing for one raster, address adjustment is done in step S206 and the subsequent steps, and drawing for the next raster is then started. That is, the variable ads is added to the variable ad in step S206, and the value of the variable ad is set in the variable adl in step S207. The variable n is incremented by 1 in step S208, and "0" is set in the variable ln in step S209. After that, the flow returns to step S204 to continue drawing for the next raster.

If YES in step S205, it is checked in step S210 if the variable ln is 0. More specifically, it is checked if the first byte included in one raster is to be drawn. If YES in step S210, it is checked in step S211 if the variable tl is 1. That is, it is checked if the left end portion is OR-written. If NO in step S211, the flow jumps to step S217 to execute overwrite processing. However, if YES in step S211, the flow jumps to step S214 to execute OR-write processing.

If NO in step S210, it is checked in step S212 if the variable ln equals a value obtained by subtracting 1 from the variable lm. That is, it is checked if the last byte included in one raster is to be drawn. If NO in step S212, the overwrite processing is done in step S217; otherwise, it is checked in step S213 if the variable tr is 1. More specifically, it is checked if the right end portion is OR-written. If YES in step S213, OR-write processing is done in step S214 and the subsequent steps; otherwise, the overwrite processing is done in step S217.

In the overwrite processing in step S217, 1-byte data=ffH indicating black is simply set at the position of address adl [bytes].

The OR-write processing in step S214 and the subsequent steps is done as follows. In step S214, 1-byte data is read out from the position of address adl [bytes] on the band memory 71 or 72. In step S215, the OR of the readout 1-byte data and an odd 1-byte pattern at the left or right end of the ruled line is calculated. In step S216, the 1-byte OR result is written back to the position of address adl [bytes] on the band memory 71 or 72.

After step S216 or S217, the variable adl is incremented by 1 in step S218, and the variable ln is incremented by 1 in step S219. After that, the flow returns to step S205 to draw the next byte in one raster which is being drawn.

In case of a thin vertical ruled line, for example, a vertical ruled line with a thickness of 1 dot, the variable lm, i.e, the number of bytes of the ruled line for one raster, is 1 in step S196, and the variable tl indicating OR-write of the left end portion is 1. Drawing for one raster is done once in steps S210, S211 and step S214. The value of the variable tr indicating whether or not the right end portion is OR-written has no significance in terms of processing.

Operation of Video Transfer Circuit 7

The operation of the video transfer circuit 7 will be explained below with reference to FIGS. 25, 26, 27, and 28. Although the video transfer circuit 7 is a hardware circuit and is not a program, its operation will be explained with the aid of the flow charts in FIGS. 26, 27, and 28. As described above, the interpreter program 52 instructs the video transfer circuit 7 to output a video signal to the engine unit 4. The processing of the image video transfer circuit 7 includes three different processing operations, i.e., blank band processing, video signal output processing from the band A 71 or B 72, and direct expansion of compressed image data from the compressed block image data and video signal output processing of the expanded data.

The video transfer circuit 7 includes a line buffer (not shown) for storing expanded data for one line after compressed image data is expanded from block image data. The circuit 7 generates a video signal based on data stored in this line buffer, and outputs it to the engine unit 4.

Figure 25:
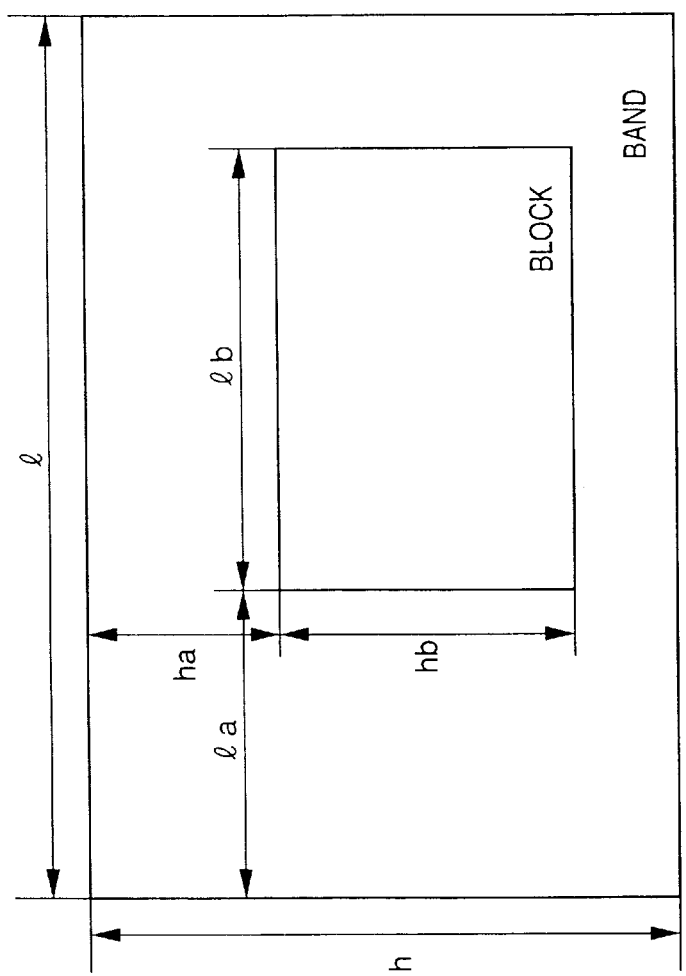
FIG. 25 is an explanatory view of variables used upon video output of a band.
Figure 26:
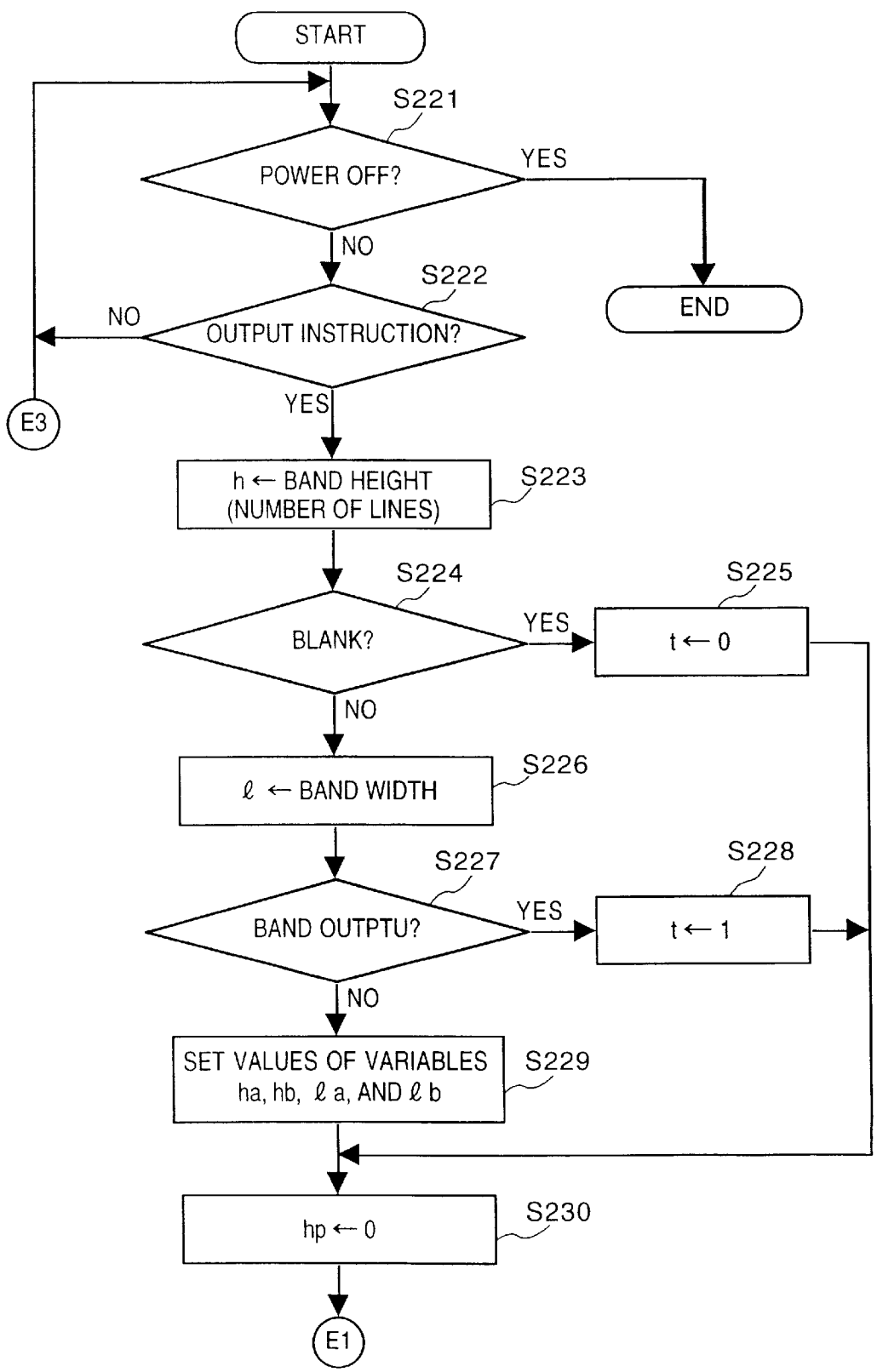
FIG. 26 is a flow chart for explaining the operation of a video transfer circuit.

The variables used in the flow charts in FIGS. 26, 27, and 28 will be explained below with reference to FIG. 25.

A variable h indicates the height of a band, which corresponds to the number of lines upon outputting a video signal. A variable l indicates the width of a band, which is set in units of bytes. That is, dots corresponding in number to a multiple of 8 are converted into black and white bits of a video signal, and are output.

A variable ha indicates the top margin until an image block appears. That is, the variable ha indicates the number of lines for which no video signal need be sent. A variable hb indicates the height of an image block, i.e., the number of lines of the block.

A variable la is the left margin of an image block. In this portion, no video signal need be sent. A variable lb is the width of an image block. The values of la and lb are set in units of bytes. That is, dots corresponding in number to a multiple of 8 are converted into black and white bits of a video signal, and are output.

The above description of the operation of the driver on the host 1 does not suggest any adjustment of the width of a band or image block to "the size in units of bytes", but such adjustment to a given unit is required to allow high-speed image output using a hardware circuit. The driver transfers print commands to the printer 2 under such conditions.

The operation of the video transfer circuit 7 will be explained below with reference to FIGS. 26, 27, and 28.

This circuit starts its operation immediately after the power switch of the printer 2 is turned on. In step S221, it is checked if the user has turned off the power switch of the printer 2. If YES in step S221, this circuits ends operation. If NO in step S221, it is checked in step S222 if the circuit has received a video signal output instruction from the interpreter program 52. If NO in step S222, the flow returns to step S221 to form a loop, thus waiting for an instruction from the interpreter program 52.

If YES in step S222, the height of a band, i.e., the total number of lines of the band, is set in the variable h in step S223. This value is given together with the video signal output instruction from the interpreter program 52. In step S224, it is checked if the instruction from the interpreter program 52 is a blank band output instruction. If YES in step S224, 0 is set in the variable t in step S225, and the flow jumps to step S230.

If NO in step S224, the value of the band width is set in the variable l in step S226. This value is also given together with the video signal output instruction from the interpreter program 52. It is then checked in step S227 if the instruction from the interpreter program 52 is a video signal output instruction from the band memory 71 or 72. If YES in step S227, 1 is set in the variable t in step S228, and the flow then jumps to step S230.

If NO is determined in step S227, the received instruction indicates that a single block image is present in the band, and the compressed block image data is expanded by the video transfer circuit 7 to output a video signal. In step S229, 2 is set in the variable t, the top margin of the block is set in the variable ha, the block height, i.e., the total number of lines of the block, is set in the variable hb, the left margin of the block is set in the variable la, and the width of the block is set in the variable lb. These values are also given together with the video signal output instruction from the interpreter program 52. The flow then advances to step S230.

In step S230, 0is set in a variable hp. The variable hp serves as a counter indicating the position of a line on the band from which a video signal is to be output. It is then checked in step S231 if the variable t is 0 or 1. If the variable t is 0 or 1, it is checked in step S232 if the circuit has received a video signal output request from the engine unit 4. If NO in step S232, the control forms a loop to wait for that request. If the video signal output request is received, it is checked in step S233 if the variable t is 1. If NO in step S233, the flow jumps to step S235. If YES in step S233, in step S234 data on the hp-th line on the band memory A 71 or B 72 is converted into a video signal, and the video signal is output to the engine unit 4. After that, the flow advances to step S235. Note that in step S234, the output instruction from the band memory 71 or B 72 is given together with the video output instruction from the interpreter program 52.

In step S235, the variable hp is incremented by 1. In step S236, it is checked if the variable hp is smaller than the variable h. If YES in step S236, i.e., if the band still includes lines for which video signals to be output still remain, the flow returns to step S232 to output a video signal for the next line.

If NO in step S236, i.e., if video signals for all the lines in the band have been output, information indicating the end of output of video signals for the instructed band is supplied to the interpreter program 52 in step S237. This information also includes completion of the blank band output processing. The flow then returns to step S221 to wait for the next video output instruction from the interpreter program 52.

If NO in step S231, the received instruction is a video signal output instruction from block image data in the band. In this case, in step S238 in FIG. 28, compressed image data for the first line in the block image data is expanded and the expanded data is set in the internal line buffer of the video transfer circuit 7 in step S238. Expansion of the compressed data in advance can prevent any video output timing delay upon expanding data at the time of outputting a video signal.

Henceforth, in step S239, the control forms a loop to wait for a video signal request from the engine unit 4. If the video signal request is received, it is checked in step S240 if the variable hp is smaller than the variable ha. If YES in step S240, the flow jumps to step S247 without any processing. This means that no video signal is sent in the top margin portion of the block.

If NO in step S240, it is checked in step S241 if the variable hp is smaller than the sum of the variables ha and hb. If NO in step S241, the flow jumps to step S247 without sending any video signal. This means that if the portion beneath the block in the band is blank, i.e., the bottom margin is present, no video signal is sent for that portion.

If YES in step S241, no video signal is sent in correspondence with the size of the variable la on the line in step S242.

Next, in step S243 data on the internal line buffer of the video transfer circuit 7 is converted into a video signal in correspondence with the size of the variable lb, and the video signal is output to the engine unit 4. In step S244, the sum of 1 and the value obtained by subtracting the variable ha from the variable hp is set in a variable hbp.

Subsequently, it is checked in step S245 if the variable hbp is smaller than the variable hb. If NO in step S245, i.e., if video signals for all the lines in the block have been output, the flow jumps to step S247 without any processing.

If YES in step S245, i.e., if the block includes lines for which video signals to be output still remain, in step S246 compressed image for the hbp-th line designated by the variable hbp in the block data is expanded, and the expanded data is set in the internal line buffer of the video transfer circuit 7. The flow then advances to step S247.

In this processing as well, expansion of the compressed data in advance can prevent any video output timing delay due to expansion upon outputting a video signal.

In step S247, the variable hp is incremented by 1, and it is then checked in step S248 if the variable hp is smaller than the variable h. If YES in step S248, the flow returns to step S239 to continue the video signal output processing of the next line in the band.

Figure 27:
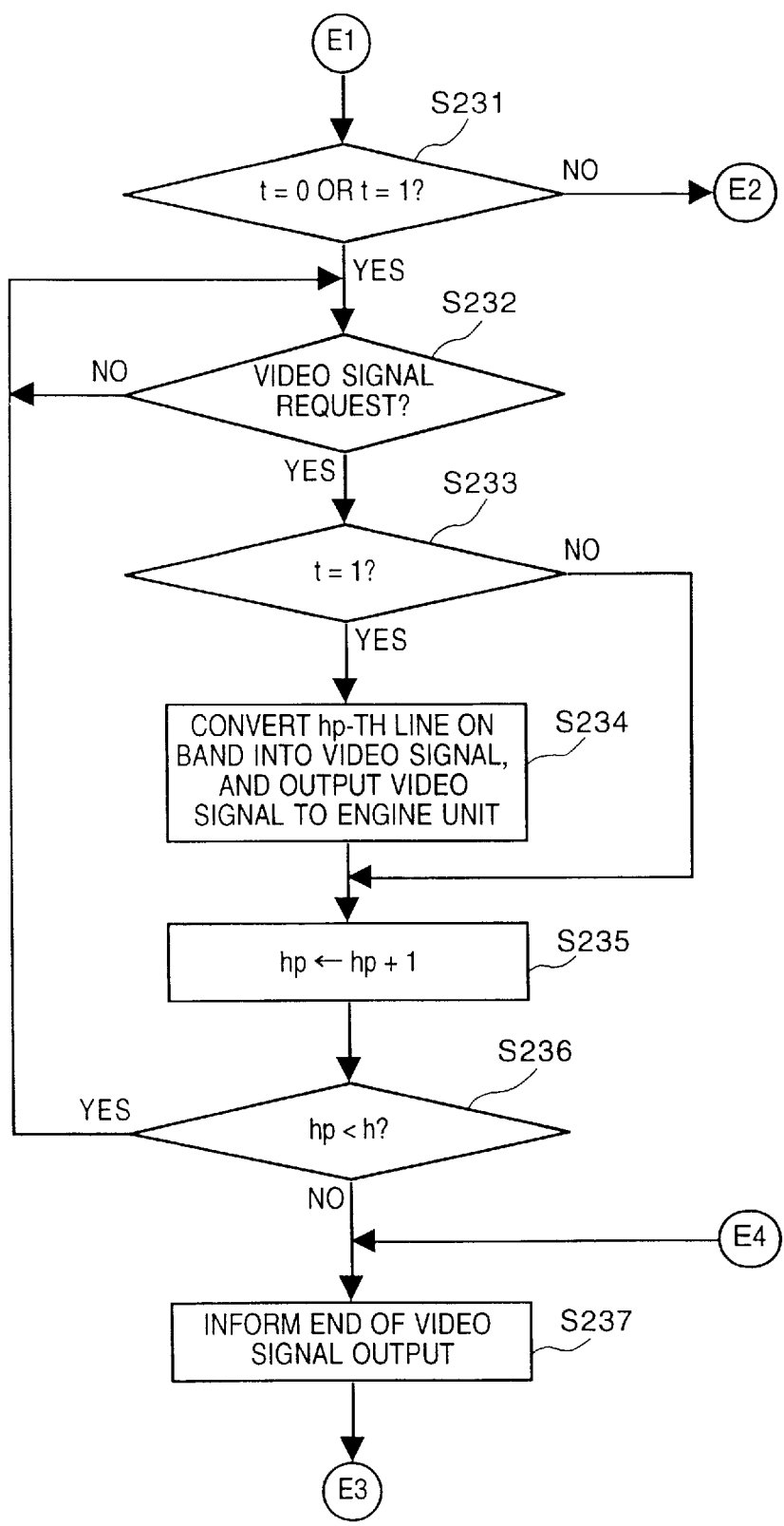
FIG. 27 is a flow chart for explaining the operation of the video transfer circuit.
Figure 28:
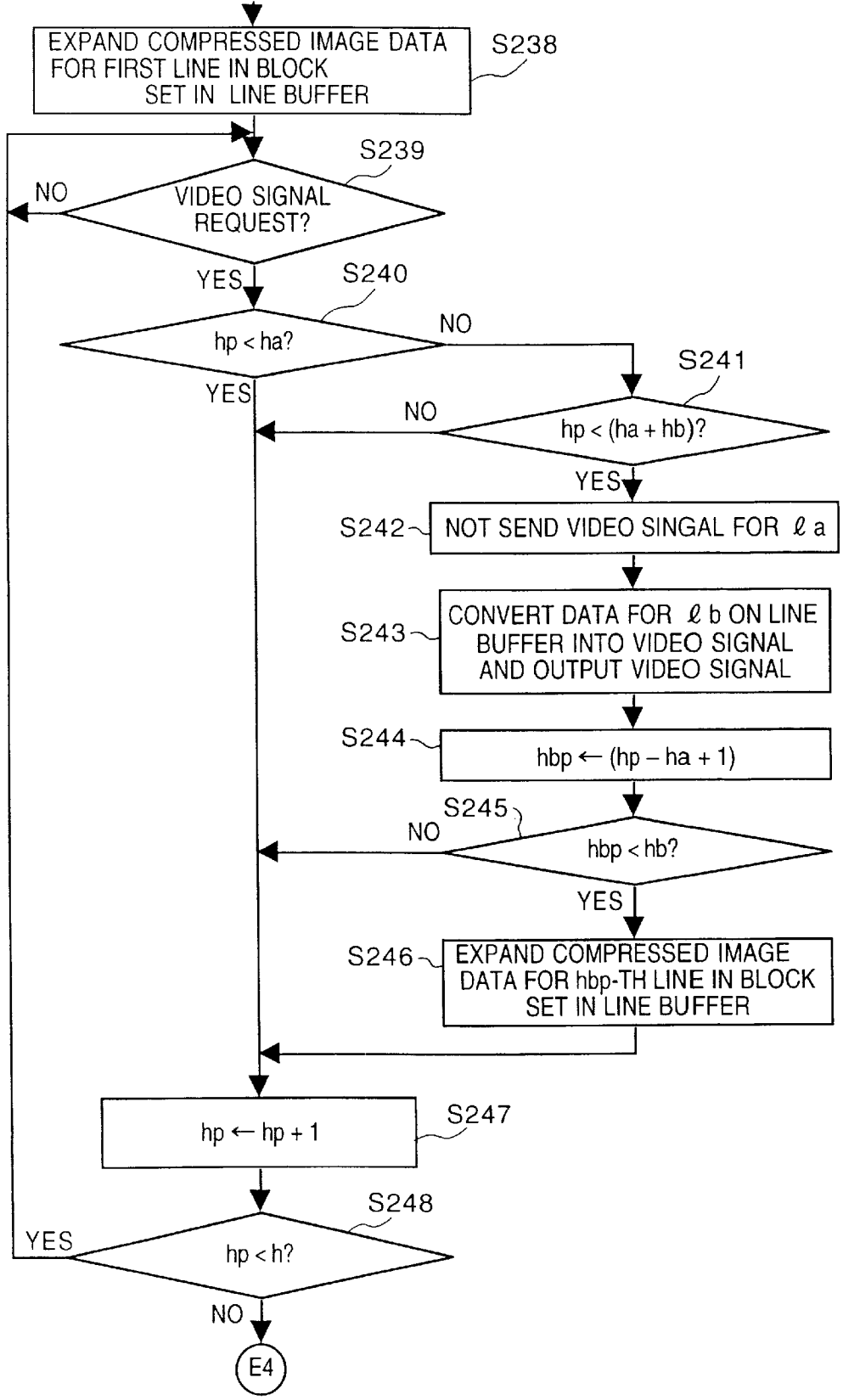
FIG. 28 is a flow chart for explaining the operation of the video transfer circuit.

If NO in step S248, after the flow jumps to step S237 in FIG. 27 to supply information indicating the end of video signal output to the interpreter program 52, the flow returns to step S221 to wait for the next video signal output instruction from the interpreter program 52.

In step S237, the interval from when the video transfer circuit 7 supplies information indicating the end of video signal output to the interpreter program 52 until the interpreter program 52 supplies the video signal output instruction for the next band to the video transfer circuit 7 must be very short. If this interval becomes a long time lag, since no video signal is output during this interval, a white stripe is formed on that line portion on the printed paper sheet. That is, a gap is formed between adjacent bands.

Consequently, the processing between adjacent bands upon paper discharging of the interpreter program 52 must be done very quickly.

Effects Unique to System of First Embodiment (1) In this embodiment, since printout is done by band processing by using band memories in place of a frame buffer, the memory capacity can be reduced. Hence, the manufacturing cost of a printer apparatus can be reduced.

(2) In this embodiment, since the driver transfers character and ruled line data as codes and commands to the printer, the data volume can be reduced in documents that include many characters and tables. Hence, the transfer time can be shortened, and printing can be done quickly.

(3) In this embodiment, the driver transfers character and ruled line data as codes and commands to the printer. However, when the internal processing of the printer cannot map character or ruled line data in time, the driver transfers such character or ruled line data as image data to the printer. In this way, the numbers of characters and ruled lines are not limited in practice.

(4) In this embodiment, printing is started after data for one page are received in the reception buffer. For this reason, since this embodiment does not assign top priority to data transfer to the printer unlike in the "host-based printer", other application programs can be prevented from being locked on the host.

(5) In this embodiment, since the driver on the host transfers a rectangular block actually including an image in the band region to the printer in place of image data having a size of the band itself, the volume of data to be transferred can be reduced. Consequently, the data transfer time can be short, and the print time can also be shortened.

(6) In this embodiment, when a blank band is present, since the controller unit instructs the video transfer circuit not to send any video signal in place of mapping the blank portion onto the band memory and sending that video signal to the engine unit, the load on the CPU can be reduced. Also, since the need for unnecessary mapping can be obviated, the print time can be shortened.

(7) In this embodiment, when a band includes an image alone without any characters or ruled lines, the controller unit instructs only expansion of the compressed image data, conversion into a video signal, and output of the video signal to the engine unit in place of mapping that image onto the band memory and outputting the video signal to the engine unit. Hence, the load on the CPU can be reduced. Also, since the need for unnecessary mapping can be obviated, the print time can be shortened.

Second Embodiment

The printer in the first embodiment has band memories, and prints out images mapped on the band memories in units of bands by alternately mapping and outputting images onto and from the two band memories. The printer may have a frame memory in place of these band memories to realize the same printer as in the first embodiment.

When the printer has a frame memory, the engine starts printing after mapping of all character, ruled line, and block image data for one page onto the memory has been finished. For this reason, whether or not image mapping on one band memory is complete need not be checked while a video signal is output from the other band memory. In other words, the limits of the numbers of characters and ruled lines within a band need not be considered. Hence, the driver need not have any limit check function.

With this arrangement, since the time required for image formation need not be checked, the print time can be shortened accordingly as compared to the printer of the first embodiment.

Third Embodiment

The first embodiment uses the ruled line mapping circuit as a hardware circuit in mapping of ruled line data. Instead, mapping may be done by software. The details of the operation are the same as those described above with reference to the flow charts in FIGS. 23 and 24.

Fourth Embodiment

In the printer of each of the first to third embodiments, the transfer amount of image data can be further reduced in such a manner that the number of bands and band height can be variably set, and when image data include repetitive image patterns in units of bands, the driver sends a band repeat command to the printer. The printing system of the fourth embodiment will be described below with reference to the drawings.

The first embodiment is premised on that one page is equally divided into 16 bands. In the third embodiment, as the major differences from the first embodiment, the number of bands and the height of each band can be variably set, and when image data include repetitive image patterns in units of bands, the driver sends a repetition command of a band to the printer, thereby reducing the transfer amount of image data.

However, since the constituting elements, program operations, and the like of this embodiment are nearly the same as those in the first embodiment, the differences will be mainly described below.

Since the block arrangement is the same as that in FIG. 1 of the first embodiment, a detailed description thereof will be omitted. In this embodiment, the band height is arbitrarily set within the band height of the band memory 71 or 72 allocated on the RAM 9 in FIG. 1.

Figure 29B:
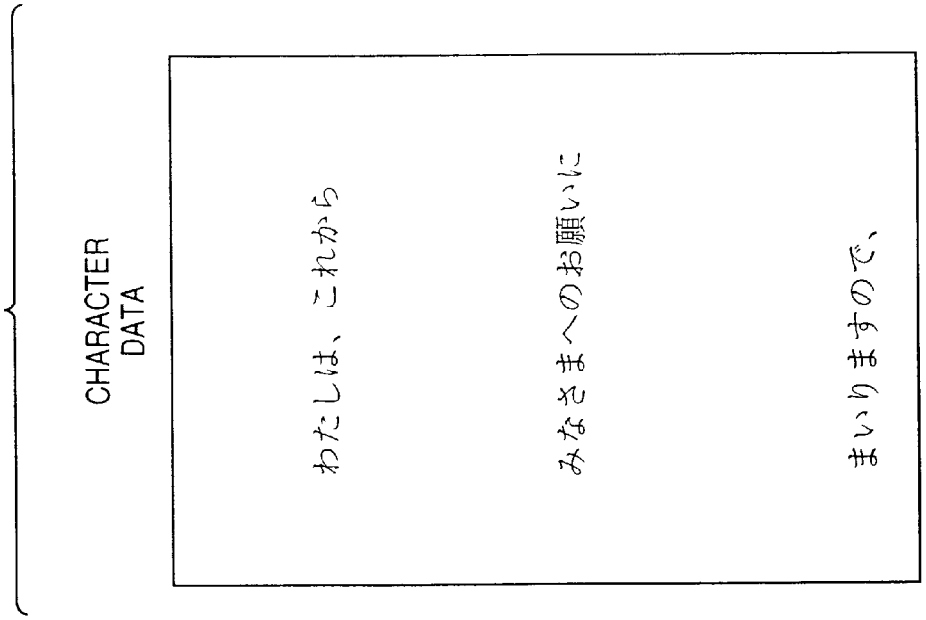
FIGS. 29A and 29B are explanatory views of the principle of repetition of image bands according to the fourth embodiment.
Figure 29A:
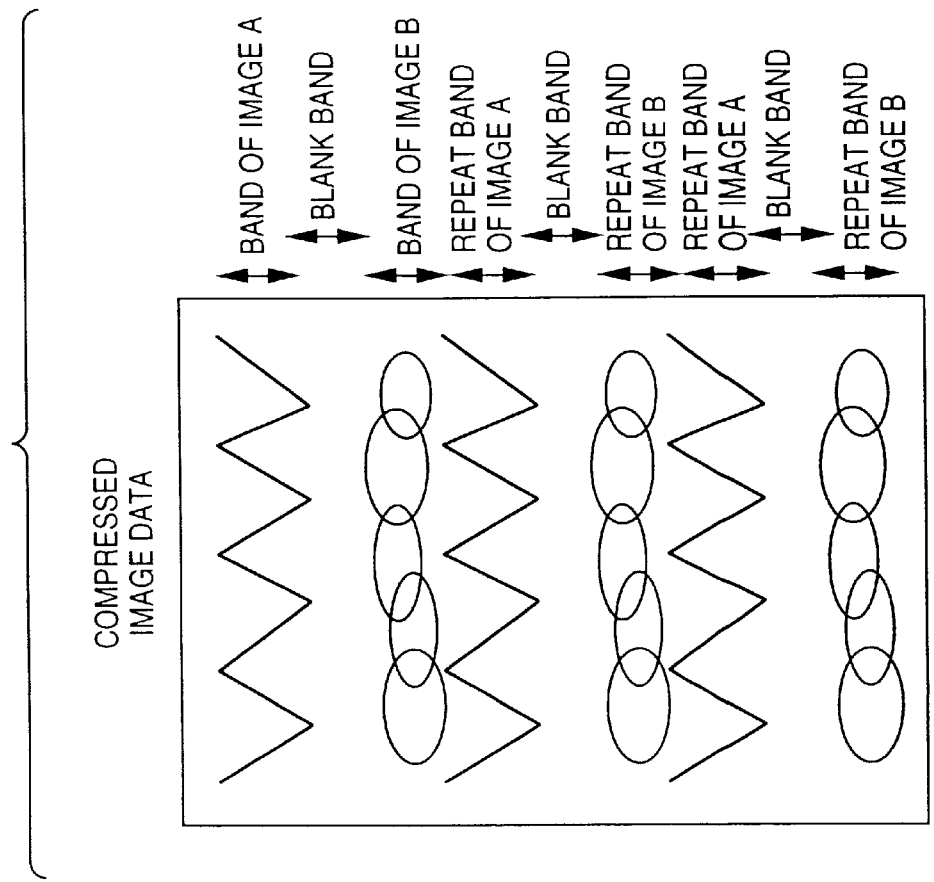

FIGS. 29A and 29B are explanatory views of the principle of this embodiment.

The driver on the host 1 divides a document to be printed into character, ruled line, and block image data, and transfers them to the printer 2 like in the first embodiment.

In this embodiment, the driver performs pattern recognition in units of bands in an image for one page mapped on the frame buffer on the host 1 before it sends image data to the printer 2, and checks if bands include repetitive patterns. In this case, the band height can be arbitrarily changed. As for the pattern recognition technique, since various methods are known to those who are skilled in the art, a detailed description thereof will be omitted.

In FIG. 29A, a band set of a band of image A including a wavy figure, a blank band, and a band of image B including a chain-like figure repetitively appears three times. In such case, in the system of this embodiment, as for the bands of images A and B that occur for the second and subsequent times, print commands indicating that these band data are the same as the band data of images A and B that occurred first are transferred to the printer 2. The processing of a character data portion is the same as that in the first embodiment.

Figure 30B:
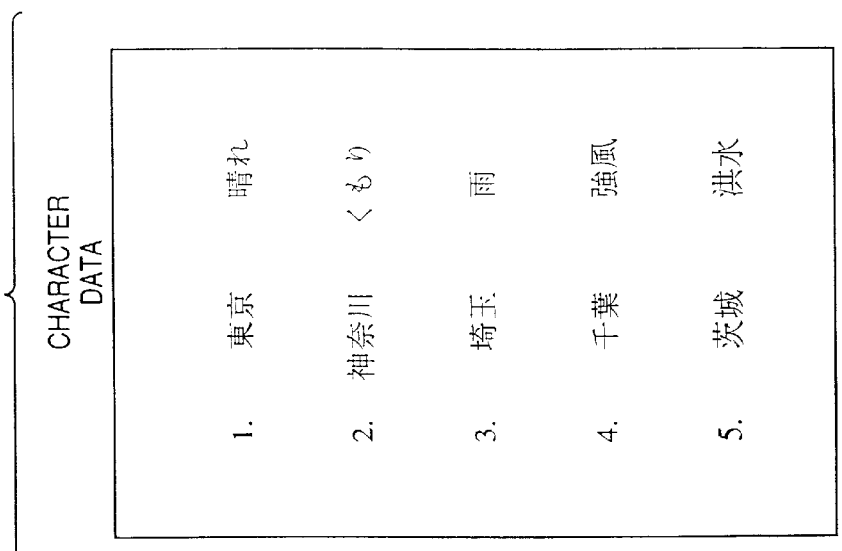
FIGS. 30A and 30B are explanatory views of an example of repetition of image bands.
Figure 30A:
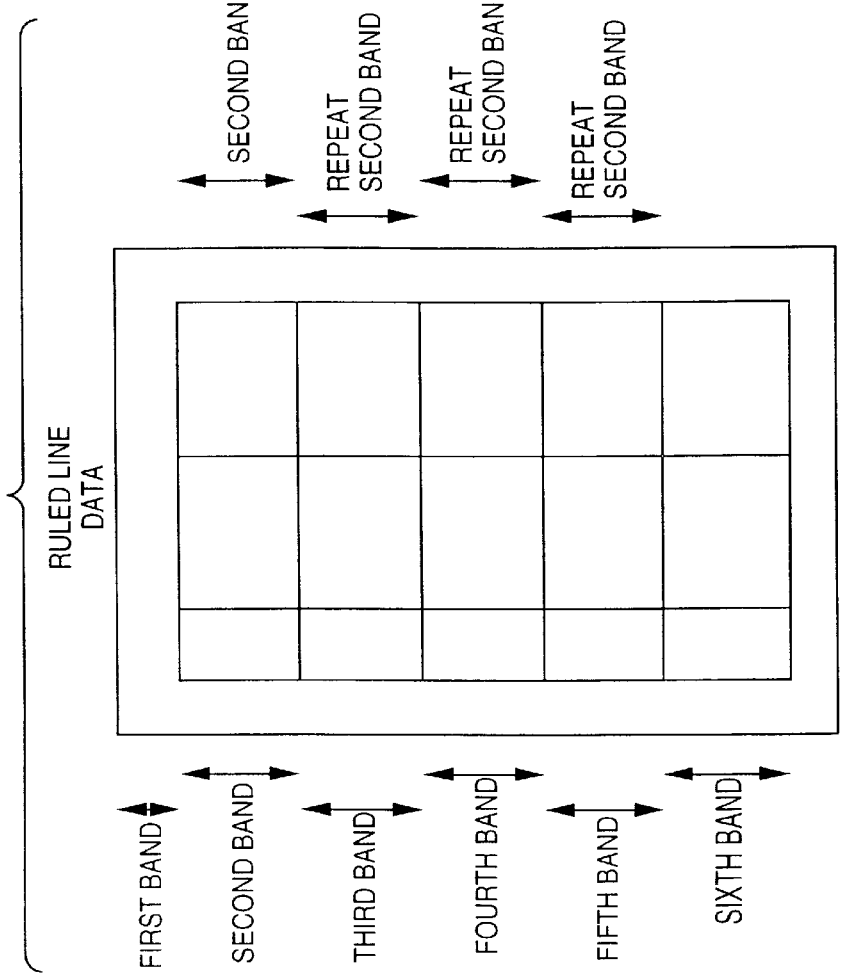

The example shown in FIG. 29A is rarely encountered in actual documents, but an example of repetitive image bands in FIG. 30A is likely to frequently appear in actual documents. However, in this case, all the ruled lines are assumed to be processed as images.

In this example, examining only a ruled line image portion, the image can be divided into the first to sixth bands, as shown in FIG. 30A. Image data of the first, second, and sixth bands are directly transferred to the printer 2 as print commands, but it is determined that the third, fourth, and fifth bands include repetitive images of that in the second band, and a print command instructing "repetition of the second band" is transferred to the printer 2. In case of tables or the like, ruled line data can be included in repetitive patterns. Since the identity of patterns of ruled line data between bands can be checked more easily than an image, this embodiment is very effective in consideration of the expected frequency of such tables.

Figure 31:
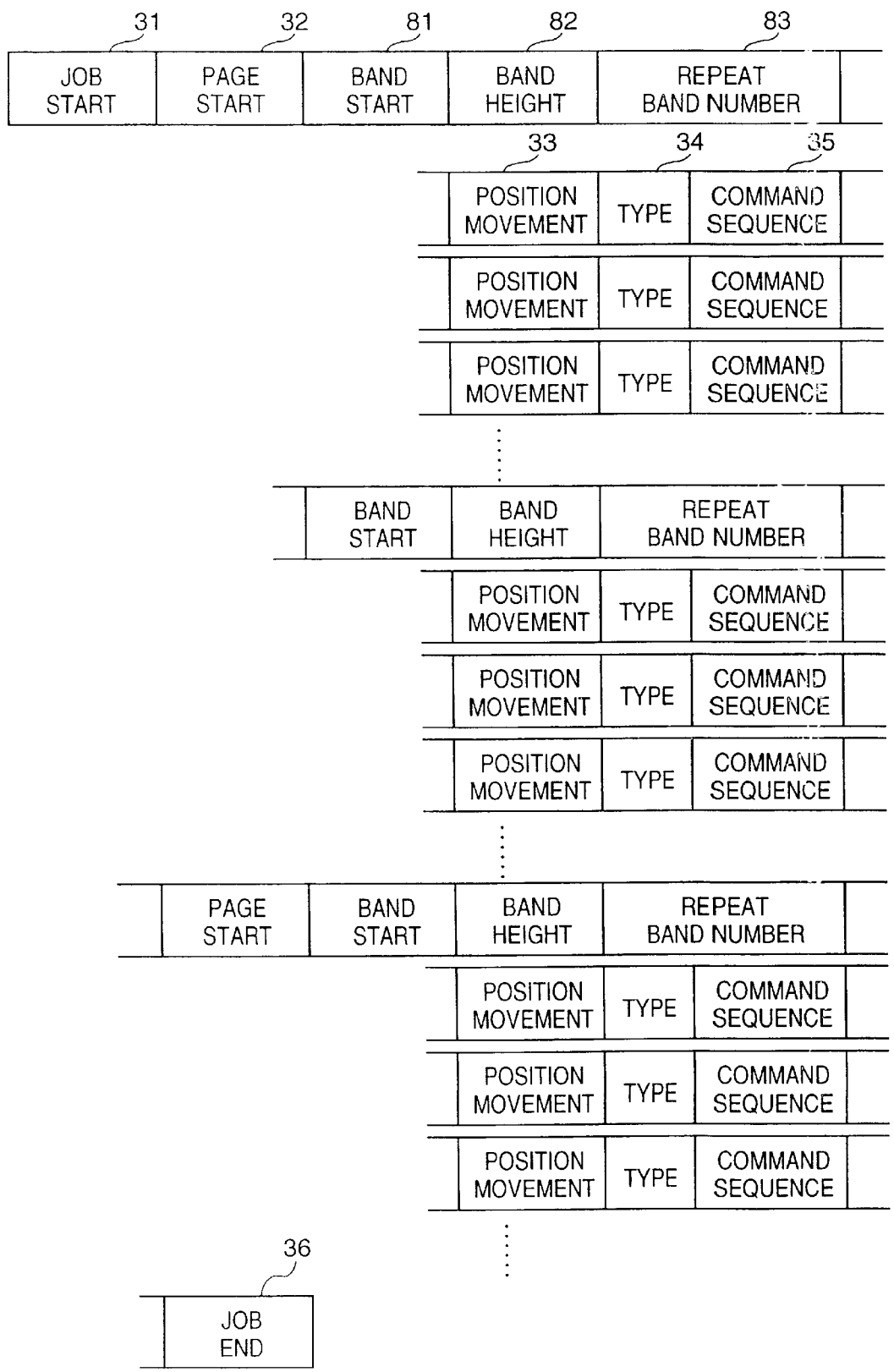
FIG. 31 is an explanatory view of the command structure.

FIG. 31 is an explanatory view of the command structure of character and image data sent from the host 1 to the printer 2. The command structure shown in FIG. 31 is substantially the same as that shown in FIG. 3 of the first embodiment, except that a band height command 82 and repeat band number 83 are added after the band start command 81.

An arbitrary number of band start commands 81 repetitively appear per page. The band height command 82 is also arbitrarily set in units of bands within the band height of the band memory 71 or 72. The repeat band number 83 indicates the order of bands included in that page, and 1 represents the head band of that page. When the band does not include any repetitive image, i.e., includes a new image, –1 is set in the band number.

Driver Program

Figure 32:
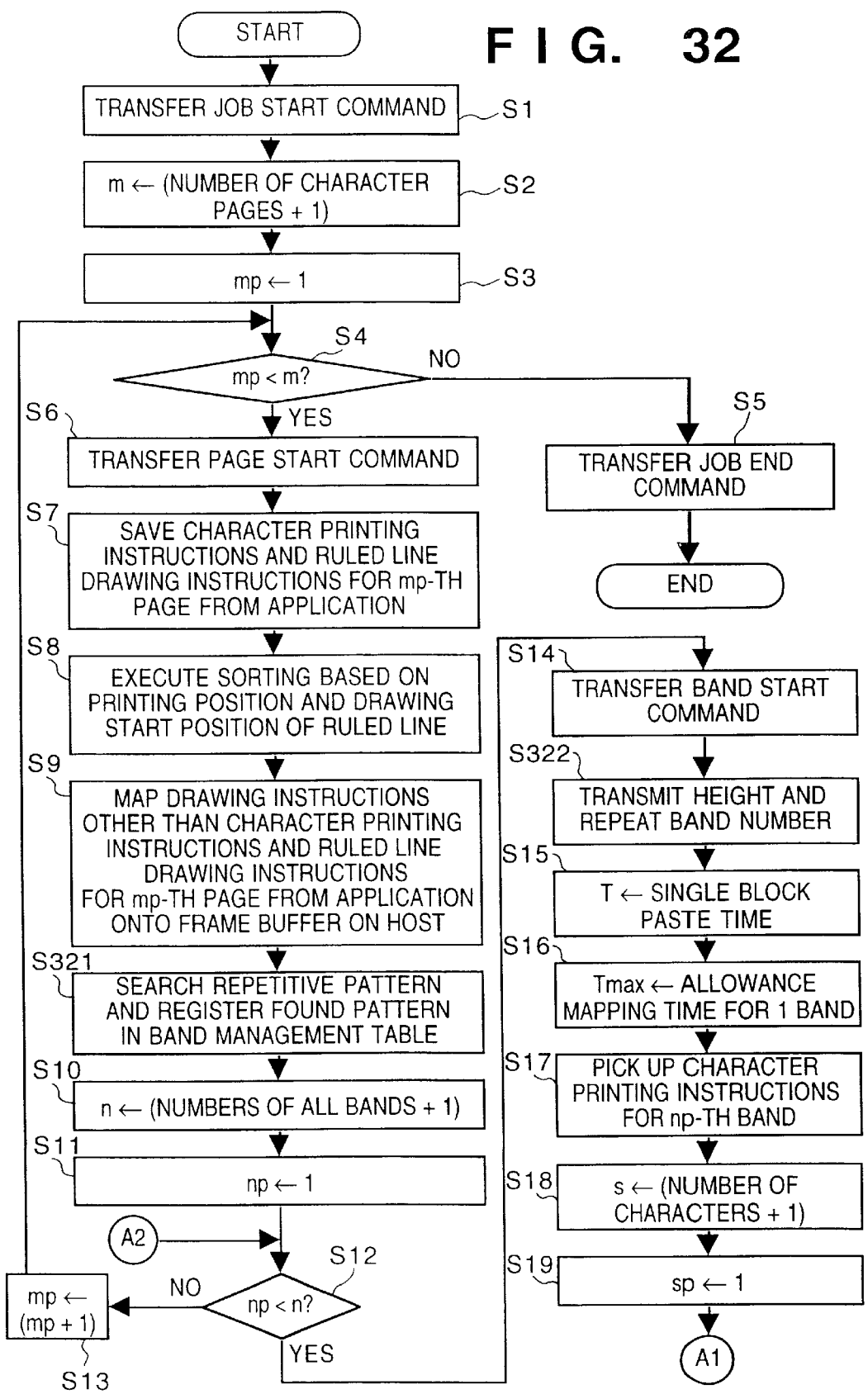
FIG. 32 is a flow chart for explaining the operation of a printer driver.
Figure 33:
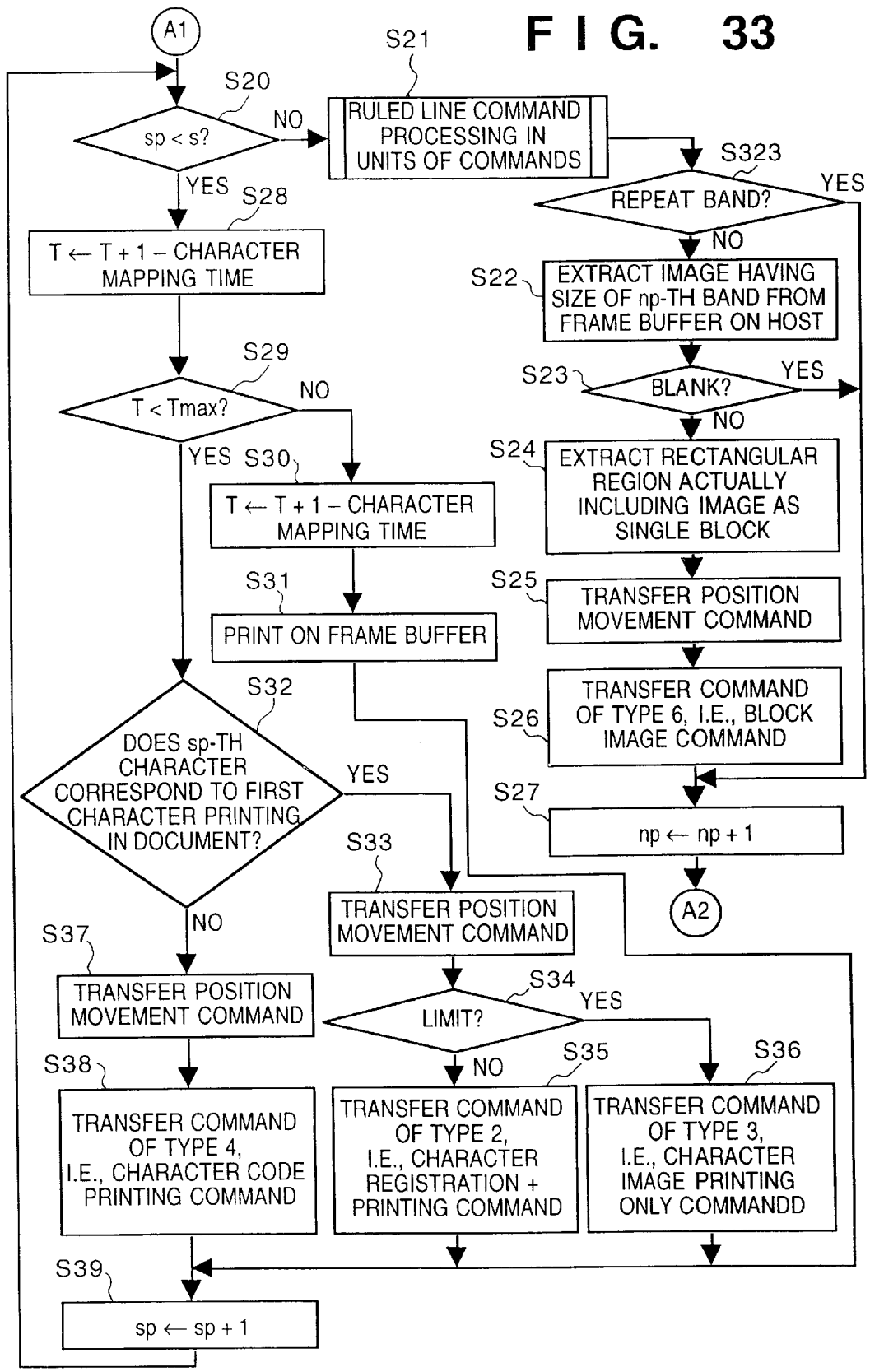
FIG. 33 is a flow chart for explaining the operation of the printer driver.

The printer driver on the host executes processing in the sequence shown in FIGS. 32 and 33. The same reference numerals denote steps common to those in FIG. 10, and a detailed description thereof will be omitted.

In FIGS. 32 and 33, immediately after step S9, the driver checks if data on the frame buffer include repetitive patterns in units of bands. If such repetitive patterns are not found, the driver sets the band numbers and band height used upon equally segmenting one page into 16 bands, and –1 as a repeat band number in the corresponding columns in a band management table. On the other hand, if repetitive patterns are found, the driver sets the band numbers, band heights, and repeat band numbers in the band management table allocated on the host (step S321).

Immediately after step S14, the driver transmits a band height command indicating the segmented band height and a repeat band number command for the band to be transmitted (step S322). If no repetitive bands are found, –1 is set in the repeat band number command.

Furthermore, immediately after step S21, it is tested if the band includes a repetitive image (step S323). If YES in step S323, since there is no actual data, the flow jumps to step S27.

On the controller unit 3 side, the names of the programs installed in the ROM 8 of the controller unit 3 are the same as those shown in FIG. 6 of the first embodiment. The operations of the programs are substantially the same as those in the first embodiment except for the interpreter program 52. Since the operation of the reception unit 6 is the same as that in the first embodiment and the operation of the video transfer circuit 7 is the same as that in the second embodiment, a detailed description thereof will be omitted.

Sequence of Interpreter Program

Figure 34:
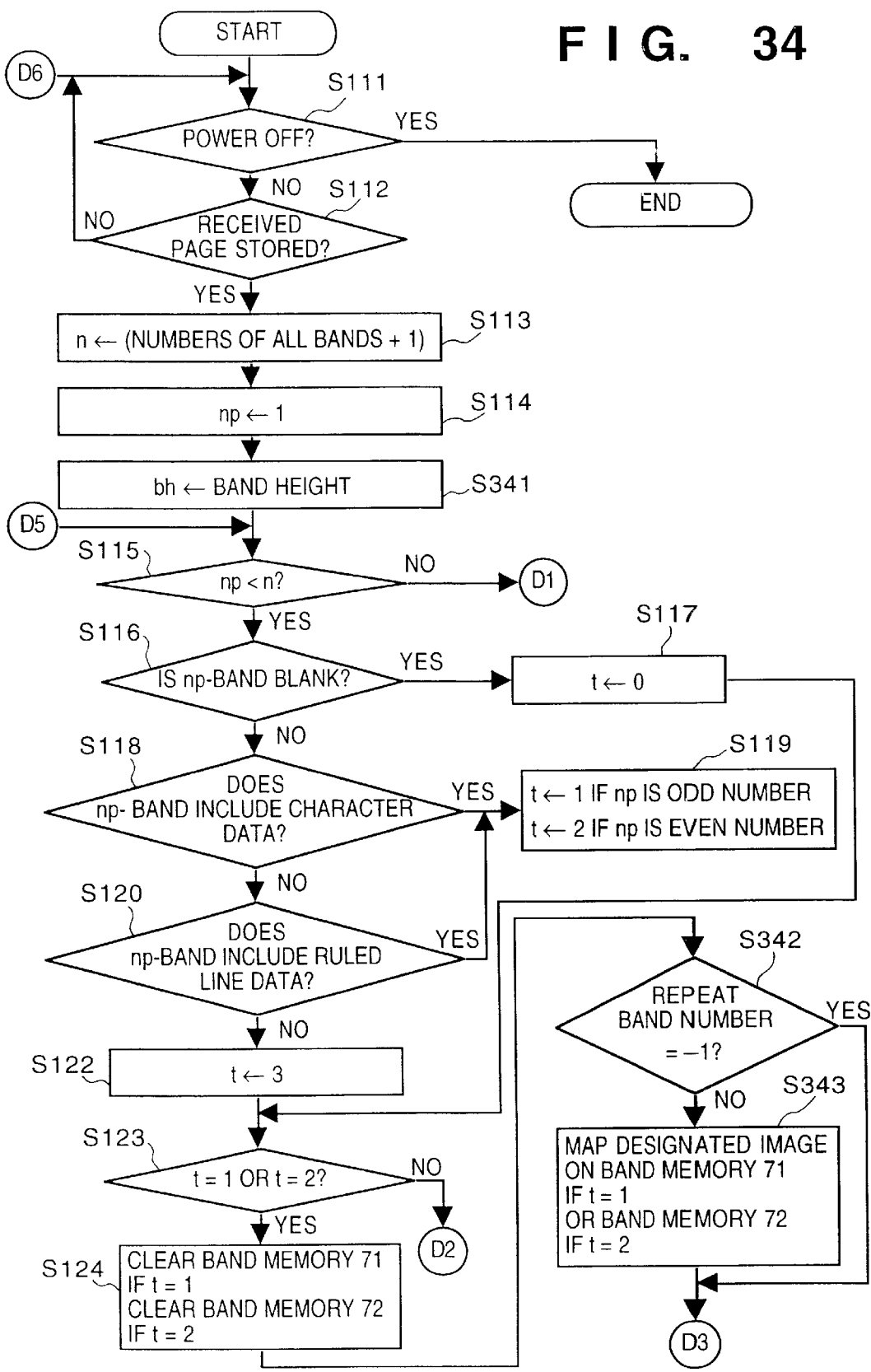
FIG. 34 is a flow chart for explaining the operation of an interpreter program.
Figure 35:
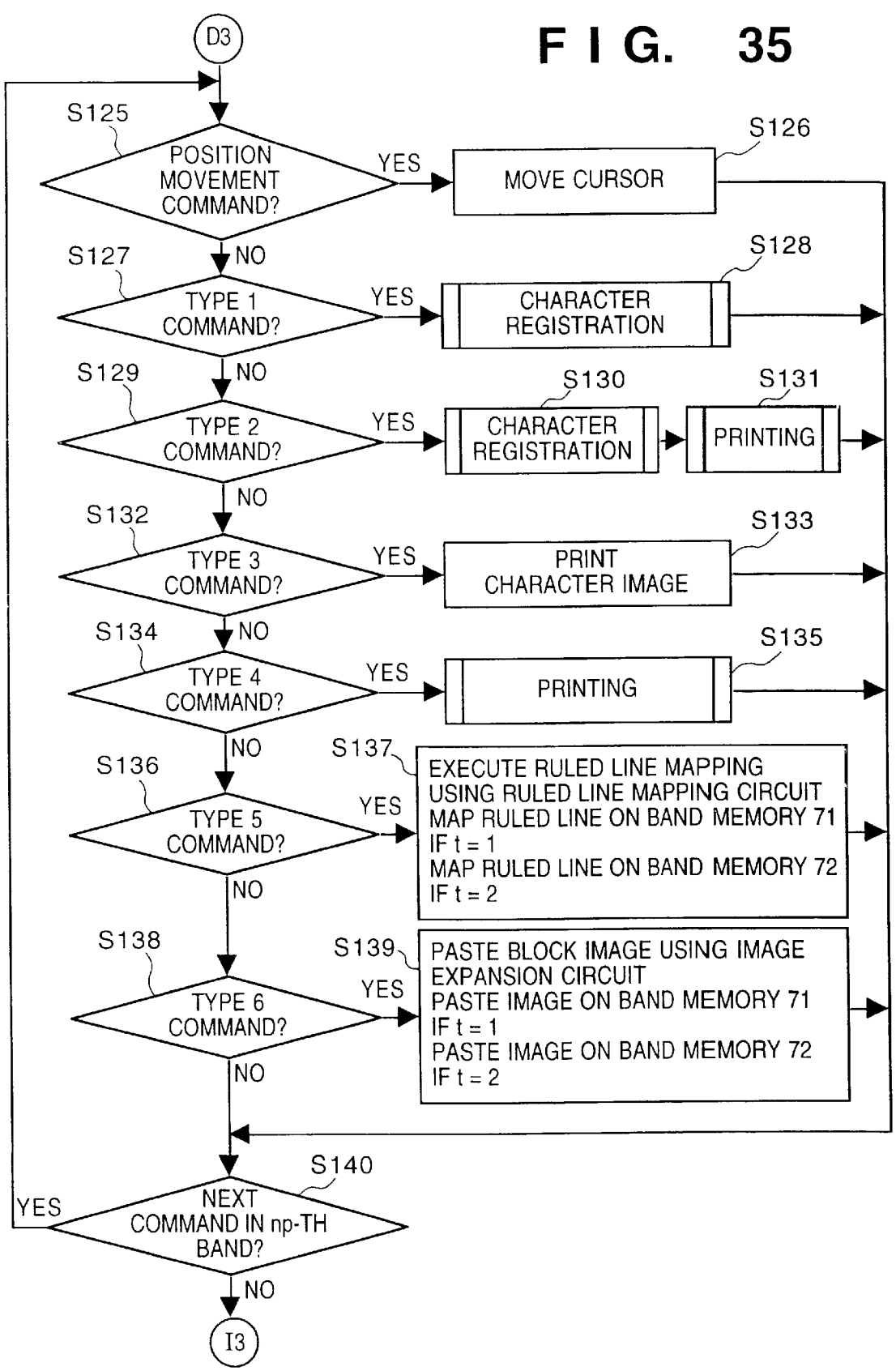
FIG. 35 is a flow chart for explaining the operation of the interpreter program.

FIGS. 34 to 37 are flow charts for explaining the operation of the interpreter program 52. The interpreter program 52 is started upon power ON of the printer 2, and performs interpretation of print commands in the reception buffer 10 written by the reception unit 6, image formation, and paper discharging. This sequence is nearly the same as that shown in FIGS. 17 to 20, and only differences will be explained. FIGS. 35 and 37 are the same as FIGS. 18 and 20, but are presented since they are parts of the sequence.

In FIG. 34, immediately after step S114, the program sets the band height in a variable bh (step S341). Immediately after step S124, the program checks if the repeat band number is –1 (step S342). If NO in step S342, since the band of interest is a repeat band, the program pastes, using the image expansion circuit 16, the block image of the designated band number on the band memory 71 if t=1 or the band memory 72 if t=2 (step S343). In this way, the image of the band designated as a repeat band can be printed out via the band memory.

Figure 36:
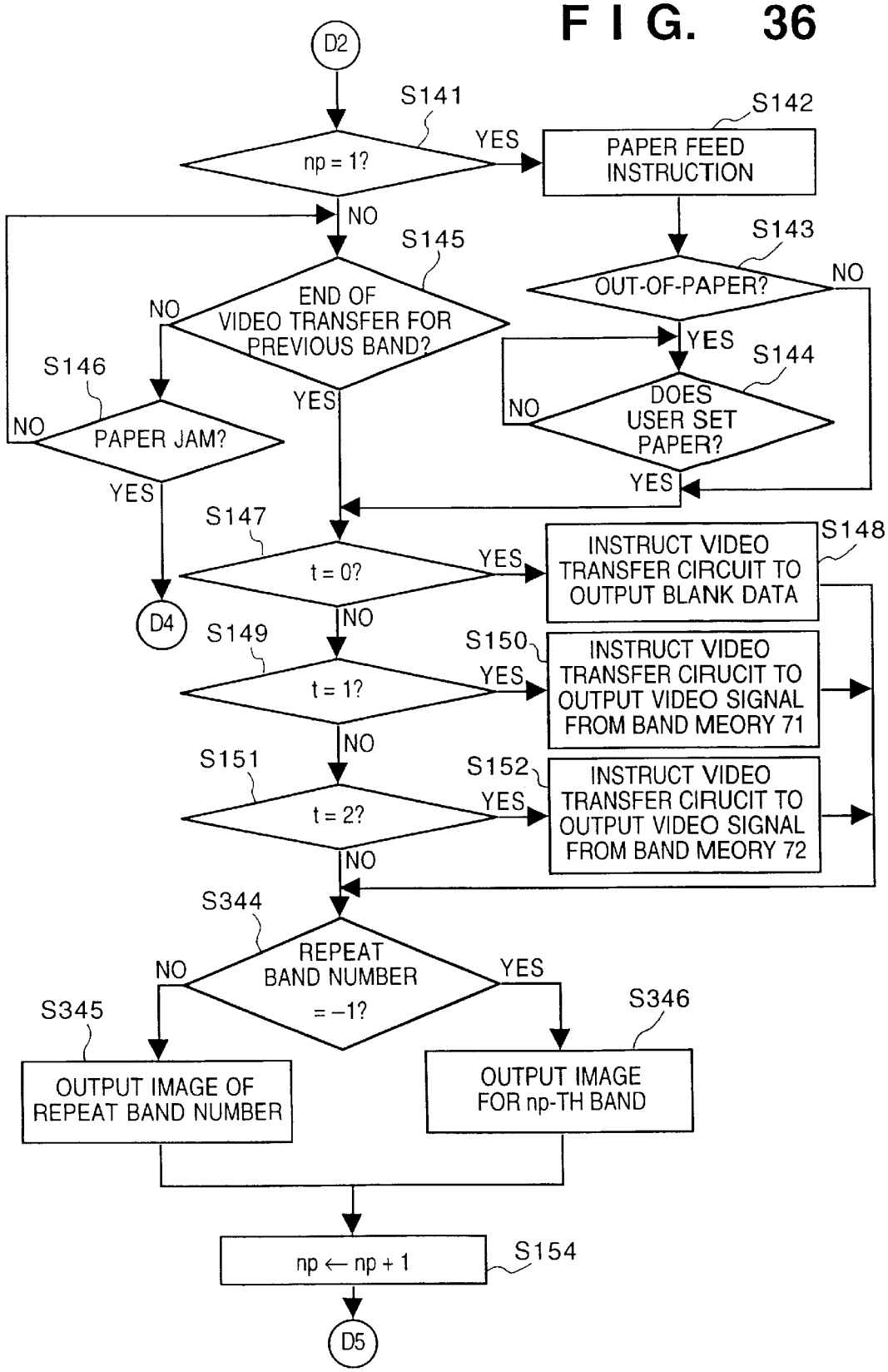
FIG. 36 is a flow chart for explaining the operation of the interpreter program.

Furthermore, in FIG. 36, immediately after step S151, the program checks if the repeat band number is –1 (step S344). If NO in step S344, i.e., if the band of interest is designated as a repeat band, the program instructs the video transfer circuit 7 to output the block image of that band as a video signal (step S345); otherwise, the program instructs the video transfer circuit 7 to output the block image of the np-th band as a video signal (step S346). In this fashion, the band including only an image can be output without using the band memory.

Effect Unique to Fourth Embodiment (1) In this embodiment, the driver analyzes the image pattern on the frame buffer, and if it detects that identical patterns repetitively appear in units of bands, the driver sends only a repetition command as data of such repetitive band portions. Hence, the volume of image data to be transferred can be reduced. Also, the transfer time can be shortened. Furthermore, the memory consumption of the reception buffer on the printer side can be reduced.

Fifth Embodiment

The fifth embodiment will be described below with the aid of the drawings.

System Arrangement

In the fifth embodiment, when a large-size image that cannot be stored in the reception buffer of the printer is to be printed, the reception buffer is divided into some portions, and an image portion in one divided portion is output while another portion receives and stores another image portion, in place of the printing control method described in the first to fourth embodiments, thereby printing a large-size image by repeating the above-mentioned operations.

More specifically, all data in a document are processed as image data, most of the RAM area of the printer is used as a reception buffer, and data for a large-size image page on the reception buffer is directly subjected to image expansion and video transfer to the engine unit in the video transfer circuit 7, thus printing a document including a large-size image page. Since the constituting elements, program operations, and the like of this embodiment are substantially the same as those in the first embodiment, the differences will be mainly elaborated upon.

In the following description, the printing mode in the first embodiment will be referred to as a "synthesis mode". This is because character, ruled line, and image data are separately processed on the host, and character, ruled line, and image data are synthesized by ORing them and the OR data is output on the printer. A mode for outputting a giant image will be referred to as a "simplified synchronization mode" hereinafter. This is because when image data for one page has too large a size, it is printed by passively synchronously repeating data transfer in units of bands from the host and feeding of a paper sheet in the printer as data are received.

Figure 38B:
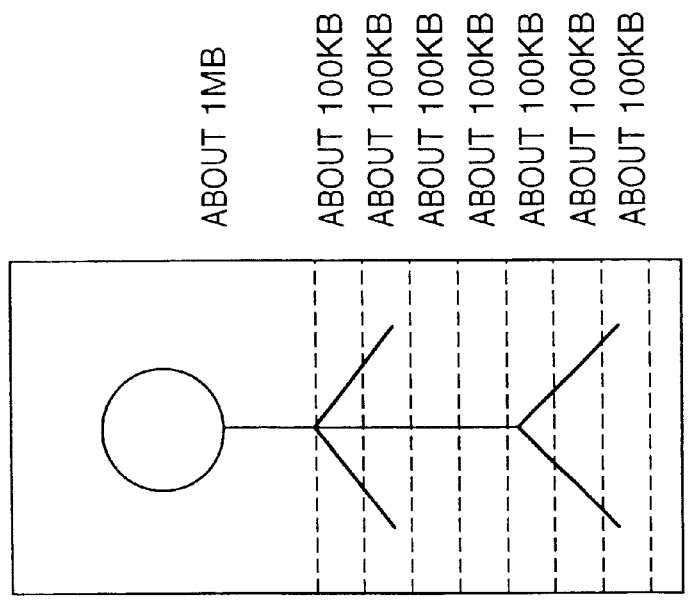
FIGS. 38A and 38B are views showing the principle of the procedure for outputting an image with a large data size.
Figure 38A:
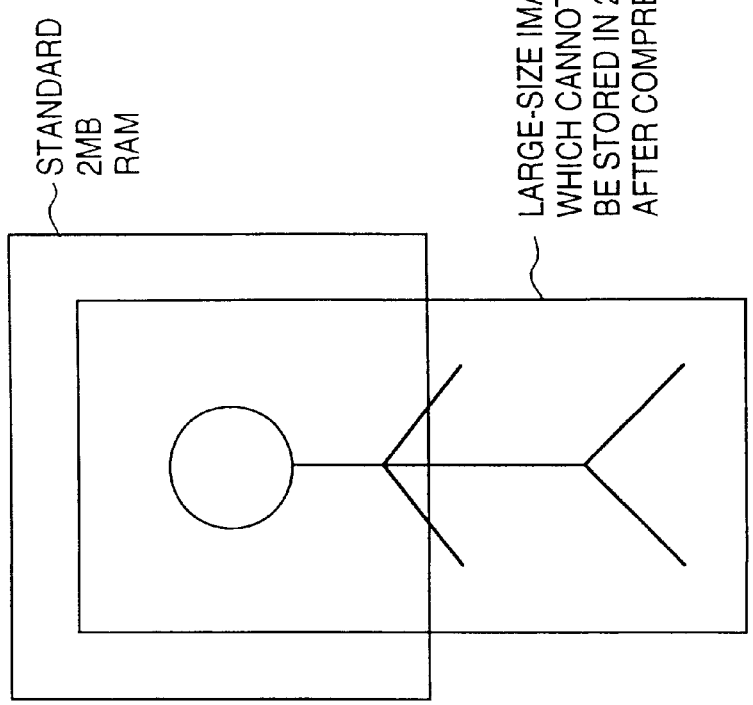

FIGS. 38A, 38B, and 39 are views for explaining the principle of the simplified synchronization mode. Assume that the printer of this embodiment comprises a 2 MB memory as the reception buffer. FIG. 38A shows a large-size image which exceeds the reception buffer capacity even if it is compressed. The printer driver on the host breaks up such large-size image into a single 1 MB block and 100 KB blocks, and sends these blocks to the printer, as shown in FIG. 38B.

FIG. 39 shows a state wherein the printer receives and reconstructs the block images sent as shown in FIG. 38B, and prints the image. The block images received from the host are compressed and stored in the RAM 9 in units of blocks. The printer expands these block images one by one, and prints out the expanded data. Since the second and subsequent block images are smaller than the first block and can be expanded quickly, the expansion time does not produce any overrun. In this embodiment, the above-mentioned "synthesis mode" and "simplified synchronization mode" are combined.

More specifically, the host checks, prior to generation of print commands, if the printer is likely to overrun. If it is determined that the printer is likely to overrun, the host maps the whole page as image data. This process is as has already been described earlier. In this case, the host checks the size of the generated image data, and uses the above-mentioned simplified synchronization mode if the size exceeds that of the reception buffer of the printer. If the printer is unlikely to produce any overrun, the host sends data to the printer by the method described in the first to fourth embodiments.

With this method, the effects of the first to fourth embodiments can be obtained, and one-page data having too large a size can be printed.

Other Embodiments

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, upon instructing document printing, the host breaks up the document into character data, ruled line data, and other data portions, and processes the other data portions as images. As for the character portions, when the host encounters the first occurrence of a certain character, it registers the character image of that character in the printer, and instructs the printer of character printing for the second and subsequent occurrences of that character. In this manner, most of the character data portions can be sent as character codes. On the other hand, the host transfers the ruled line data portions as ruled line commands.

With this processing, according to the present invention, since most of character portions are processed using character codes, the character mapping time on the host can be shortened, and its data volume is small. Similarly, since the ruled line portions are processed using ruled line commands, the host does not require any ruled line mapping time, and the data volume is also small. Hence, not only document data but also table data can be output at high speed.

When band memories are arranged in place of the frame memory, the required memory capacity can be reduced.

In consideration of a case wherein mapping of a large number of characters or ruled lines onto the band memory cannot be done in time, the number of characters or ruled lines per band is limited upon generating printer commands, and characters or ruled lines that exceed the limit are processed as image data. Hence, normal document or table data can be output at high speed, and even a document including a very large number of characters or ruled lines can be printed out without any errors.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
   a pick-up unit for detecting and picking up a ruled line drawing instruction in an area; and
   a determination unit for, in accordance with the ruled line drawing instruction picked up by said picking-up unit, determining whether a ruled line command corresponding to the ruled line drawing instruction is to be generated and transferred to a printer, or whether an image corresponding to the ruled line drawing instruction is to be generated and transferred to the printer.

2. The apparatus according to claim 1, wherein said determination unit determines whether or not a time required for mapping a single ruled line is shorter than a predetermined value, such that,
   in a case where the time required for mapping the single ruled line is shorter than the predetermined value, said determination unit generates the ruled line command corresponding to the ruled line drawing instruction and transmits the command to the printer, and,
   in a case where the time required for mapping the single ruled line is not shorter than the predetermined value, said determination unit generates the image corresponding to the ruled line drawing instruction and transmits the image to the printer.

3. The apparatus according to claim 2, wherein the area in which the ruled line drawing instruction is picked up includes a band area.

4. The apparatus according to claim 2, further comprising:
   a transmitter for, in a case where it is determined by said determination unit that an image corresponding to the ruled line drawing instruction is to be generated and transferred to the printer, generating an image corresponding to the ruled line drawing instruction in a buffer, extracting a rectangular region that includes an image, and transmitting the image included in the extracted region to the printer.

5. An information processing method comprising:
   a pick-up step of detecting and picking up a ruled line drawing instruction in an area; and
   a determination step of determining whether a ruled line command corresponding to the ruled line drawing instruction is to be generated and transferred to a printer, or whether an image corresponding to the ruled line drawing instruction is to be generated and transferred to the printer, in accordance with the ruled line drawing instruction picked up in said pick-up step.

6. The method according to claim 5, wherein said determination step determines whether or not a time required for mapping a single ruled line is shorter than a predetermined value, such that,
   in a case where the time required for mapping the single ruled line is shorter than the predetermined value, said determination step generates the ruled line command corresponding to the ruled line drawing instruction and transmits the command to the printer, and,
   in a case where the time required for mapping the single ruled line is not shorter than the predetermined value, said determination step generates the image corresponding to the ruled line drawing instruction and transmits the image to the printer.

7. The method according to claim 6, wherein the area in which the ruled line drawing instruction is picked up includes a band area.

8. The method according to claims 6, further comprising:
   a transmission step of, in a case where it is determined in said determination step that an image corresponding to the ruled line drawing instruction is to be generated and transferred to the printer, generating an image corresponding to the ruled line drawing instruction in a buffer, extracting a rectangular region that includes an image, and transmitting the image included in the extracted region to the printer.

9. A computer-readable recording medium in which a computer program for performing an information processing method is stored, the program comprising:
   (a) computer program code for a pick-up step of detecting and picking up a ruled line drawing instruction in an area; and
   (b) computer program code for a determination step of, in accordance with the ruled line drawing instruction picked up in the pick-up step, determining whether a ruled line command corresponding to the ruled line drawing instruction is to be generated and transferred to a printer, or whether an image corresponding to the ruled line drawing instruction is to be generated and transferred to the printer.

10. The medium according to claim 9, wherein the determination step includes determining whether or not a time required for mapping a single ruled line is shorter than a predetermined value, such that,
    in a case where the time required for mapping the single ruled line is shorter than the predetermined value, the ruled line command corresponding to the ruled line drawing instruction is generated and is transmitted to the printer, and,
    in a case where the time required for mapping the single ruled line is not smaller than the predetermined value, the image corresponding to the ruled line drawing instruction is generated and is transmitted to the printer.

11. The medium according to claim 10, wherein the area in which the ruled line drawing instruction is picked up includes a band area.

12. The medium according to claim 10, wherein the program further comprises:
    (c) computer program code for a transmission step of, in a case where it is determined in the determination step that an image corresponding to the ruled line drawing instruction is to be generated and transferred to the printer, generating an image corresponding to the ruled line drawing instruction in a buffer, extracting a rectangular region that includes an image, and transmitting the image included in the extracted region to the printer.

13. A computer program product for implementing an information processing method, comprising:
    (a) computer program code for a pick-up step of detecting and picking up a ruled line drawing instruction in an area; and
    (b) computer program code for a determination step of, in accordance with the ruled line drawing instruction picked up in the pick-up step, determining whether a ruled line command corresponding to the ruled line drawing instruction is to be generated and transferred to a printer, or whether an image corresponding to the ruled line drawing instruction is to be generated and transferred to the printer.

14. The computer program product according to claim 13, wherein the determination step includes determining whether or not a time required for mapping a single ruled line is shorter than a predetermined value, such that, in a case where the time required for mapping the single ruled line is shorter than the predetermined value, the ruled line command corresponding to the ruled line drawing instruction is generated and is transmitted to the printer, and, in a case where the time required for mapping the single ruled line is not shorter than the predetermined value, the image corresponding to the ruled line drawing instruction is generated and is transmitted to the printer.

15. The computer program product according to claim 14, wherein the area in which the ruled line drawing instruction is picked up includes a band area.

16. The computer program product according to claim 14, further comprising:

(c) computer program code for a transmission step of, in a case where it is determined in the determination step that an image corresponding to the ruled line drawing instruction is to be generated and transferred to the printer, generating an image corresponding to the ruled line drawing instruction in a buffer, extracting a rectangular region that includes an image, and transmitting the image included in the extracted region to the printer.

\* \* \* \* \*

UNITED STATES PATENT AND TRADEMARK OFFICE
CERTIFICATE OF CORRECTION

PATENT NO. : 6,181,432 B1
DATED : January 30, 2001
INVENTOR(S) : Yoji Furuya

It is certified that error appears in the above-identified patent and that said Letters Patent is hereby corrected as shown below:

Column 22,
Line 34, "Sill" should read -- S111 --.

Column 26,
Line 16, "Ois" should read -- O is --.

Signed and Sealed this

Fifth Day of February, 2002

Attest:

JAMES E. ROGAN
Attesting Officer
Director of the United States Patent and Trademark Office